United States Patent
Simoni et al.

(10) Patent No.: US 12,180,407 B2
(45) Date of Patent: Dec. 31, 2024

(54) COMPOSITIONS COMPRISING 1,2-DICHLORO-1,2-DIFLUOROETHYLENE FOR USE IN HEAT TRANSFER APPLICATIONS

(71) Applicant: THE CHEMOURS COMPANY FC, LLC, Wilmington, DE (US)

(72) Inventors: Luke David Simoni, Wilmington, DE (US); Barbara Haviland Minor, The Villages, FL (US); Konstantinos Kontomaris, Wilmington, DE (US); Viacheslav A Petrov, Hockessin, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 921 days.

(21) Appl. No.: 17/279,622

(22) PCT Filed: Oct. 3, 2019

(86) PCT No.: PCT/US2019/054422
§ 371 (c)(1),
(2) Date: Mar. 25, 2021

(87) PCT Pub. No.: WO2020/072731
PCT Pub. Date: Apr. 9, 2020

(65) Prior Publication Data
US 2021/0340421 A1 Nov. 4, 2021

Related U.S. Application Data

(60) Provisional application No. 62/742,106, filed on Oct. 5, 2018.

(51) Int. Cl.
*C09K 5/04* (2006.01)
*F25B 45/00* (2006.01)

(52) U.S. Cl.
CPC ............. *C09K 5/044* (2013.01); *F25B 45/00* (2013.01); *C09K 2205/12* (2013.01); *C09K 2205/122* (2013.01); *C09K 2205/126* (2013.01); *C09K 2205/22* (2013.01); *C09K 2205/24* (2013.01); *C09K 2205/43* (2013.01)

(58) Field of Classification Search
CPC ...................................................... C09K 5/044
See application file for complete search history.

(56) References Cited

U.S. PATENT DOCUMENTS

| 7,442,321 B1 | 10/2008 | Chen |
| 2007/0284555 A1 | 12/2007 | Leck et al. |
| 2018/0066170 A1 | 3/2018 | Tasaka et al. |

FOREIGN PATENT DOCUMENTS

| JP | H03209338 A | | 9/1991 |
| JP | 2013237624 A | | 11/2013 |
| JP | 2014005418 A | * | 1/2014 |
| JP | 2014141537 A | | 8/2014 |
| JP | 2015-229768 A | | 12/2015 |
| JP | 5987497 B2 | | 9/2016 |
| JP | 2017-218508 A | | 12/2017 |
| WO | 2012/157761 A1 | | 11/2012 |
| WO | 2014178352 A1 | | 11/2014 |

OTHER PUBLICATIONS

English machine translation of Nishiguchi et al., JP 2014005418 A. (Year: 2014).*
PCT International Search Report and Written Opinion for International PCT Application No. PCT/US2019/054422 mailed Feb. 11, 2020.
Scientific Assessment of Ozone Depletion: 2002, World Meteorological Organization Global Ozone Research and Monitoring Project—Report No. 47, 2002, pp. 1.28-1.31.

* cited by examiner

*Primary Examiner* — Peter F Godenschwager

(57) ABSTRACT

This invention relates to compositions comprising 1,2-dichloro-1,2-difluoroethylene (i.e., CFO-1112) and an additional component. The compositions described herein may be useful, for example, in heat transfer applications.

17 Claims, No Drawings

COMPOSITIONS COMPRISING 1,2-DICHLORO-1,2-DIFLUOROETHYLENE FOR USE IN HEAT TRANSFER APPLICATIONS

This application represents a national filing under 35 U.S.C. 371 of International Application No. PCT/US2019/054422 filed Oct. 3, 2019 which claims the benefit of U.S. Provisional Application Ser. No. 62/742,106, filed Oct. 5, 2018.

TECHNICAL FIELD

The present application provides compositions comprising 1,2-dichloro-1,2-difluoroethylene (i.e., CFO-1112) and an additional component. The compositions described herein may be useful, for example, in heat transfer applications (e.g., refrigeration and/or heating applications).

BACKGROUND

Many current commercial refrigerants employ hydrochlorofluorocarbons ("HCFCs") or hydrofluorocarbons ("HFCs"). HCFCs contribute to ozone depletion and are scheduled for eventual phaseout under the Montreal Protocol. HFCs, while not contributing to ozone depletion, can contribute to global warming and the use of such compounds has come under scrutiny by environmental regulators. Thus, there is a need for refrigerants that are characterized by a low ozone depletion potential (ODP) and low impact on global warming. This application addresses this need and others.

SUMMARY

The present application provides, inter alia, a composition, comprising:
i) 1,2-dichloro-1,2-difluoroethylene (CFO-1112); and
ii) a compound selected from R-245fa, R-1336mzzZ, n-pentane, R-1233zdE, pentane, R-1336mzzE, R-1224ydZ, R-1234zeZ, R-1336yf, R-1336zeE, R-1234zeE, R-32, R-134a, R-1234yf, trans-1,2-dichloroethylene, R-152a, R-134, R-125, and R-1123.

The present application further provides methods for producing cooling, comprising evaporating a composition provided herein 1 in the vicinity of a body to be cooled, and thereafter condensing said composition.

The present application further provides methods for producing heating, comprising condensing a composition provided herein in the vicinity of a body to be heated, and thereafter evaporating said composition.

The present application further provides a heat transfer system or apparatus (e.g., a refrigeration, air-conditioning, or heat pump apparatus) comprising a composition provided herein.

The present application further provides processes for replacing an incumbent refrigerant in a heat transfer apparatus (e.g., a refrigeration apparatus or a refrigeration system), comprising substantially replacing said incumbent refrigerant with a composition provided herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DETAILED DESCRIPTION

The present disclosure provides compositions (e.g., heat transfer composition and/or refrigerant compositions) comprising, 2-dichloro-1,2-difluoroethylene (i.e., CFO-1112) and an additional component as described herein. The compositions provided herein may be useful, for example, in refrigerant and/or heat transfer applications formerly served by chlorofluorocarbon ("CFC") compounds.

Definitions and Abbreviations

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term "consists essentially of" or "consisting essentially of" occupies a middle ground between "comprising" and "consisting of".

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the term "about" is meant to account for variations due to experimental error (e.g., plus or minus approximately 10% of the indicated value). All measurements reported herein are understood to be modified by the term "about", whether or not the term is explicitly used, unless explicitly stated otherwise.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

As used herein the term "Ozone depletion potential" (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant or working fluid in an evaporator per unit mass of refrigerant or working fluid circulated. Volumetric cooling capacity refers to the amount of heat removed by the refrigerant or working fluid in the evaporator per unit volume of refrigerant vapor exiting the evaporator. The refrigeration capacity is a measure of the ability of a refrigerant, working fluid or heat transfer composition to produce cooling. Therefore, the higher the volumetric cooling capacity of the working fluid, the greater the cooling rate that can be produced at the evaporator with the maximum volumetric flow rate achievable with a given compressor. Cooling rate refers to the heat removed by the refrigerant in the evaporator per unit time.

Similarly, volumetric heating capacity is a term to define the amount of heat supplied by the refrigerant or working fluid in the condenser per unit volume of refrigerant or working fluid vapor entering the compressor. The higher the volumetric heating capacity of the refrigerant or working fluid, the greater the heating rate that is produced at the condenser with the maximum volumetric flow rate achievable with a given compressor.

Coefficient of performance (COP) is the amount of heat removed in the evaporator divided by the energy required to operate the compressor. The higher the COP, the higher the energy efficiency. COP is directly related to the energy efficiency ratio (EER), that is, the efficiency rating for refrigeration or air conditioning equipment at a specific set of internal and external temperatures.

As used herein, a heat transfer medium comprises a composition used to carry heat from a heat source to a heat sink. For example, heat from a body to be cooled to a chiller evaporator or from a chiller condenser to a cooling tower or other configuration where heat can be rejected to the ambient.

As used herein, a working fluid or refrigerant comprises a compound or mixture of compounds (e.g., a composition provided herein) that function to transfer heat in a cycle wherein the working fluid undergoes a phase change from a liquid to a gas and back to a liquid in a repeating cycle.

Subcooling is the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. By cooling a liquid below the saturation temperature, the net refrigeration capacity can be increased. Subcooling thereby improves refrigeration capacity and energy efficiency of a system. Subcool amount is the amount of cooling below the saturation temperature (in degrees) or how far below its saturation temperature a liquid composition is cooled.

The term "superheat" defines how far above the saturation vapor temperature of a vapor composition a vapor composition is heated. Saturation vapor temperature is the temperature at which, if a vapor composition is cooled, the first drop of liquid is formed, also referred to as the "dew point".

Chemicals, Abbreviations, and Acronyms
  HFC: hydrofluorocarbon
  HCFC: hydrochlorofluorocarbon
  HCFO: hydrochlorofluoroolefin
  PFC: perfluorocarbon
  CFO-1112: 1,2-dichloro-1,2-difluoroethylene (mixture of isomers)
  CFO-1112(E) or CFO-1112E: E-1,2-dichloro-1,2-difluoroethylene
  CFO-1112(Z) or CFO-1112Z: Z-1,2-dichloro-1,2-difluoroethylene
  R-245fa or HFC-245a: 1,1,1,3,3-pentafluoropropane
  R-1336mzz or HFO-1336mzz: 1,1,1,4,4,4-hexafluorobut-2-ene (mixture of isomers)
  R-1336mzzZ or HFO-1336mzz(Z) or (Z)-1336mzz: (Z)-1,1,1,4,4,4-hexafluorobut-2-ene
  R-1336mzzE or HFO-1336mzz(E) or (E)-1336mzz: (E)-1,1,1,4,4,4-hexafluorobut-2-ene
  R-1233zd: 1-chloro-3,3,3-trifluoropropene (mixture of isomers)
  R-1233zdE: (E)-1-chloro-3,3,3-trifluoropropene
  R-1224yd: 1-chloro-2,3,3,3-tetrafluoropropene
  R-1224ydZ: (Z)-1-chloro-2,3,3,3-tetrafluoropropene
  R-1234ze: 1,3,3,3-tetrafluoropropene (mixture of isomers)
  R-1234zeZ: (Z)-1,3,3,3-tetrafluoropropene
  R-1336yf: 2,3,3,4,4,4-hexafluorobut-1-ene (mixture of isomers)
  R-1336ze: 1,3,3,4,4,4-hexafluorobut-1-ene (mixture of isomers)
  R-1336zeE: (E)-1,3,3,4,4,4-hexafluorobut-1-ene
  R-1234ze: 1,3,3,3-tetrafluoroprop-1-ene (mixture of isomers)
  R-1234zeE: (E)-1,3,3,3-tetrafluoroprop-1-ene
  R-32: difluoromethane
  R-125: pentafluoroethane
  R-134a: 1,1,1,2-tetrafluoroethane
  R-1234yf: 2,3,3,3-tetrafluoropropene (mixture of isomers)
  t-DCE: trans-1,2-dichloroethylene
  R-152a: 1,1-difluoroethane
  R-134: 1,1,1,2-tetrafluoroethane
  R-1123: 1,1,2-trifluoroethylene Compositions The present application provides a composition, comprising:
  i) 1,2-dichloro-1,2-difluoroethylene (CFO-1112); and, optionally,
  ii) a compound selected from R-245fa, R-1336mzzZ, n-pentane, R-1233zdE, i-pentane, R-1336mzzE, R-1224ydZ, R-1234zeZ, R-1336yf, R-1336zeE, R-1234zeE, R-32, R-134a, R-1234yf, trans-1,2-dichloroethylene, R-152a, R-134, R-125, and R-1123.

In some embodiments, the composition comprises:
  i) 1,2-dichloro-1,2-difluoroethylene (CFO-1112); and, optionally,
  ii) a compound selected from R-245fa, R-1336mzzZ, n-pentane, R-1233zdE, i-pentane, R-1336mzzE, R-1224ydZ, R-1234zeZ, R-1336yf, R-1336zeE, R-1234zeE, R-32, R-134a, R-1234yf, trans-1,2-dichloroethylene, R-152a, and R-134.

In some embodiments, the composition comprises:
i) 1,2-dichloro-1,2-difluoroethylene; and, optionally,
ii) a compound selected from R-245fa, R-1336mzzZ, n-pentane, R-1233zdE, i-pentane, R-1336mzzE, R-1224ydZ, R-1234zeZ, R-1336yf, and R-1336zeE.

The present application provides a composition, comprising:
i) 1,2-dichloro-1,2-difluoroethylene (CFO-1112); and
ii) a compound selected from R-245fa, R-1336mzzZ, n-pentane, R-1233zdE, i-pentane, R-1336mzzE, R-1224ydZ, R-1234zeZ, R-1336yf, R-1336zeE, R-1234zeE, R-32, R-134a, R-1234yf, trans-1,2-dichloroethylene, R-152a, R-134, R-125, and R-1123.

In some embodiments, the composition comprises:
i) 1,2-dichloro-1,2-difluoroethylene (CFO-1112); and
ii) a compound selected from R-245fa, R-1336mzzZ, n-pentane, R-1233zdE, i-pentane, R-1336mzzE, R-1224ydZ, R-1234zeZ, R-1336yf, R-1336zeE, R-1234zeE, R-32, R-134a, R-1234yf, trans-1,2-dichloroethylene, R-152a, and R-134.

In some embodiments, the composition comprises:
i) 1,2-dichloro-1,2-difluoroethylene; and
ii) a compound selected from R-245fa, R-1336mzzZ, n-pentane, R-1233zdE, i-pentane, R-1336mzzE, R-1224ydZ, R-1234zeZ, R-1336yf, and R-1336zeE.

In some embodiments, the composition comprises 1,2-dichloro-1,2-difluoroethylene. In some embodiments, the composition consists essentially of 1,2-dichloro-1,2-difluoroethylene. In some embodiments, the composition consists of 1,2-dichloro-1,2-difluoroethylene.

In some embodiments, the 1,2-dichloro-1,2-difluoroethylene is (E)-1,2-dichloro-1,2-difluoroethylene. In some embodiments, the 1,2-dichloro-1,2-difluoroethylene is (Z)-1,2-dichloro-1,2-difluoroethylene.

In some embodiments, the 1,2-dichloro-1,2-difluoroethylene comprises a mixture of (E)-1,2-dichloro-1,2-difluoroethylene and (Z)-1,2-dichloro-1,2-difluoroethylene.

In some embodiments, the 1,2-dichloro-1,2-difluoroethylene comprises about 60% to about 70% E-1,2-dichloro-1,2-difluoroethylene and about 30% to about 40% Z-1,2-dichloro-1,2-difluoroethylene.

In some embodiments, the 1,2-dichloro-1,2-difluoroethylene comprises about 60% E-1,2-dichloro-1,2-difluoroethylene and about 40% Z-1,2-dichloro-1,2-difluoroethylene. In some embodiments, the 1,2-dichloro-1,2-difluoroethylene comprises about 70% E-1,2-dichloro-1,2-difluoroethylene and about 30% Z-1,2-dichloro-1,2-difluoroethylene.

In some embodiments, the composition provided herein comprises about 1 to about 99 weight percent 1,2-dichloro-1,2-difluoroethylene, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent 1,2-dichloro-1,2-difluoroethylene.

In some embodiments, the composition comprises:
about 1 to about 99 weight percent 1,2-dichloro-1,2-difluoroethylene; or
about 95 to about 99 weight percent 1,2-dichloro-1,2-difluoroethylene; or
about 90 to about 99 weight percent 1,2-dichloro-1,2-difluoroethylene; or
about 85 to about 99 weight percent 1,2-dichloro-1,2-difluoroethylene; or
about 70 to about 99 weight percent 1,2-dichloro-1,2-difluoroethylene; or
about 60 to about 99 weight percent 1,2-dichloro-1,2-difluoroethylene; or
about 50 to about 99 weight percent 1,2-dichloro-1,2-difluoroethylene; or
about 1 to about 40 weight percent 1,2-dichloro-1,2-difluoroethylene; or
about 1 to about 25 weight percent 1,2-dichloro-1,2-difluoroethylene; or
about 1 to about 20 weight percent 1,2-dichloro-1,2-difluoroethylene; or
about 1 to about 15 weight percent 1,2-dichloro-1,2-difluoroethylene; or
about 1 to about 10 weight percent 1,2-dichloro-1,2-difluoroethylene.

In some embodiments, the composition comprises about 1 to about 99 weight percent R-245fa, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-245fa.

In some embodiments, the composition comprises about 1 to about 99 weight percent 1,2-dichloro-1,2-difluoroethylene and about 99 to about 1 weight percent R-245fa. In some embodiments, the composition comprises about 1 to about 85 weight percent 1,2-dichloro-1,2-difluoroethylene and about 99 to about 15 weight percent R-245fa.

In some embodiments, the composition comprises about 1 to about 40 weight percent 1,2-dichloro-1,2-difluoroethylene and about 99 to about 60 weight percent R-245fa. In some embodiments, the composition comprises about 1 to about 25 weight percent 1,2-dichloro-1,2-difluoroethylene and about 99 to about 75 weight percent R-245fa.

In some embodiments, the composition comprises about 34 to about 36 weight percent 1,2-dichloro-1,2-difluoroethylene and about 66 to about 64 weight percent R-245fa.

In some embodiments, the composition comprising 1,2-dichloro-1,2-difluoroethylene and R-245fa has a temperature glide of about 0.3 K or less, for example, about 0.2 K or less, about 0.15 K or less, about 0.1 K or less, or about 0.05 K or less. In some embodiments, the composition comprising 1,2-dichloro-1,2-difluoroethylene and R-245fa has a temperature glide of less than about 0.3 K.

In some embodiments, the composition comprising 1,2-dichloro-1,2-difluoroethylene and R-245fa has a temperature glide of about 0.15 K or less. In some embodiments, the composition comprising 1,2-dichloro-1,2-difluoroethylene and R-245fa has a temperature glide of less than about 0.15 K.

In some embodiments, the composition provided herein consists essentially of 1,2-dichloro-1,2-difluoroethylene and R-245fa. In some embodiments, the composition provided herein consists of 1,2-dichloro-1,2-difluoroethylene and R-245fa.

In some embodiments, the composition provided herein comprises 1,2-dichloro-1,2-difluoroethylene and R-1336mzzZ (i.e., (Z)-1,1,1,4,4,4-hexafluorobut-2-ene).

In some embodiments, the composition comprises about 1 to about 99 weight percent R-1336mzzZ, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1336mzzZ.

In some embodiments, the composition comprises about 1 to about 99 weight percent 1,2-dichloro-1,2-difluoroethylene and about 99 to about 1 weight percent R-1336mzzZ. In some embodiments, the composition comprises about 5 to about 40 weight percent 1,2-dichloro-1,2-difluoroethylene and about 95 to about 60 weight percent R-1336mzzZ.

In some embodiments, the composition comprises about 1 to about 10 weight percent 1,2-dichloro-1,2-difluoroethylene and about 99 to about 90 weight percent R-1336mzzZ. In some embodiments, the composition comprises about 50 to about 99 weight percent 1,2-dichloro-1,2-difluoroethylene and about 50 to about 1 weight percent R-1336mzzZ.

In some embodiments, the composition comprises about 60 to about 99 weight percent 1,2-dichloro-1,2-difluoroethylene and about 40 to about 1 weight percent R-1336mzzZ.

In some embodiments, the composition comprises about 20 to about 21 weight percent 1,2-dichloro-1,2-difluoroethylene and about 80 to about 79 weight percent R-1336mzzZ.

In some embodiments, the composition comprising 1,2-dichloro-1,2-difluoroethylene and R-1336mzzZ has a temperature glide of about 2 K or less, for example, about 1.5 K or less, about 1 K or less, or about 0.5 K or less. In some embodiments, the composition comprising 1,2-dichloro-1,2-difluoroethylene and R-1336mzzZ has a temperature glide of less than about 2 K.

In some embodiments, the composition comprising 1,2-dichloro-1,2-difluoroethylene and R-1336mzzZ has a temperature glide of about 1 K or less. In some embodiments, the composition comprising 1,2-dichloro-1,2-difluoroethylene and R-1336mzzZ has a temperature glide of less than about 1 K.

In some embodiments, the composition provided herein consists essentially of 1,2-dichloro-1,2-difluoroethylene and R-1336mzzZ. In some embodiments, the composition provided herein consists of 1,2-dichloro-1,2-difluoroethylene and R-1336mzzZ.

In some embodiments, the composition provided herein comprises 1,2-dichloro-1,2-difluoroethylene and n-pentane.

In some embodiments, the composition comprises about 1 to about 99 weight percent n-pentane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent n-pentane.

In some embodiments, the composition comprises about 1 to about 99 weight percent 1,2-dichloro-1,2-difluoroethylene and about 99 to about 1 weight percent n-pentane. In some embodiments, the composition comprises about 5 to about 40 weight percent 1,2-dichloro-1,2-difluoroethylene and about 95 to about 60 weight percent n-pentane.

In some embodiments, the composition comprises about 1 to about 20 weight percent 1,2-dichloro-1,2-difluoroethylene and about 99 to about 80 weight percent n-pentane. In some embodiments, the composition comprises about 60 to about 99 weight percent 1,2-dichloro-1,2-difluoroethylene and about 40 to about 1 weight percent n-pentane.

In some embodiments, the composition comprises about 1 to about 10 weight percent 1,2-dichloro-1,2-difluoroethylene and about 99 to about 90 weight percent n-pentane. In some embodiments, the composition comprises about 70 to about 99 weight percent 1,2-dichloro-1,2-difluoroethylene and about 30 to about 1 weight percent n-pentane.

In some embodiments, the composition comprises about 93 to about 94 weight percent 1,2-dichloro-1,2-difluoroethylene and about 7 to about 6 weight percent n-pentane.

In some embodiments, the composition comprising 1,2-dichloro-1,2-difluoroethylene and n-pentane has a temperature glide of about 3 K or less, for example, about 2.5 K or less, about 2.0 K or less, about 1.5 K or less, about 1 K or less, or about 0.5 K or less. In some embodiments, the composition comprising 1,2-dichloro-1,2-difluoroethylene and n-pentane has a temperature glide of less than about 3 K.

In some embodiments, the composition comprising 1,2-dichloro-1,2-difluoroethylene and n-pentane has a temperature glide of about 2 K or less. In some embodiments, the composition comprising 1,2-dichloro-1,2-difluoroethylene and n-pentane has a temperature glide of less than about 2 K.

In some embodiments, the composition provided herein consists essentially of 1,2-dichloro-1,2-difluoroethylene and n-pentane. In some embodiments, the composition provided herein consists of 1,2-dichloro-1,2-difluoroethylene and n-pentane.

In some embodiments, the composition provided herein comprises 1,2-dichloro-1,2-difluoroethylene and R-1233zdE.

In some embodiments, the composition comprises about 1 to about 99 weight percent R-1233zdE, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1233zdE.

In some embodiments, the composition comprises about 1 to about 99 weight percent 1,2-dichloro-1,2-difluoroethylene and about 99 to about 1 weight percent R-1233zdE. In some embodiments, the composition comprises about 1 to about 70 weight percent 1,2-dichloro-1,2-difluoroethylene and about 99 to about 30 weight percent R-1233zdE.

In some embodiments, the composition comprises about 1 to about 35 weight percent 1,2-dichloro-1,2-difluoroethylene and about 99 to about 65 weight percent R-1233zdE. In some embodiments, the composition comprises about 1 to about 25 weight percent 1,2-dichloro-1,2-difluoroethylene and about 99 to about 75 weight percent R-1233zdE.

In some embodiments, the composition comprises about 27 to about 28 weight percent 1,2-dichloro-1,2-difluoroethylene and about 73 to about 72 weight percent R-1233zdE.

In some embodiments, the composition comprising 1,2-dichloro-1,2-difluoroethylene and R-1233zdE has a temperature glide of about 0.05 K or less, for example, about 0.025 K or less, about 0.02 K or less, about 0.015 K or less, about 0.01 K or less, or about 0.005 K or less. In some embodiments, the composition comprising 1,2-dichloro-1,2-difluoroethylene and R-1233zdE has a temperature glide of less than about 0.05 K.

In some embodiments, the composition comprising 1,2-dichloro-1,2-difluoroethylene and R-1233zdE has a temperature glide of about 0.02 K or less. In some embodiments, the composition comprising 1,2-dichloro-1,2-difluoroethylene and R-1233zdE has a temperature glide of less than about 0.02 K.

In some embodiments, the composition provided herein consists essentially of 1,2-dichloro-1,2-difluoroethylene and R-1233zdE. In some embodiments, the composition provided herein consists of 1,2-dichloro-1,2-difluoroethylene and R-1233zdE.

In some embodiments, the composition provided herein comprises 1,2-dichloro-1,2-difluoroethylene and i-pentane.

In some embodiments, the composition comprises about 1 to about 99 weight percent i-pentane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent i-pentane.

In some embodiments, the composition comprises about 1 to about 65 weight percent 1,2-dichloro-1,2-difluoroethylene and about 99 to about 35 weight percent i-pentane. In some embodiments, the composition comprises about 20 to about 70 weight percent 1,2-dichloro-1,2-difluoroethylene and about 80 to about 30 weight percent i-pentane.

In some embodiments, the composition comprises about 70 to about 99 weight percent 1,2-dichloro-1,2-difluoroethylene and about 30 to about 1 weight percent i-pentane. In some embodiments, the composition comprises about 80 to about 90 weight percent 1,2-dichloro-1,2-difluoroethylene and about 20 to about 10 weight percent i-pentane.

In some embodiments, the composition comprises about 1 to about 20 weight percent 1,2-dichloro-1,2-difluoroethylene and about 99 to about 80 weight percent i-pentane. In some embodiments, the composition comprises about 55 to about 99 weight percent 1,2-dichloro-1,2-difluoroethylene and about 45 to about 1 weight percent i-pentane.

In some embodiments, the composition comprises about 1 to about 10 weight percent 1,2-dichloro-1,2-difluoroethylene and about 99 to about 90 weight percent i-pentane. In some embodiments, the composition comprises about 65 to about 99 weight percent 1,2-dichloro-1,2-difluoroethylene and about 35 to about 1 weight percent i-pentane.

In some embodiments, the composition comprises about 82 to about 83 weight percent 1,2-dichloro-1,2-difluoroethylene and about 18 to about 17 weight percent i-pentane.

In some embodiments, the composition comprising 1,2-dichloro-1,2-difluoroethylene and i-pentane has a temperature glide of about 1.5 K or less, for example, about 1.25 K or less, about 1.0 K or less, about 0.5 K or less, about 0.25 K or less, or about 0.1 K or less. In some embodiments, the composition comprising 1,2-dichloro-1,2-difluoroethylene and i-pentane has a temperature glide of less than about 1.5 K.

In some embodiments, the composition comprising 1,2-dichloro-1,2-difluoroethylene and i-pentane has a temperature glide of about 1 K or less. In some embodiments, the composition comprising 1,2-dichloro-1,2-difluoroethylene and i-pentane has a temperature glide of less than about 1 K.

In some embodiments, the composition provided herein consists essentially of 1,2-dichloro-1,2-difluoroethylene and i-pentane. In some embodiments, the composition provided herein consists of 1,2-dichloro-1,2-difluoroethylene and i-pentane.

In some embodiments, the composition provided herein comprises 1,2-dichloro-1,2-difluoroethylene and R-1336mzzE (i.e., (E)-1,1,1,4,4,4-hexafluorobut-2-ene).

In some embodiments, the composition comprises about 1 to about 99 weight percent R-1336mzzE, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1336mzzE.

In some embodiments, the composition comprises about 1 to about 99 weight percent 1,2-dichloro-1,2-difluoroethylene and about 99 to about 1 weight percent R-1336mzzE. In some embodiments, the composition comprises about 40 to about 90 weight percent 1,2-dichloro-1,2-difluoroethylene and about 60 to about 10 weight percent R-1336mzzE.

In some embodiments, the composition comprises about 1 to about 40 weight percent 1,2-dichloro-1,2-difluoroethylene and about 99 to about 60 weight percent R-1336mzzE. In some embodiments, the composition comprises about 85 to about 99 weight percent 1,2-dichloro-1,2-difluoroethylene and about 15 to about 1 weight percent R-1336mzzE.

In some embodiments, the composition comprises about 1 to about 25 weight percent 1,2-dichloro-1,2-difluoroethylene and about 99 to about 75 weight percent R-1336mzzE. In some embodiments, the composition comprises about 95 to about 99 weight percent 1,2-dichloro-1,2-difluoroethylene and about 5 to about 1 weight percent R-1336mzzE.

In some embodiments, the composition comprising 1,2-dichloro-1,2-difluoroethylene and R-1336mzzE has a temperature glide of about 2 K or less, for example, about 1.5 K or less, about 1.0 K or less, about 0.5 K or less, about 0.25 K or less, or about 0.1 K or less. In some embodiments, the composition comprising 1,2-dichloro-1,2-difluoroethylene and R-1336mzzE has a temperature glide of less than about 1.5 K.

In some embodiments, the composition comprising 1,2-dichloro-1,2-difluoroethylene and R-1336mzzE has a temperature glide of about 1 K or less. In some embodiments, the composition comprising 1,2-dichloro-1,2-difluoroethylene and R-1336mzzE has a temperature glide of less than about 1 K.

In some embodiments, the composition provided herein consists essentially of 1,2-dichloro-1,2-difluoroethylene and R-1336mzzE. In some embodiments, the composition provided herein consists of 1,2-dichloro-1,2-difluoroethylene and R-1336mzzE.

In some embodiments, the composition provided herein comprises 1,2-dichloro-1,2-difluoroethylene and R-1224ydZ.

In some embodiments, the composition comprises about 1 to about 99 weight percent R-1224ydZ, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1224ydZ.

In some embodiments, the composition comprises about 1 to about 99 weight percent 1,2-dichloro-1,2-difluoroethylene and about 99 to about 1 weight percent R-1224ydZ. In some embodiments, the composition comprises about 1 to about 85 weight percent 1,2-dichloro-1,2-difluoroethylene and about 99 to about 15 weight percent R-1224ydZ.

In some embodiments, the composition comprises about 1 to about 40 weight percent 1,2-dichloro-1,2-difluoroethylene and about 99 to about 60 weight percent R-1224ydZ. In some embodiments, the composition comprises about 85 to about 99 weight percent 1,2-dichloro-1,2-difluoroethylene and about 15 to about 1 weight percent R-1224ydZ.

In some embodiments, the composition comprises about 1 to about 25 weight percent 1,2-dichloro-1,2-difluoroethylene and about 99 to about 75 weight percent R-1224ydZ. In some embodiments, the composition comprises about 95 to about 99 weight percent 1,2-dichloro-1,2-difluoroethylene and about 5 to about 1 weight percent R-1224ydZ.

In some embodiments, the composition comprising 1,2-dichloro-1,2-difluoroethylene and R-1224ydZ has a temperature glide of about 0.4 K or less, for example, about 0.3 K or less, about 0.2 K or less, about 0.1 K or less, or about 0.05 K or less. In some embodiments, the composition comprising 1,2-dichloro-1,2-difluoroethylene and R-1224ydZ has a temperature glide of less than about 0.4 K.

In some embodiments, the composition comprising 1,2-dichloro-1,2-difluoroethylene and R-1224ydZ has a temperature glide of about 0.2 K or less. In some embodiments, the composition comprising 1,2-dichloro-1,2-difluoroethylene and R-1224ydZ has a temperature glide of less than about 0.2 K.

In some embodiments, the composition provided herein consists essentially of 1,2-dichloro-1,2-difluoroethylene and R-1224ydZ. In some embodiments, the composition provided herein consists of 1,2-dichloro-1,2-difluoroethylene and R-1224ydZ.

In some embodiments, the composition provided herein comprises 1,2-dichloro-1,2-difluoroethylene and R-1234zeZ.

In some embodiments, the composition comprises about 1 to about 99 weight percent R-1234zeZ, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1234zeZ.

In some embodiments, the composition comprises about 1 to about 99 weight percent 1,2-dichloro-1,2-difluoroethylene and about 99 to about 1 weight percent R-1234zeZ. In some embodiments, the composition comprises about 25 to about 90 weight percent 1,2-dichloro-1,2-difluoroethylene and about 75 to about 10 weight percent R-1234zeZ.

In some embodiments, the composition comprises about 1 to about 35 weight percent 1,2-dichloro-1,2-difluoroethylene and about 99 to about 65 weight percent R-1234zeZ. In some embodiments, the composition comprises about 1 to about 25 weight percent 1,2-dichloro-1,2-difluoroethylene and about 99 to about 75 weight percent R-1234zeZ.

In some embodiments, the composition comprising 1,2-dichloro-1,2-difluoroethylene and R-1234zeZ has a temperature glide of about 0.5 K or less, for example, about 0.4 K or less, about 0.3 K or less, about 0.2 K or less, about 0.1 K or less, or about 0.05 K or less. In some embodiments, the composition comprising 1,2-dichloro-1,2-difluoroethylene and R-1234zeZ has a temperature glide of less than about 0.5 K.

In some embodiments, the composition comprising 1,2-dichloro-1,2-difluoroethylene and R-1234zeZ has a temperature glide of about 0.2 K or less. In some embodiments, the composition comprising 1,2-dichloro-1,2-difluoroethylene and R-1234zeZ has a temperature glide of less than about 0.2 K.

In some embodiments, the composition provided herein consists essentially of 1,2-dichloro-1,2-difluoroethylene and R-1234zeZ. In some embodiments, the composition provided herein consists of 1,2-dichloro-1,2-difluoroethylene and R-1234zeZ.

In some embodiments, the composition provided herein comprises 1,2-dichloro-1,2-difluoroethylene and R-1336yf.

In some embodiments, the composition comprises about 1 to about 99 weight percent R-1336yf, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1336yf.

In some embodiments, the composition comprises about 35 to about 99 weight percent 1,2-dichloro-1,2-difluoroethylene and about 65 to about 1 weight percent R-1336yf. In some embodiments, the composition comprises about 55 to about 95 weight percent 1,2-dichloro-1,2-difluoroethylene and about 45 to about 5 weight percent R-1336yf. In some embodiments, the composition comprises about 1 to about 5 weight percent 1,2-dichloro-1,2-difluoroethylene and about 95 to about 99 weight percent R-1336yf.

In some embodiments, the composition comprises about 1 to about 30 weight percent 1,2-dichloro-1,2-difluoroethylene and about 99 to about 70 weight percent R-1336yf.

In some embodiments, the composition comprises about 95 to about 99 weight percent 1,2-dichloro-1,2-difluoroethylene and about 5 to about 1 weight percent R-1336yf. In some embodiments, the composition comprises about 1 to about 20 weight percent 1,2-dichloro-1,2-difluoroethylene and about 99 to about 80 weight percent R-1336yf.

In some embodiments, the composition comprising 1,2-dichloro-1,2-difluoroethylene and R-1336yf has a temperature glide of about 0.2 K or less, for example, about 0.1 K or less or about 0.05 K or less. In some embodiments, the composition comprising 1,2-dichloro-1,2-difluoroethylene and R-1336yf has a temperature glide of less than about 0.2 K.

In some embodiments, the composition comprising 1,2-dichloro-1,2-difluoroethylene and R-1336yf has a temperature glide of about 1 K or less, for example, about 0.5 K or less, about 0.25 K or less, about 0.1 K or less, or about 0.05 K or less. In some embodiments, the composition comprising 1,2-dichloro-1,2-difluoroethylene and R-1336yf has a temperature glide of less than about 1 K.

In some embodiments, the composition provided herein consists essentially of 1,2-dichloro-1,2-difluoroethylene and R-1336yf. In some embodiments, the composition provided herein consists of 1,2-dichloro-1,2-difluoroethylene and R-1336yf.

In some embodiments, the composition provided herein comprises 1,2-dichloro-1,2-difluoroethylene and R-1336zeE.

In some embodiments, the composition comprises about 1 to about 99 weight percent R-1336zeE, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1336zeE.

In some embodiments, the composition comprises about 1 to about 99 weight percent 1,2-dichloro-1,2-difluoroethylene and about 99 to about 1 weight percent R-1336zeE. In some embodiments, the composition comprises about 20 to about 90 weight percent 1,2-dichloro-1,2-difluoroethylene and about 80 to about 10 weight percent R-1336zeE.

In some embodiments, the composition comprises about 1 to about 40 weight percent 1,2-dichloro-1,2-difluoroethylene and about 99 to about 60 weight percent R-1336zeE. In some embodiments, the composition comprises about 85 to about 99 weight percent 1,2-dichloro-1,2-difluoroethylene and about 15 to about 1 weight percent R-1336zeE.

In some embodiments, the composition comprises about 1 to about 25 weight percent 1,2-dichloro-1,2-difluoroethylene and about 99 to about 75 weight percent R-1336zeE. In some embodiments, the composition comprises about 90 to about 99 weight percent 1,2-dichloro-1,2-difluoroethylene and about 10 to about 1 weight percent R-1336zeE.

In some embodiments, the composition comprising 1,2-dichloro-1,2-difluoroethylene and R-1336zeE has a temperature glide of about 1.5 K or less, for example, about 1 K or less, about 0.5 K or less, about 0.25 K or less, or about 0.1 K or less. In some embodiments, the composition comprising 1,2-dichloro-1,2-difluoroethylene and R-1336zeE has a temperature glide of less than about 1.5 K.

In some embodiments, the composition comprising 1,2-dichloro-1,2-difluoroethylene and R-1336zeE has a temperature glide of about 1 K or less. In some embodiments, the composition comprising 1,2-dichloro-1,2-difluoroethylene and R-1336zeE has a temperature glide of less than about 1 K.

In some embodiments, the composition provided herein consists essentially of 1,2-dichloro-1,2-difluoroethylene and R-1336zeE. In some embodiments, the composition provided herein consists of 1,2-dichloro-1,2-difluoroethylene and R-1336zeE.

In some embodiments, the composition provided herein comprises 1,2-dichloro-1,2-difluoroethylene and R-1234zeE.

In some embodiments, the composition comprises about 1 to about 99 weight percent R-1234zeE, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1234zeE.

In some embodiments, the composition comprises about 40 to about 70 weight percent 1,2-dichloro-1,2-difluoroethylene and about 60 to about 30 weight percent R-1234zeE. In some embodiments, the composition comprises about 40 to about 65 weight percent 1,2-dichloro-1,2-difluoroethylene and about 60 to about 35 weight percent R-1234zeE.

In some embodiments, the composition comprises about 1 to about 35 weight percent 1,2-dichloro-1,2-difluoroethylene and about 99 to about 65 weight percent R-1234zeE. In some embodiments, the composition comprises about 10 to about 30 weight percent 1,2-dichloro-1,2-difluoroethylene and about 90 to about 70 weight percent R-1234zeE.

In some embodiments, the composition comprises about 1 to about 20 weight percent 1,2-dichloro-1,2-difluoroethylene and about 99 to about 80 weight percent R-1234zeE. In some embodiments, the composition comprises about 90 to about 99 weight percent 1,2-dichloro-1,2-difluoroethylene and about 10 to about 1 weight percent R-1234zeE.

In some embodiments, the composition comprises about 1 to about 10 weight percent 1,2-dichloro-1,2-difluoroethylene and about 99 to about 90 weight percent R-1234zeE. In some embodiments, the composition comprises about 95 to about 99 weight percent 1,2-dichloro-1,2-difluoroethylene and about 5 to about 1 weight percent R-1234zeE.

In some embodiments, the composition comprising 1,2-dichloro-1,2-difluoroethylene and R-1234zeE has a temperature glide of about 8 K or less, for example, about 7 K or less, about 6 K or less, about 5 K or less, about 4 K or less, about 3 K or less, about 2 K or less, or about 1 K or less. In some embodiments, the composition comprising 1,2-dichloro-1,2-difluoroethylene and R-1234zeE has a temperature glide of less than about 8 K.

In some embodiments, the composition comprising 1,2-dichloro-1,2-difluoroethylene and R-1234zeE has a temperature glide of about 5 K or less. In some embodiments, the composition comprising 1,2-dichloro-1,2-difluoroethylene and R-1234zeE has a temperature glide of less than about 5 K.

In some embodiments, the composition provided herein consists essentially of 1,2-dichloro-1,2-difluoroethylene and R-1234zeE. In some embodiments, the composition provided herein consists of 1,2-dichloro-1,2-difluoroethylene and R-1234zeE.

In some embodiments, the composition provided herein comprises 1,2-dichloro-1,2-difluoroethylene and R-32.

In some embodiments, the composition comprises about 1 to about 99 weight percent R-32, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-32.

In some embodiments, the composition comprises about 90 to about 10 weight percent 1,2-dichloro-1,2-difluoroethylene and about 10 to about 90 weight percent R-32.

In some embodiments, the composition comprises about 95 to about 99 weight percent 1,2-dichloro-1,2-difluoroethylene and about 5 to about 1 weight percent R-32.

In some embodiments, the composition comprises about 80 to about 85 weight percent 1,2-dichloro-1,2-difluoroethylene and about 20 to about 15 weight percent R-32.

In some embodiments, the composition comprises about 45 to about 75 weight percent 1,2-dichloro-1,2-difluoroethylene and about 55 to about 25 weight percent R-32. In some embodiments, the composition comprises about 50 to about 65 weight percent 1,2-dichloro-1,2-difluoroethylene and about 50 to about 35 weight percent R-32.

In some embodiments, the composition comprises about 20 to about 40 weight percent 1,2-dichloro-1,2-difluoroethylene and about 80 to about 60 weight percent R-32.

In some embodiments, the composition comprises about 1 to about 15 weight percent 1,2-dichloro-1,2-difluoroethylene and about 99 to about 85 weight percent R-32.

In some embodiments, the composition comprises about 1 to about 10 weight percent 1,2-dichloro-1,2-difluoroethylene and about 99 to about 90 weight percent R-32.

In some embodiments, the composition comprising 1,2-dichloro-1,2-difluoroethylene and R-32 has a temperature glide of about 8 K or less, for example, about 7 K or less, about 6 K or less, about 5 K or less, about 4 K or less, about 3 K or less, about 2 K or less, or about 1 K or less. In some embodiments, the composition comprising 1,2-dichloro-1,2-difluoroethylene and R-32 has a temperature glide of less than about 8 K.

In some embodiments, the composition provided herein consists essentially of 1,2-dichloro-1,2-difluoroethylene and R-32. In some embodiments, the composition provided herein consists of 1,2-dichloro-1,2-difluoroethylene and R-32.

In some embodiments, the composition provided herein comprises 1,2-dichloro-1,2-difluoroethylene and R-134a.

In some embodiments, the composition comprises about 1 to about 99 weight percent R-134a, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-134a.

In some embodiments, the composition comprises about 85 to about 99 weight percent 1,2-dichloro-1,2-difluoroethylene and about 15 to about 1 weight percent R-134a. In some embodiments, the composition comprises about 90 to about 95 weight percent 1,2-dichloro-1,2-difluoroethylene and about 10 to about 5 weight percent R-134a.

In some embodiments, the composition comprises about 55 to about 65 weight percent 1,2-dichloro-1,2-difluoroethylene and about 45 to about 35 weight percent R-134a. In some embodiments, the composition comprises about 60 to about 65 weight percent 1,2-dichloro-1,2-difluoroethylene and about 40 to about 35 weight percent R-134a.

In some embodiments, the composition comprises about 25 to about 50 weight percent 1,2-dichloro-1,2-difluoroethylene and about 75 to about 50 weight percent R-134a. In some embodiments, the composition comprises about 35 to about 50 weight percent 1,2-dichloro-1,2-difluoroethylene and about 65 to about 50 weight percent R-134a.

In some embodiments, the composition comprises about 1 to about 25 weight percent 1,2-dichloro-1,2-difluoroethylene and about 99 to about 75 weight percent R-134a.

In some embodiments, the composition comprises about 1 to about 15 weight percent 1,2-dichloro-1,2-difluoroethylene and about 99 to about 85 weight percent R-134a. In some embodiments, the composition comprises about 9 to about 99 weight percent 1,2-dichloro-1,2-difluoroethylene and about 91 to about 1 weight percent R-134a.

In some embodiments, the composition comprising 1,2-dichloro-1,2-difluoroethylene and R-134a has a temperature glide of about 8 K or less, for example, about 7 K or less, about 6 K or less, about 5 K or less, about 4 K or less, about 3 K or less, about 2 K or less, or about 1 K or less. In some embodiments, the composition comprising 1,2-dichloro-1,2-difluoroethylene and R-134a has a temperature glide of less than about 8 K.

In some embodiments, the composition provided herein consists essentially of 1,2-dichloro-1,2-difluoroethylene and R-134a. In some embodiments, the composition provided herein consists of 1,2-dichloro-1,2-difluoroethylene and R-134a.

In some embodiments, the composition provided herein comprises 1,2-dichloro-1,2-difluoroethylene and R-1234yf.

In some embodiments, the composition comprises about 1 to about 99 weight percent R-1234yf, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1234yf.

In some embodiments, the composition comprises about 80 to about 99 weight percent 1,2-dichloro-1,2-difluoroethylene and about 20 to about 1 weight percent R-1234yf. In some embodiments, the composition comprises about 90 to about 95 weight percent 1,2-dichloro-1,2-difluoroethylene and about 10 to about 5 weight percent R-1234yf.

In some embodiments, the composition comprises about 55 to about 75 weight percent 1,2-dichloro-1,2-difluoroethylene and about 45 to about 25 weight percent R-1234yf.

In some embodiments, the composition comprises about 20 to about 50 weight percent 1,2-dichloro-1,2-difluoroethylene and about 80 to about 50 weight percent R-1234yf. In some embodiments, the composition comprises about 30 to about 50 weight percent 1,2-dichloro-1,2-difluoroethylene and about 70 to about 50 weight percent R-1234yf.

In some embodiments, the composition comprises about 1 to about 20 weight percent 1,2-dichloro-1,2-difluoroethylene and about 99 to about 80 weight percent R-1234yf.

In some embodiments, the composition comprises about 1 to about 10 weight percent 1,2-dichloro-1,2-difluoroethylene and about 99 to about 90 weight percent R-1234yf.

In some embodiments, the composition comprises about 1 to about 15 weight percent 1,2-dichloro-1,2-difluoroethylene and about 99 to about 85 weight percent R-1234yf. In some embodiments, the composition comprises about 9 to about 99 weight percent 1,2-dichloro-1,2-difluoroethylene and about 91 to about 1 weight percent R-1234yf.

In some embodiments, the composition comprising 1,2-dichloro-1,2-difluoroethylene and R-1234yf has a temperature glide of about 8 K or less, for example, about 7 K or less, about 6 K or less, about 5 K or less, about 4 K or less, about 3 K or less, about 2 K or less, or about 1 K or less. In some embodiments, the composition comprising 1,2-dichloro-1,2-difluoroethylene and R-1234yf has a temperature glide of less than about 8 K.

In some embodiments, the composition provided herein consists essentially of 1,2-dichloro-1,2-difluoroethylene and R-1234yf. In some embodiments, the composition provided herein consists of 1,2-dichloro-1,2-difluoroethylene and R-1234yf.

In some embodiments, the composition provided herein comprises 1,2-dichloro-1,2-difluoroethylene and trans-1,2-dichloroethylene.

In some embodiments, the composition comprises about 1 to about 99 weight percent trans-1,2-dichloroethylene, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent trans-1,2-dichloroethylene.

In some embodiments, the composition comprises about 1 to about 99 weight percent 1,2-dichloro-1,2-difluoroethylene and about 99 to about 1 weight percent trans-1,2-dichloroethylene. In some embodiments, the composition comprises about 55 to about 90 weight percent 1,2-dichloro- 1,2-difluoroethylene and about 45 to about 10 weight percent trans-1,2-dichloroethylene.

In some embodiments, the composition comprises about 1 to about 25 weight percent 1,2-dichloro-1,2-difluoroethylene and about 99 to about 75 weight percent trans-1,2-dichloroethylene. In some embodiments, the composition comprises about 75 to about 99 weight percent 1,2-dichloro-1,2-difluoroethylene and about 25 to about 1 weight percent trans-1,2-dichloroethylene.

In some embodiments, the composition comprises about 1 to about 10 weight percent 1,2-dichloro-1,2-difluoroethylene and about 99 to about 90 weight percent trans-1,2-dichloroethylene. In some embodiments, the composition comprises about 90 to about 99 weight percent 1,2-dichloro-1,2-difluoroethylene and about 10 to about 1 weight percent trans-1,2-dichloroethylene.

In some embodiments, the composition comprising 1,2-dichloro-1,2-difluoroethylene and trans-1,2-dichloroethylene has a temperature glide of about 5 K or less, for example, about 4 K or less, about 3 K or less, about 2 K or less, or about 1 K or less. In some embodiments, the composition comprising 1,2-dichloro-1,2-difluoroethylene and trans-1,2-dichloroethylene has a temperature glide of less than about 5 K.

In some embodiments, the composition comprising 1,2-dichloro-1,2-difluoroethylene and trans-1,2-dichloroethylene has a temperature glide of about 3 K or less. In some embodiments, the composition comprising 1,2-dichloro-1,2-difluoroethylene and trans-1,2-dichloroethylene has a temperature glide of less than about 3 K.

In some embodiments, the composition provided herein consists essentially of 1,2-dichloro-1,2-difluoroethylene and trans-1,2-dichloroethylene. In some embodiments, the composition provided herein consists of 1,2-dichloro-1,2-difluoroethylene and trans-1,2-dichloroethylene.

In some embodiments, the composition provided herein comprises 1,2-dichloro-1,2-difluoroethylene and R-152a.

In some embodiments, the composition comprises about 1 to about 99 weight percent R-152a, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-152a.

In some embodiments, the composition comprises about 85 to about 99 weight percent 1,2-dichloro-1,2-difluoroethylene and about 15 to about 1 weight percent R-152a. In some embodiments, the composition comprises about 90 to about 95 weight percent 1,2-dichloro-1,2-difluoroethylene and about 10 to about 5 weight percent R-152a.

In some embodiments, the composition comprises about 60 to about 80 weight percent 1,2-dichloro-1,2-difluoroethylene and about 40 to about 20 weight percent R-152a. In some embodiments, the composition comprises about 65 to about 80 weight percent 1,2-dichloro-1,2-difluoroethylene and about 35 to about 20 weight percent R-152a.

In some embodiments, the composition comprises about 25 to about 55 weight percent 1,2-dichloro-1,2-difluoroethylene and about 75 to about 45 weight percent R-152a. In some embodiments, the composition comprises about 35 to about 55 weight percent 1,2-dichloro-1,2-difluoroethylene and about 65 to about 45 weight percent R-152a.

In some embodiments, the composition comprises about 1 to about 25 weight percent 1,2-dichloro-1,2-difluoroethylene and about 99 to about 75 weight percent R-152a. In some embodiments, the composition comprises about 1 to about 10 weight percent 1,2-dichloro-1,2-difluoroethylene and about 99 to about 90 weight percent R-152a.

In some embodiments, the composition comprises about 1 to about 15 weight percent 1,2-dichloro-1,2-difluoroethylene and about 99 to about 85 weight percent R-152a.

In some embodiments, the composition comprising 1,2-dichloro-1,2-difluoroethylene and R-152a has a temperature glide of about 8 K or less, for example, about 7 K or less, about 6 K or less, about 5 K or less, about 4 K or less, about 3 K or less, about 2 K or less, or about 1 K or less. In some embodiments, the composition comprising 1,2-dichloro-1,2-difluoroethylene and R-152a has a temperature glide of less than about 8 K.

In some embodiments, the composition comprising 1,2-dichloro-1,2-difluoroethylene and R-152a has a temperature glide of about 5 K or less. In some embodiments, the composition comprising 1,2-dichloro-1,2-difluoroethylene and R-152a has a temperature glide of less than about 5 K.

In some embodiments, the composition provided herein consists essentially of 1,2-dichloro-1,2-difluoroethylene and R-152a. In some embodiments, the composition provided herein consists of 1,2-dichloro-1,2-difluoroethylene and R-152a.

In some embodiments, the composition provided herein comprises 1,2-dichloro-1,2-difluoroethylene and R-134.

In some embodiments, the composition comprises about 1 to about 99 weight percent R-134, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-134.

In some embodiments, the composition comprises about 80 to about 99 weight percent 1,2-dichloro-1,2-difluoroethylene and about 20 to about 1 weight percent R-134. In some embodiments, the composition comprises about 85 to about 95 weight percent 1,2-dichloro-1,2-difluoroethylene and about 15 to about 5 weight percent R-134.

In some embodiments, the composition comprises about 45 to about 75 weight percent 1,2-dichloro-1,2-difluoroethylene and about 55 to about 25 weight percent R-134. In some embodiments, the composition comprises about 50 to about 70 weight percent 1,2-dichloro-1,2-difluoroethylene and about 50 to about 30 weight percent R-134.

In some embodiments, the composition comprises about 10 to about 40 weight percent 1,2-dichloro-1,2-difluoroethylene and about 90 to about 60 weight percent R-134. In some embodiments, the composition comprises about 20 to about 40 weight percent 1,2-dichloro-1,2-difluoroethylene and about 80 to about 60 weight percent R-134.

In some embodiments, the composition comprises about 1 to about 10 weight percent 1,2-dichloro-1,2-difluoroethylene and about 99 to about 90 weight percent R-134.

In some embodiments, the composition comprises about 1 to about 20 weight percent 1,2-dichloro-1,2-difluoroethylene and about 99 to about 80 weight percent R-134. In some embodiments, the composition comprises about 90 to about 99 weight percent 1,2-dichloro-1,2-difluoroethylene and about 10 to about 1 weight percent R-134.

In some embodiments, the composition comprises about 1 to about 15 weight percent 1,2-dichloro-1,2-difluoroethylene and about 99 to about 85 weight percent R-134. In some embodiments, the composition comprises about 95 to about 99 weight percent 1,2-dichloro-1,2-difluoroethylene and about 5 to about 1 weight percent R-134.

In some embodiments, the composition comprising 1,2-dichloro-1,2-difluoroethylene and R-134 has a temperature glide of about 8 K or less, for example, about 7 K or less, about 6 K or less, about 5 K or less, about 4 K or less, about 3 K or less, about 2 K or less, or about 1 K or less. In some embodiments, the composition comprising 1,2-dichloro-1,2-difluoroethylene and R-134 has a temperature glide of less than about 8 K.

In some embodiments, the composition comprising 1,2-dichloro-1,2-difluoroethylene and R-134 has a temperature glide of about 5 K or less. In some embodiments, the composition comprising 1,2-dichloro-1,2-difluoroethylene and R-134 has a temperature glide of less than about 5 K.

In some embodiments, the composition provided herein consists essentially of 1,2-dichloro-1,2-difluoroethylene and R-134. In some embodiments, the composition provided herein consists of 1,2-dichloro-1,2-difluoroethylene and R-134.

In some embodiments, the composition provided herein comprises 1,2-dichloro-1,2-difluoroethylene and R-125.

In some embodiments, the composition comprises about 1 to about 99 weight percent R-125, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-125.

In some embodiments, the composition comprises about 90 to about 99 weight percent 1,2-dichloro-1,2-difluoroethylene and about 10 to about 1 weight percent R-125. In some embodiments, the composition comprises about 95 to about 99 weight percent 1,2-dichloro-1,2-difluoroethylene and about 5 to about 1 weight percent R-125.

In some embodiments, the composition comprises about 75 to about 85 weight percent 1,2-dichloro-1,2-difluoroethylene and about 25 to about 15 weight percent R-125. In some embodiments, the composition comprises about 80 to about 85 weight percent 1,2-dichloro-1,2-difluoroethylene and about 20 to about 15 weight percent R-125.

In some embodiments, the composition comprises about 55 to about 65 weight percent 1,2-dichloro-1,2-difluoroethylene and about 45 to about 35 weight percent R-125. In some embodiments, the composition comprises about 60 to about 65 weight percent 1,2-dichloro-1,2-difluoroethylene and about 40 to about 35 weight percent R-125.

In some embodiments, the composition comprises about 20 to about 50 weight percent 1,2-dichloro-1,2-difluoroethylene and about 80 to about 50 weight percent R-125. In some embodiments, the composition comprises about 25 to about 40 weight percent 1,2-dichloro-1,2-difluoroethylene and about 75 to about 60 weight percent R-125.

In some embodiments, the composition comprises about 1 to about 15 weight percent 1,2-dichloro-1,2-difluoroethylene and about 99 to about 85 weight percent R-125.

In some embodiments, the composition provided herein consists essentially of 1,2-dichloro-1,2-difluoroethylene and R-125. In some embodiments, the composition provided herein consists of 1,2-dichloro-1,2-difluoroethylene and R-125.

In some embodiments, the composition provided herein comprises 1,2-dichloro-1,2-difluoroethylene and R-1123.

In some embodiments, the composition comprises about 1 to about 99 weight percent R-1123, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent R-1123.

In some embodiments, the composition comprises about 95 to about 99 weight percent 1,2-dichloro-1,2-difluoroethylene and about 5 to about 1 weight percent R-1123.

In some embodiments, the composition comprises about 85 to about 90 weight percent 1,2-dichloro-1,2-difluoroethylene and about 15 to about 10 weight percent R-1123.

In some embodiments, the composition comprises about 75 to about 80 weight percent 1,2-dichloro-1,2-difluoroethylene and about 25 to about 20 weight percent R-1123.

In some embodiments, the composition comprises about 45 to about 70 weight percent 1,2-dichloro-1,2-difluoroethylene and about 55 to about 30 weight percent R-1123. In some embodiments, the composition comprises about 50 to about 65 weight percent 1,2-dichloro-1,2-difluoroethylene and about 50 to about 35 weight percent R-1123.

In some embodiments, the composition comprises about 15 to about 40 weight percent 1,2-dichloro-1,2-difluoroethylene and about 85 to about 60 weight percent R-1123. In some embodiments, the composition comprises about 20 to about 35 weight percent 1,2-dichloro-1,2-difluoroethylene and about 80 to about 65 weight percent R-1123.

In some embodiments, the composition comprises about 1 to about 10 weight percent 1,2-dichloro-1,2-difluoroethylene and about 99 to about 90 weight percent R-1123.

Methods of Use

The compositions provided herein can act as a working fluid used to carry heat from a heat source to a heat sink. Such heat transfer compositions may also be useful as a refrigerant in a cycle wherein the fluid undergoes a phase change; that is, from a liquid to a gas and back, or vice versa. Examples of heat transfer systems include but are not limited to air conditioners, freezers, refrigerators, heat pumps, water chillers, flooded evaporator chillers, direct expansion chillers, walk-in coolers, high temperature heat pumps, mobile refrigerators, mobile air conditioning units, immersion cooling systems, data-center cooling systems, and combinations thereof. Accordingly, the present application provides a heat transfer system (e.g., a heat transfer apparatus) as described herein, comprising a composition provided herein. In some embodiments, the composition provided herein is useful as a working fluid (e.g., a working fluid for refrigeration or heating applications) in the heat transfer apparatus. In some embodiments, the compositions provided herein are useful in an apparatus or system comprising a high temperature heat pump. In some embodiments, the high temperature heat pump comprises a centrifugal compressor. In some embodiments, the compositions provided herein are useful in an apparatus or system comprising a chiller apparatus. In some embodiments, the compositions provided herein are useful in an apparatus or system comprising a centrifugal chiller apparatus. In some embodiments, the compositions provided herein are useful in a centrifugal high temperature heat pump.

Mechanical vapor-compression refrigeration, air conditioning and heat pump systems include an evaporator, a compressor, a condenser, and an expansion device. A refrigeration cycle re-uses refrigerant in multiple steps producing a cooling effect in one step and a heating effect in a different step. The cycle can be described as follows: Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

A body to be cooled or heated may be defined as any space, location, object or body for which it is desirable to provide cooling or heating. Examples include spaces (open or enclosed) requiring air conditioning, cooling, or heating, such as a room, an apartment, or building, such as an apartment building, university dormitory, townhouse, or other attached house or single family home, hospitals, office buildings, supermarkets, college or university classrooms or administration buildings and automobile or truck passenger compartments. Additionally, a body to be cooled may include electronic devices, such as computer equipment, central processing units (cpu), data-centers, server banks, and personal computers among others.

By "in the vicinity of" is meant that the evaporator of the system containing the refrigerant composition is located either within or adjacent to the body to be cooled, such that air moving over the evaporator would move into or around the body to be cooled. In the process for producing heating, "in the vicinity of" means that the condenser of the system containing the refrigerant composition is located either within or adjacent to the body to be heated, such that the air moving over the evaporator would move into or around the body to be heated. In some embodiments, for heat transfer, "in the vicinity of" may mean that the body to be cooled is immersed directly in the heat transfer composition or tubes containing heat transfer compositions run into around internally, and out of electronic equipment, for instance.

Exemplary refrigeration systems include, but are not limited to, equipment including commercial, industrial or residential refrigerators and freezers, ice machines, self-contained coolers and freezers, vending machines, flooded evaporator chillers, direct expansion chillers, water chiller, screw chillers, scroll chillers, centrifugal chillers, walk-in and reach-in coolers and freezers, and combination systems. In some embodiments, the compositions provided herein may be used in supermarket refrigeration systems. Additionally, stationary applications may utilize a secondary loop system that uses a primary refrigerant to produce cooling in one location that is transferred to a remote location via a secondary heat transfer fluid.

In some embodiments, the compositions provided herein are useful in mobile heat transfer systems, including refrigeration, air conditioning, or heat pump systems or apparatus. In some embodiments, the compositions are useful in stationary heat transfer systems, including refrigeration, air conditioning, or heat pump systems or apparatus.

As used herein, mobile refrigeration, air conditioning, or heat pump systems refers to any refrigeration, air conditioner, or heat pump apparatus incorporated into a transportation unit for the road, rail, sea or air. Mobile air conditioning or heat pumps systems may be used in automobiles, trucks, railcars or other transportation systems. Mobile refrigeration may include transport refrigeration in trucks, airplanes, or rail cars. In addition, apparatus which are meant to provide refrigeration for a system independent of any moving carrier, known as "intermodal" systems, are including in the present inventions. Such intermodal systems include "containers" (combined sea/land transport) as well as "swap bodies" (combined road and rail transport).

As used herein, stationary air conditioning or heat pump systems are systems that are fixed in place during operation. A stationary air conditioning or heat pump system may be associated within or attached to buildings of any variety. These stationary applications may be stationary air conditioning and heat pumps, including but not limited to chillers, heat pumps, including residential and high temperature heat pumps, residential, commercial or industrial air conditioning systems, and including window, ductless, ducted, packaged terminal, and those exterior but connected to the building such as rooftop systems.

In some embodiments, a method is provided for using the present compositions as a heat transfer fluid. The method comprises transporting said composition from a heat source to a heat sink.

Stationary heat transfer may refer to systems for cooling electronic devices, such as immersion cooling systems, submersion cooling systems, phase change cooling systems, data-center cooling systems or simply liquid cooling systems. Immersion cooling systems may be used to cool electronic devices, such as datacenter servers, insulated-gate bipolar transistor (IGBT) devices, telecommunication infrastructure, military electronics, televisions (TVs), cell phones, monitors, drones, automotive batteries, powertrains for electric vehicles (EVs), avionics devices, power devices and displays. Immersion cooling systems are heat transfer devices wherein there is no compressor. The object to be cooled is at least partially immersed in (in direct contact with) the heat transfer fluid contained in a vessel. In some embodiments, the heat transfer fluid may evaporate and condense in the vessel. In other embodiments, there may be no phase transition involved.

Stationary heat transfer may refer to systems for cooling electronic devices, such as heat pipe systems, including constant conductance heat pipes and thermosyphon heat pipes. Heat pipes may be used for cooling televisions, cell phones, computer displays, such as computer monitors, lap top computers and hand-held tablet-type devices and also for automotive batteries, power trains for electric vehicles (EVs), avionics, power devices and displays. Generally, heat pipes are heat transfer devices with no compressor. They are simply devices with 2 regions, one region where the heat transfer fluid is evaporated due to absorption of heat, and a second region where that heat is expelled due to condensation of the heat transfer fluid.

In some embodiments, a method is provided for producing cooling comprising evaporating any of the present compounds or compositions in the vicinity of a body to be cooled, and thereafter condensing said composition.

In some embodiments, a method is provided for producing heating comprising condensing any of the present compositions in the vicinity of a body to be heated, and thereafter evaporating said compositions.

In some embodiments, the composition is for use in heat transfer, wherein the working fluid is a heat transfer component.

In some embodiments, the compositions of the invention are for use in refrigeration or air conditioning.

In some embodiments, the refrigerant or air conditioning composition further comprises one or more compounds selected from 1,1,1-trifluoroethane (HFC-143a), 1,1,1,2,3,3,3-heptafluoropropane (HFC-227ea), 3,3,3-trifluoropropene (HFO-1243zf), (E)-1,2,3,3-tetrafluoropropene (E-HFO-1234ye), (Z)-1,2,3,3-tetrafluoropropene (Z-HFO-1234ye), (E)-1,1,1,4,4,5,5,5-octafluoro-2-pentene (E-HFO-1438mzz), (Z)-1,1,1,4,4,5,5,5-octafluoro-2-pentene (Z-HFO-1438mzz), (E)-1,3,4,4,4-pentafluoro-3-(trifluoromethyl)but-1-ene (E-HFO-1438ezy), (Z)-1,3,4,4,4-pentafluoro-3-(trifluoromethyl)but-1-ene (Z-HFO-1438ezy), 1,1,1,3,3-pentafluoropropane (HFC-245fa), 1-methoxyheptafluoropropane (HFE-7000), 1,1,1,3,3-pentafluorobutane (HFC-365mfc), 1,1,1,2,2,3,3,4,4-nonafluoro-4-methoxybutane (HFE-7100), 2-bromo-1,1,1-trifluoro-2-propene, E-1,2-dichloro-1,2-difluoroethylene, Z-1,2-dichloro-1,2-difluoroethylene, perfluoroethyl perfluoroisopropyl ketone (F-ethyl isopropyl ketone), E-HFO-1,2,3,3,3-pentafluoropropene (E-HFO-1225ye), Z-HFO-1,2,3,3,3-pentafluoropropene (Z-HFO-1225ye), $CF_3I$, carbon dioxide, nitrogen, and argon.

In some embodiments, compositions of the present invention may be useful for reducing or eliminating the flammability of flammable refrigerants provided herein (e.g., difluoromethane, 1,1-difluoroethane, R-1234yf, R-1234zeE, 2,3,3,3-tetrafluoroprop-1-ene, (E)-1,2,3,3-tetrafluoropropene (E-HFO-1234ye), and (Z)-1,2,3,3-tetrafluoropropene (Z-HFO-1234ye). In some embodiments, the present application provided herein is a method for reducing the flammability of a flammable refrigerant comprising adding a composition comprising a composition as disclosed herein to a flammable refrigerant.

The compositions provided herein may be useful as a replacement for a currently used ("incumbent") refrigerant, including but not limited to R-123 (or HFC-123, 2,2-dichloro-1,1,1-trifluoroethane), R-11 (or CFC-11, trichlorofluoromethane), R-12 (or CFC-12, dichlorodifluoromethane), R-22 (chlorodifluoromethane), R-114 (or CFC-114, 1,2-dichloro-1,1,2,2-tetrafluoroethane), R-236fa (or HFC-236fa, 1,1,1,3,3,3-hexafluoropropane), R-236ea (or HFC-236ea, 1,1,1,2,3,3-hexafluoropropane), R-124 (or HCFC-124, 2-chloro-1,1,1,2-tetrafluoroethane), R-245fa, R-134a, R-410A, R-407C, R-404A, among others.

As used herein, the term "incumbent refrigerant" shall be understood to mean the refrigerant for which the heat transfer system was designed to operate, or the refrigerant that is resident in the heat transfer system.

Often replacement refrigerants are most useful if capable of being used in the original refrigeration equipment designed for a different refrigerant, e.g., with minimal to no system modifications. In many applications, some embodiments of the disclosed compositions are useful as refrigerants and provide at least comparable cooling performance (meaning cooling capacity) as the refrigerant for which a replacement is being sought. In some embodiments, the replacement refrigerant provided herein (i.e., the composition provided herein) exhibits a cooling capacity that is within about ±15% of the cooling capacity of the incumbent refrigerant.

In some embodiments, the incumbent refrigerant is selected from R-123, R-245fa, R-236fa, R-124, R-134a, R-22, and R-401A.

In some embodiments, the incumbent refrigerant is R-123 and the replacement refrigerant is selected from a composition provided herein, comprising:

1,2-dichloro-1,2-difluoroethylene and R-1336mzzZ; or
1,2-dichloro-1,2-difluoroethylene and n-pentane; or
1,2-dichloro-1,2-difluoroethylene and i-pentane; or
1,2-dichloro-1,2-difluoroethylene and trans-1,2-dichloroethylene.

In some embodiments, the replacement refrigerant exhibits a cooling capacity that is within about ±15% of the cooling capacity of the R-123.

In some embodiments, the incumbent refrigerant is R-245fa and the replacement refrigerant is selected from a composition provided herein, comprising:

1,2-dichloro-1,2-difluoroethylene and R-245fa; or
1,2-dichloro-1,2-difluoroethylene and R-1233zdE; or
1,2-dichloro-1,2-difluoroethylene and i-pentane; or
1,2-dichloro-1,2-difluoroethylene and R-1336mzzE; or
1,2-dichloro-1,2-difluoroethylene and R-1336zeE; or
1,2-dichloro-1,2-difluoroethylene and R-1224ydZ; or
1,2-dichloro-1,2-difluoroethylene and R-1234zeZ; or
1,2-dichloro-1,2-difluoroethylene and R-1234zeE; or
1,2-dichloro-1,2-difluoroethylene and R-1336yf; or
1,2-dichloro-1,2-difluoroethylene and R-32; or
1,2-dichloro-1,2-difluoroethylene and R-125; or
1,2-dichloro-1,2-difluoroethylene and R-134a; or
1,2-dichloro-1,2-difluoroethylene and R-1234yf; or
1,2-dichloro-1,2-difluoroethylene and R-152a; or
1,2-dichloro-1,2-difluoroethylene and R-134; or
1,2-dichloro-1,2-difluoroethylene and R-1123.

In some embodiments, the method comprises replacing the R-245fa in a high temperature heat pump with the replacement refrigerant composition provided herein. In some embodiments, the high temperature heat pump is a centrifugal high temperature heat pump.

In some embodiments, the high temperature heat pump comprises a condenser operating at a temperature greater than about 50° C. In some embodiments, the high temperature heat pump comprises a condenser operating at a temperature greater than about 100° C. In some embodiments, the high temperature heat pump comprises a condenser operating at a temperature greater than about 120° C. In some embodiments, the high temperature heat pump comprises a condenser operating at a temperature greater than about 150° C.

In some embodiments, the replacement refrigerant comprises 1,2-dichloro-1,2-difluoroethylene and R-1234zeE. In some embodiments, the replacement refrigerant comprises about 80 to about 85 wt % 1,2-dichloro-1,2-difluoroethylene and about 20 to about 15 wt % R-1234zeE. In some embodiments, the replacement refrigerant comprises about 81 wt % 1,2-dichloro-1,2-difluoroethylene and about 19 wt % R-1234zeE. In some embodiments, the replacement refrigerant exhibits a cooling capacity that is within about ±15% of the cooling capacity of the R-245fa. In some embodiments, the replacement refrigerant exhibits a coefficient of performance for heating (COP) that is within about ±5% of the COP of the R-245fa. In some embodiments, the replacement refrigerant exhibits a COP that is within about ±3% of the COP of the R-245fa.

In some embodiments, the replacement refrigerant comprises 1,2-dichloro-1,2-difluoroethylene and R-245fa. In some embodiments, the replacement refrigerant comprises about 80 to about 85 wt % 1,2-dichloro-1,2-difluoroethylene and about 20 to about 15 wt % R-245fa. In some embodiments, the replacement refrigerant comprises about 85 wt % 1,2-dichloro-1,2-difluoroethylene and about 15 wt % R-245fa. In some embodiments, the replacement refrigerant exhibits a cooling capacity that is within about ±15% of the cooling capacity of the R-245fa. In some embodiments, the replacement refrigerant exhibits a coefficient of performance for heating (COP) that is within about ±5% of the COP of the R-245fa. In some embodiments, the replacement refrigerant exhibits a COP that is within about ±3% of the COP of the R-245fa.

In some embodiments, the replacement refrigerant exhibits a COP that is about equal to the COP of the R-245fa.

In some embodiments, the incumbent refrigerant is R-236fa and the replacement refrigerant is selected from a composition provided herein, comprising:
1,2-dichloro-1,2-difluoroethylene and R-1336yf; or
1,2-dichloro-1,2-difluoroethylene and R-1234zeE; or
1,2-dichloro-1,2-difluoroethylene and R-32; or
1,2-dichloro-1,2-difluoroethylene and R-125; or
1,2-dichloro-1,2-difluoroethylene and R-134a; or
1,2-dichloro-1,2-difluoroethylene and R-1234yf; or
1,2-dichloro-1,2-difluoroethylene and R-152a; or
1,2-dichloro-1,2-difluoroethylene and R-134; or
1,2-dichloro-1,2-difluoroethylene and R-1123.

In some embodiments, the replacement refrigerant exhibits a cooling capacity that is within about ±15% of the cooling capacity of the R-236fa.

In some embodiments, the incumbent refrigerant is R-124 and the replacement refrigerant is selected from a composition provided herein, comprising:
1,2-dichloro-1,2-difluoroethylene and R-1234zeE; or
1,2-dichloro-1,2-difluoroethylene and R-32; or
1,2-dichloro-1,2-difluoroethylene and R-125; or
1,2-dichloro-1,2-difluoroethylene and R-134a; or
1,2-dichloro-1,2-difluoroethylene and R-1234yf; or
1,2-dichloro-1,2-difluoroethylene and R-152a; or
1,2-dichloro-1,2-difluoroethylene and R-134; or
1,2-dichloro-1,2-difluoroethylene and R-1123.

In some embodiments, the replacement refrigerant exhibits a cooling capacity that is within about ±15% of the cooling capacity of the R-124.

In some embodiments, the incumbent refrigerant is R-134a and the replacement refrigerant is selected from a composition provided herein, comprising:
1,2-dichloro-1,2-difluoroethylene and R-32; or
1,2-dichloro-1,2-difluoroethylene and R-125; or
1,2-dichloro-1,2-difluoroethylene and R-134a; or
1,2-dichloro-1,2-difluoroethylene and R-1234yf; or
1,2-dichloro-1,2-difluoroethylene and R-152a; or
1,2-dichloro-1,2-difluoroethylene and R-134; or
1,2-dichloro-1,2-difluoroethylene and R-1123.

In some embodiments, the replacement refrigerant exhibits a cooling capacity that is within about ±15% of the cooling capacity of the R-134a.

In some embodiments, the incumbent refrigerant is R-22 and the replacement refrigerant is selected from a composition provided herein, comprising:
1,2-dichloro-1,2-difluoroethylene and R-32; or
1,2-dichloro-1,2-difluoroethylene and R-125; or
1,2-dichloro-1,2-difluoroethylene and R-1123.

In some embodiments, the replacement refrigerant exhibits a cooling capacity that is within about ±15% of the cooling capacity of the R-22.

In some embodiments, the incumbent refrigerant is R-410a and the replacement refrigerant is selected from a composition provided herein, comprising:
1,2-dichloro-1,2-difluoroethylene and R-32; or
1,2-dichloro-1,2-difluoroethylene and R-1123.

In some embodiments, the replacement refrigerant exhibits a cooling capacity that is within about ±15% of the cooling capacity of the R-410a.

In some embodiments, the present application provides a method for improving energy efficiency of a heat transfer system or apparatus comprising an incumbent refrigerant, comprising substantially replacing the incumbent refrigerant with a replacement refrigerant composition provided herein, thereby improving the efficiency of the heat transfer system. In some embodiments, the heat transfer system is a chiller system or chiller apparatus provided herein. In some embodiments, the replacement refrigerant composition comprises 1,2-dichloro-1,2-difluoroethylene. In some embodiments, the replacement refrigerant composition consists essentially of 1,2-dichloro-1,2-difluoroethylene. In some embodiments, the replacement refrigerant composition consists of 1,2-dichloro-1,2-difluoroethylene.

In some embodiments, the method comprises substantially replacing an incumbent refrigerant which is R-123 with a replacement refrigerant composition provided herein, thereby improving the efficiency of the heat transfer system. In some embodiments, the replacement refrigerant composition comprises 1,2-dichloro-1,2-difluoroethylene. In some embodiments, the replacement refrigerant composition consists essentially of 1,2-dichloro-1,2-difluoroethylene. In some embodiments, the replacement refrigerant composition consists of 1,2-dichloro-1,2-difluoroethylene.

In some embodiments, the method comprises substantially replacing an incumbent refrigerant which is R-1233zdE with a replacement refrigerant composition provided herein, thereby improving the efficiency of the heat transfer system. In some embodiments, the replacement refrigerant composition comprises 1,2-dichloro-1,2-difluoroethylene. In some embodiments, the replacement refrigerant composition consists essentially of 1,2-dichloro-1,2-difluoroethylene. In some embodiments, the replacement refrigerant composition consists of 1,2-dichloro-1,2-difluoroethylene.

In some embodiments, the method comprises substantially replacing an incumbent refrigerant which is R-1224ydZ with a replacement refrigerant composition provided herein, thereby improving the efficiency of the heat transfer system. In some embodiments, the replacement refrigerant composition comprises 1,2-dichloro-1,2-difluoroethylene. In some embodiments, the replacement refrigerant composition consists essentially of 1,2-dichloro-1,2-difluoroethylene. In some embodiments, the replacement refrigerant composition consists of 1,2-dichloro-1,2-difluoroethylene.

In some embodiments is provided a method for operating a heat transfer system or for transferring heat that is designed to operate with an incumbent refrigerant by charging an empty system with a composition of the present invention, or by substantially replacing said incumbent refrigerant with a composition of the present invention.

As used herein, the term "substantially replacing" shall be understood to mean allowing the incumbent refrigerant to drain from the system, or pumping the incumbent refrigerant from the system, and then charging the system with a composition of the present invention. The system may be flushed with one or more quantities of the replacement refrigerant before being charged. It shall be understood that in some embodiments, some small quantity of the incumbent refrigerant may be present in the system after the system has been charged with the composition of the present invention.

In another embodiment is provided a method for recharging a heat transfer system that contains an incumbent refrigerant and a lubricant, said method comprising substantially removing the incumbent refrigerant from the heat transfer system while retaining a substantial portion of the lubricant in said system and introducing one of the present compositions to the heat transfer system. In some embodiments, the lubricant in the system is partially replaced.

In some embodiments, the compositions of the present invention may be used to top-off a refrigerant charge in a chiller. For example, if a chiller using HCFC-123 has diminished performance due to leakage of refrigerant, the compositions as disclosed herein may be added to bring performance back up to specification.

In some embodiments, a heat exchange system containing any the presently disclosed compositions is provided, wherein said system is selected from the group consisting of air conditioners, freezers, refrigerators, heat pumps, water chillers, flooded evaporator chillers, direct expansion chillers, walk-in coolers, heat pumps, mobile refrigerators, mobile air conditioning units, and systems having combinations thereof. Additionally, the compositions provided herein may be useful in secondary loop systems wherein these compositions serve as the primary refrigerant thus providing cooling to a secondary heat transfer fluid that thereby cools a remote location.

The compositions of the present invention may have some temperature glide in the heat exchangers. Thus, the systems may operate more efficiently if the heat exchangers are operated in counter-current mode or cross-current mode with counter-current tendency. Counter-current tendency means that the closer the heat exchanger can get to counter-current mode the more efficient the heat transfer. Thus, air conditioning heat exchangers, in particular evaporators, are designed to provide some aspect of counter-current tendency.

Therefore, provided herein is an air conditioning or heat pump system wherein said system includes one or more heat exchangers (either evaporators, condensers or both) that operate in counter-current mode or cross-current mode with counter-current tendency.

In some embodiments, provided herein is a refrigeration system wherein said system includes one or more heat exchangers (either evaporators, condensers or both) that operate in counter-current mode or cross-current mode with counter-current tendency.

In some embodiments, the refrigeration, air conditioning or heat pump system is a stationary refrigeration, air conditioning or heat pump system. In some embodiments the refrigeration, air conditioning, or heat pump system is a mobile refrigeration, air conditioning or heat pump system.

Additionally, in some embodiments, the disclosed compositions may function as primary refrigerants in secondary loop systems that provide cooling to remote locations by use of a secondary heat transfer fluid, which may comprise water, an aqueous salt solution (e.g., calcium chloride), a glycol, carbon dioxide, or a fluorinated hydrocarbon fluid (meaning an HFC, HCFC, hydrofluoroolefin ("HFO"), hydrochlorofluoroolefin ("HCFO"), chlorofluoroolefin ("CFO"), or perfluorocarbon ("PFC"). In this case, the secondary heat transfer fluid is the body to be cooled as it is adjacent to the evaporator and is cooled before moving to a second remote body to be cooled. In other embodiments, the disclosed compositions may function as the secondary heat transfer fluid, thus transferring or providing cooling (or heating) to the remote location.

In some embodiments, the compositions provided herein comprise one or more non-refrigerant components (also referred to herein as additives) selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

In one embodiment, the lubricant is selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

The lubricants as disclosed herein may be commercially available lubricants. For instance, the lubricant may be paraffinic mineral oil, sold by BVA Oils as BVM 100 N, naphthenic mineral oils sold by Crompton Co. under the trademarks Suniso® 1GS, Suniso® 3GS and Suniso® SGS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol® 100 by Castrol, United Kingdom, polyalkylene glycols (PAGs) such as RL-488A from Dow (Dow Chemical, Midland, Michigan), and mixtures thereof, meaning mixtures of any of the lubricants disclosed in this paragraph.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

The non-refrigerant component used with the compositions of the present invention may include at least one dye. The dye may be at least one ultra-violet (UV) dye. As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

In some embodiments, the UV dye may be a fluorescent dye. In some embodiments, the fluorescent dye is selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

Another non-refrigerant component which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, and 1,1,1-trifluoroalkanes and mixtures thereof, meaning mixtures of any of the solubilizing agents disclosed in this paragraph.

In some embodiments, the non-refrigerant component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 3 to 15 carbon atoms. The compatibilizer may be at least one hydrocarbon, which may be selected from the group consisting of at least propanes, including propylene and propane, butanes, including n-butane and isobutene, pentanes, including n-pentane, isopentane, neopentane and cyclopentane, hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic) (Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2=C(R^1)CO_2R^2$, $CH_2=C(R^3)C_6H_4R^4$, and $CH_2=C(R^5)C_6H_4XR^6$, wherein X is oxygen or sulfur; R', $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, (Wilmington, DE, 19898, USA) under the trademark Zonyl® PHS. Zonyl® PHS is a random copolymer made by polymerizing 40 weight percent $CH_2=C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate ($CH_2=C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another non-refrigerant component which may be used with the compositions of the present invention may be a metal surface deactivator. The metal surface deactivator is selected from the group consisting of areoxalyl bis (benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof, meaning mixtures of any of the metal surface deactivators disclosed in this paragraph.

The non-refrigerant component used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, hydrazones, such as acetaldehyde dimethylhydrazone, ionic liquids, and mixtures thereof, meaning mixtures of any of the stabilizers disclosed in this paragraph. Terpene or terpenoid stabilizers may include farnesene, d-limonene, a-pinene, b-pinene, a-terpinene or mixtures thereof. Phosphite stabilizers may include diphenyl phosphite.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad® 620; isopropylated triphenyl phosphates such as those commercially available under the trademarks Durad® 220 and Durad® 110; anisole; 1,4-dimethoxybenzene; 1,4-diethoxybenzene; 1,3,5-trimethoxybenzene; myrcene, alloocimene, limonene (in particular, d-limonene); retinal; pinene (α or β); menthol; geraniol; farnesol; phytol; Vitamin A; terpinene (α or β); delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanylpropanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

The additive used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, and $F^-$, and mixtures thereof. In some embodiments, ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl) sulfide and mixtures thereof, meaning mixtures of any of the phenols disclosed in this paragraph.

The non-refrigerant component which is used with compositions of the present invention may alternatively be a tracer. The tracer may be two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Alternatively, the tracer is present at a total concentration of about 100 ppm to about 300 ppm.

The tracer may be selected from the group consisting of chlorofluorocarbons (CFCs), hydrochlorofluorocarbons (HCFCs), hydrofluorocarbons (HFCs), hydrochlorocarbons (HCCs), deuterated hydrofluorocarbons, perfluorocarbons, fluoroethers, brominated compounds, iodinated compounds, alcohols, aldehydes and ketones, nitrous oxide and combinations thereof. Alternatively, the tracer may be selected from the group consisting of chlorodifluoromethane (HCFC-22), trifluoromethane (HFC-23), chloromethane (HCC-40), chloropentafluoroethane (CFC-115); fluoroethane (HFC-161), 2-chloro-1,1,1,2-tetrafluoroethane (HCFC-124), 1,1,2, 2-tetrafluoroethane (HFC-134), 1-chloro-2,2-difluoroethene (HCFC-1122), chlorotrifluoroethene (CFC-1113), 1,1,1,2,2,3,3-heptafluoropropane (HFC-227ca), 1,1,1,2,2,3-hexafluoropropane (HFC-236cb), 1,1,1,2,3,3-hexafluoropropane (HFC-236ea), 1,1,1,3,3,3-hexafluoropropane (HFC-236fa), 1,1,1,2,2-pentafluoropropane (HFC-245cb), 1,1,1,2,3-pentafluoropropane (HFC-245eb), 1,1,2,2-tetrafluoropropane (HFC-254cb), 1,1,1,2-tetrafluoropropane (HFC-254eb), 1,1,1-trifluoropropane (HFC-263fb), 2,2-difluoropropane (HFC-272ca), 2-fluoropropane (HFC-281ea), 1-fluoropropane (HFC-281fa), 1,1,1,2,2,3,3,4-nonafluorobutane (HFC-329p), 1,1,1-trifluoro-2-methylpropane (HFC-329mmz), 1,1,1,2,2,4,4,4-octafluorobutane (HFC-338mf), 1,1,2,2,3,3,4,4-octafluorobutane (HFC-338pcc), 1,1,1,2,2,3,3-heptafluorobutane (HFC-347s), hexafluoroethane (perfluoroethane, PFC-116), perfluoro-cyclopropane (PFC-C216), perfluoropropane (PFC-218), perfluoro-cyclobutane (PFC-C318), perfluorobutane (PFC-31-10mc), perfluoro-2-methylpropane ($CF_3CF(CF_3)_2$), perfluoro-1,3-dimethylcyclobutane (PFC-051-12mycm), trans-perfluoro-2,3-dimethylcyclobutane (PFC-051-12mym, trans), cis-perfluoro-2,3-dimethylcyclobutane (PFC-051-12mym, cis), perfluoromethylcyclopentane, perfluoromethylcyclohexane, perfluorodimethylcyclohexane (ortho, meta, or para), perfluoroethylcyclohexane, perfluoroindan, perfluorotrimethylcyclohexane and isomers thereof, perfluoroisopropylcyclohexane, cis-perfluorodecalin, trans-perfluorodecalin, cis- or trans-perfluoromethyldecalinand mixtures thereof. In some embodiments, the tracer is a blend containing two or more hydrofluorocarbons, or one hydrofluorocarbon in combination with one or more perfluorocarbons.

The tracer may be added to the compositions of the present invention in predetermined quantities to allow detection of any dilution, contamination or other alteration of the composition.

The additive which may be used with the compositions of the present invention may alternatively be a perfluoropolyether as described in detail in US 2007-0284555, the disclosure of which is incorporated herein by reference in its entirety.

It will be recognized that certain of the additives referenced above as suitable for the non-refrigerant component have been identified as potential refrigerants. However, in accordance with this invention, when these additives are used, they are not present at an amount that would affect the novel and basic characteristics of the refrigerant mixtures of this invention.

In some embodiments, the refrigerant compositions disclosed herein may be prepared by any convenient method to combine the desired amounts of the individual components as is standard in the art. A preferred method is to weigh the desired component amounts and thereafter combine the components in an appropriate vessel. Agitation may be used, if desired.

EXAMPLES

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

Example 1

Cooling and Heating Performance Data Comparison of CFO-1112 Blends with R-123

The cooling and heating performance for mixtures containing CFO-1112 compared to the cooling and heating performance for mixtures containing R-123 was determined. Measurements included: pressure in the evaporator (Evap) and condenser (Cond), compressor discharge temperature (Disch T), Average Temperature Glide for the evaporator and condenser (Avg Temp Glide), and Mass Flow Rate for a compressor displacement of 0.1 m³/min. Relative energy efficiency (COP) and volumetric capacity (Cap) for mixtures containing CFO-1112 relative to R-123 were also determined. The results are shown in Tables 1A-1B below.

The data was based on the following conditions:

| | |
|---|---|
| Evaporator temperature | 10° C. |
| Condenser temperature | 46.1° C. |
| Subcool amount | 8.3K |
| Superheat amount | 11.1K |
| Compressor efficiency | 70% |

TABLE 1A

| Composition | wt % | Disch T (° C.) | Evap P (MPa) | Cond P (MPa) | Average Glide (K) |
|---|---|---|---|---|---|
| R-123 | 100 | 68.0 | 0.0506 | 0.1881 | 0 |
| CFO-1112/R-1336mzzZ | 1/99 | 59.8 | 0.0398 | 0.1600 | 0.25 |
| CFO-1112/R-1336mzzZ | 5/95 | 60.7 | 0.0420 | 0.1674 | 1.13 |
| CFO-1112/R-1336mzzZ | 10/90 | 61.7 | 0.0447 | 0.1761 | 1.98 |
| CFO-1112/R-1336mzzZ | 15/85 | 62.6 | 0.0473 | 0.1843 | 2.56 |
| CFO-1112/R-1336mzzZ | 20/80 | 63.3 | 0.0499 | 0.1920 | 2.91 |
| CFO-1112/R-1336mzzZ | 25/75 | 64.0 | 0.0524 | 0.1992 | 3.05 |
| CFO-1112/R-1336mzzZ | 30/70 | 64.6 | 0.0548 | 0.2060 | 3.00 |
| CFO-1112/R-1336mzzZ | 35/65 | 65.1 | 0.0571 | 0.2123 | 2.79 |
| CFO-1112/R-1336mzzZ | 40/60 | 65.6 | 0.0593 | 0.2181 | 2.47 |
| CFO-1112/R-1336mzzZ | 45/55 | 66.1 | 0.0613 | 0.2235 | 2.07 |
| CFO-1112/R-1336mzzZ | 50/50 | 66.5 | 0.0632 | 0.2283 | 1.63 |
| CFO-1112/R-1336mzzZ | 55/45 | 67.0 | 0.0650 | 0.2326 | 1.18 |
| CFO-1112/R-1336mzzZ | 60/40 | 67.4 | 0.0665 | 0.2361 | 0.77 |
| CFO-1112/R-1336mzzZ | 65/35 | 68.0 | 0.0678 | 0.2389 | 0.44 |
| CFO-1112/R-1336mzzZ | 70/30 | 68.7 | 0.0688 | 0.2408 | 0.20 |
| CFO-1112/R-1336mzzZ | 75/25 | 69.5 | 0.0694 | 0.2420 | 0.06 |
| CFO-1112/R-1336mzzZ | 80/20 | 70.4 | 0.0698 | 0.2423 | 0.01 |
| CFO-1112/R-1336mzzZ | 85/15 | 71.5 | 0.0698 | 0.2419 | 0.01 |
| CFO-1112/R-1336mzzZ | 90/10 | 72.6 | 0.0696 | 0.2408 | 0.04 |
| CFO-1112/R-1336mzzZ | 95/5 | 73.8 | 0.0692 | 0.2389 | 0.05 |
| CFO-1112/R-1336mzzZ | 99/1 | 74.7 | 0.0686 | 0.2370 | 0.02 |
| CFO-1112/N-Pentane | 1/99 | 60.8 | 0.0381 | 0.1419 | 0.17 |
| CFO-1112/N-Pentane | 5/95 | 61.3 | 0.0392 | 0.1458 | 0.82 |
| CFO-1112/N-Pentane | 10/90 | 61.9 | 0.0406 | 0.1507 | 1.55 |
| CFO-1112/N-Pentane | 15/85 | 62.5 | 0.0421 | 0.1555 | 2.19 |
| CFO-1112/N-Pentane | 20/80 | 63.1 | 0.0436 | 0.1604 | 2.73 |
| CFO-1112/N-Pentane | 25/75 | 63.6 | 0.0453 | 0.1654 | 3.17 |
| CFO-1112/N-Pentane | 30/70 | 64.0 | 0.0469 | 0.1704 | 3.49 |
| CFO-1112/N-Pentane | 35/65 | 64.5 | 0.0486 | 0.1756 | 3.70 |
| CFO-1112/N-Pentane | 40/60 | 64.9 | 0.0504 | 0.1808 | 3.80 |
| CFO-1112/N-Pentane | 45/55 | 65.3 | 0.0522 | 0.1862 | 3.77 |
| CFO-1112/N-Pentane | 50/50 | 65.7 | 0.0542 | 0.1918 | 3.62 |
| CFO-1112/N-Pentane | 55/45 | 66.0 | 0.0561 | 0.1975 | 3.36 |
| CFO-1112/N-Pentane | 60/40 | 66.4 | 0.0582 | 0.2034 | 2.98 |
| CFO-1112/N-Pentane | 65/35 | 66.8 | 0.0603 | 0.2094 | 2.50 |
| CFO-1112/N-Pentane | 70/30 | 67.2 | 0.0625 | 0.2154 | 1.95 |
| CFO-1112/N-Pentane | 75/25 | 67.6 | 0.0646 | 0.2213 | 1.36 |
| CFO-1112/N-Pentane | 80/20 | 68.3 | 0.0666 | 0.2269 | 0.81 |
| CFO-1112/N-Pentane | 85/15 | 69.2 | 0.0683 | 0.2317 | 0.36 |
| CFO-1112/N-Pentane | 90/10 | 70.5 | 0.0694 | 0.2353 | 0.08 |
| CFO-1112/N-Pentane | 93.9/6.1 | 71.9 | 0.0697 | 0.2370 | 0.01 |
| CFO-1112/N-Pentane | 95/5 | 72.4 | 0.0696 | 0.2373 | 0.01 |
| CFO-1112/N-Pentane | 99/1 | 74.4 | 0.0689 | 0.2369 | 0.02 |

TABLE 1A-continued

| Composition | wt % | Disch T (° C.) | Evap P (MPa) | Cond P (MPa) | Average Glide (K) |
|---|---|---|---|---|---|
| CFO-1112/i-Pentane | 0/100 | 59.2 | 0.0523 | 0.1829 | 0.00 |
| CFO-1112/i-Pentane | 1/99 | 59.3 | 0.0526 | 0.1838 | 0.09 |
| CFO-1112/i-Pentane | 5/95 | 59.7 | 0.0536 | 0.1872 | 0.45 |
| CFO-1112/i-Pentane | 10/90 | 60.1 | 0.0550 | 0.1915 | 0.84 |
| CFO-1112/i-Pentane | 15/85 | 60.5 | 0.0564 | 0.1958 | 1.16 |
| CFO-1112/i-Pentane | 20/80 | 60.9 | 0.0579 | 0.2001 | 1.43 |
| CFO-1112/i-Pentane | 25/75 | 61.3 | 0.0594 | 0.2045 | 1.62 |
| CFO-1112/i-Pentane | 30/70 | 61.7 | 0.0609 | 0.2089 | 1.74 |
| CFO-1112/i-Pentane | 35/65 | 62.1 | 0.0624 | 0.2133 | 1.79 |
| CFO-1112/i-Pentane | 40/60 | 62.5 | 0.0640 | 0.2178 | 1.76 |
| CFO-1112/i-Pentane | 45/55 | 62.9 | 0.0656 | 0.2222 | 1.66 |
| CFO-1112/i-Pentane | 50/50 | 63.3 | 0.0672 | 0.2266 | 1.50 |
| CFO-1112/i-Pentane | 55/45 | 63.7 | 0.0687 | 0.2310 | 1.27 |
| CFO-1112/i-Pentane | 60/40 | 64.1 | 0.0703 | 0.2352 | 1.00 |
| CFO-1112/i-Pentane | 65/35 | 64.6 | 0.0717 | 0.2392 | 0.70 |
| CFO-1112/t-DCE | 1/99 | 97.3 | 0.0240 | 0.0968 | 0.24 |
| CFO-1112/t-DCE | 5/95 | 96.9 | 0.0250 | 0.1003 | 1.14 |
| CFO-1112/t-DCE | 10/90 | 96.4 | 0.0263 | 0.1048 | 2.17 |
| CFO-1112/t-DCE | 15/85 | 95.7 | 0.0276 | 0.1094 | 3.08 |
| CFO-1112/t-DCE | 20/80 | 95.0 | 0.0290 | 0.1141 | 3.88 |
| CFO-1112/t-DCE | 25/75 | 94.3 | 0.0304 | 0.1189 | 4.56 |
| CFO-1112/t-DCE | 30/70 | 93.5 | 0.0320 | 0.1239 | 5.13 |
| CFO-1112/t-DCE | 35/65 | 92.6 | 0.0336 | 0.1290 | 5.59 |
| CFO-1112/t-DCE | 40/60 | 91.6 | 0.0352 | 0.1344 | 5.93 |
| CFO-1112/t-DCE | 45/55 | 90.6 | 0.0370 | 0.1401 | 6.16 |
| CFO-1112/t-DCE | 50/50 | 89.6 | 0.0389 | 0.1460 | 6.27 |
| CFO-1112/t-DCE | 55/45 | 88.5 | 0.0409 | 0.1523 | 6.26 |
| CFO-1112/t-DCE | 60/40 | 87.3 | 0.0430 | 0.1590 | 6.12 |
| CFO-1112/t-DCE | 65/35 | 86.0 | 0.0453 | 0.1662 | 5.85 |
| CFO-1112/t-DCE | 70/30 | 84.6 | 0.0478 | 0.1739 | 5.44 |
| CFO-1112/t-DCE | 75/25 | 83.1 | 0.0506 | 0.1823 | 4.88 |
| CFO-1112/t-DCE | 80/20 | 81.6 | 0.0536 | 0.1914 | 4.17 |
| CFO-1112/t-DCE | 85/15 | 79.9 | 0.0569 | 0.2013 | 3.30 |
| CFO-1112/t-DCE | 90/10 | 78.2 | 0.0606 | 0.2120 | 2.29 |
| CFO-1112/t-DCE | 95/5 | 76.4 | 0.0645 | 0.2238 | 1.14 |
| CFO-1112/t-DCE | 99/1 | 75.2 | 0.0677 | 0.2339 | 0.21 |

TABLE 1B

| Composition | wt % | Cooling Cap Rel to R-123 | Cooling COP Rel to R-123 | Heating CAP Rel to R-123 | Heating COP Rel to R-123 | Mass Flow Rel to R-123 |
|---|---|---|---|---|---|---|
| R-123 | 100 | 100% | 100% | 100% | 100% | 100% |
| CFO-1112/R-1336mzzZ | 1/99 | 81% | 99% | 82% | 99% | 84% |
| CFO-1112/R-1336mzzZ | 5/95 | 85% | 99% | 86% | 99% | 88% |
| CFO-1112/R-1336mzzZ | 10/90 | 90% | 99% | 91% | 99% | 92% |
| CFO-1112/R-1336mzzZ | 15/85 | 95% | 99% | 95% | 99% | 98% |
| CFO-1112/R-1336mzzZ | 20/80 | 99% | 99% | 100% | 99% | 102% |
| CFO-1112/R-1336mzzZ | 25/75 | 104% | 99% | 104% | 100% | 106% |
| CFO-1112/R-1336mzzZ | 30/70 | 107% | 99% | 108% | 100% | 110% |
| CFO-1112/R-1336mzzZ | 35/65 | 111% | 99% | 111% | 99% | 112% |
| CFO-1112/R-1336mzzZ | 40/60 | 114% | 99% | 114% | 99% | 116% |
| CFO-1112/R-1336mzzZ | 45/55 | 117% | 99% | 118% | 99% | 118% |
| CFO-1112/R-1336mzzZ | 50/50 | 120% | 99% | 120% | 99% | 122% |
| CFO-1112/R-1336mzzZ | 55/45 | 123% | 99% | 123% | 99% | 124% |
| CFO-1112/R-1336mzzZ | 60/40 | 125% | 99% | 125% | 99% | 125% |
| CFO-1112/R-1336mzzZ | 65/35 | 127% | 99% | 127% | 100% | 125% |
| CFO-1112/R-1336mzzZ | 70/30 | 129% | 100% | 129% | 100% | 127% |
| CFO-1112/R-1336mzzZ | 75/25 | 130% | 100% | 130% | 100% | 127% |
| CFO-1112/R-1336mzzZ | 80/20 | 130% | 100% | 130% | 100% | 125% |
| CFO-1112/R-1336mzzZ | 85/15 | 130% | 100% | 130% | 100% | 125% |
| CFO-1112/R-1336mzzZ | 90/10 | 130% | 100% | 130% | 100% | 124% |
| CFO-1112/R-1336mzzZ | 95/5 | 129% | 100% | 129% | 100% | 122% |
| CFO-1112/R-1336mzzZ | 99/1 | 129% | 100% | 129% | 100% | 120% |
| CFO-1112/N-Pentane | 1/99 | 75% | 100% | 75% | 100% | 35% |
| CFO-1112/N-Pentane | 5/95 | 77% | 100% | 77% | 100% | 37% |
| CFO-1112/N-Pentane | 10/90 | 80% | 100% | 80% | 100% | 39% |
| CFO-1112/N-Pentane | 15/85 | 82% | 100% | 82% | 100% | 41% |
| CFO-1112/N-Pentane | 20/80 | 85% | 100% | 85% | 100% | 45% |
| CFO-1112/N-Pentane | 25/75 | 88% | 100% | 88% | 100% | 47% |
| CFO-1112/N-Pentane | 30/70 | 91% | 100% | 91% | 100% | 51% |
| CFO-1112/N-Pentane | 35/65 | 94% | 101% | 94% | 100% | 53% |
| CFO-1112/N-Pentane | 40/60 | 97% | 101% | 97% | 100% | 57% |
| CFO-1112/N-Pentane | 45/55 | 100% | 100% | 100% | 100% | 61% |
| CFO-1112/N-Pentane | 50/50 | 103% | 100% | 103% | 100% | 65% |
| CFO-1112/N-Pentane | 55/45 | 106% | 100% | 106% | 100% | 71% |
| CFO-1112/N-Pentane | 60/40 | 109% | 100% | 109% | 100% | 75% |
| CFO-1112/N-Pentane | 65/35 | 112% | 100% | 112% | 100% | 80% |
| CFO-1112/N-Pentane | 70/30 | 116% | 100% | 116% | 100% | 86% |
| CFO-1112/N-Pentane | 75/25 | 119% | 100% | 119% | 100% | 92% |
| CFO-1112/N-Pentane | 80/20 | 123% | 100% | 123% | 100% | 98% |
| CFO-1112/N-Pentane | 85/15 | 125% | 100% | 125% | 100% | 106% |
| CFO-1112/N-Pentane | 90/10 | 128% | 100% | 128% | 100% | 112% |
| CFO-1112/N-Pentane | 93.9/6.1 | 129% | 100% | 129% | 100% | 116% |
| CFO-1112/N-Pentane | 95/5 | 129% | 100% | 129% | 100% | 116% |
| CFO-1112/N-Pentane | 99/1 | 129% | 100% | 129% | 100% | 118% |
| CFO-1112/i-Pentane | 0/100 | 97% | 100% | 97% | 100% | 49% |
| CFO-1112/i-Pentane | 1/99 | 98% | 100% | 98% | 100% | 49% |
| CFO-1112/i-Pentane | 5/95 | 100% | 100% | 100% | 100% | 51% |
| CFO-1112/i-Pentane | 10/90 | 102% | 100% | 102% | 100% | 55% |
| CFO-1112/i-Pentane | 15/85 | 104% | 100% | 104% | 100% | 57% |
| CFO-1112/i-Pentane | 20/80 | 107% | 100% | 107% | 100% | 59% |
| CFO-1112/i-Pentane | 25/75 | 109% | 100% | 109% | 100% | 63% |
| CFO-1112/i-Pentane | 30/70 | 112% | 100% | 112% | 100% | 67% |
| CFO-1112/i-Pentane | 35/65 | 114% | 100% | 114% | 100% | 71% |
| CFO-1112/i-Pentane | 40/60 | 117% | 100% | 117% | 100% | 73% |
| CFO-1112/i-Pentane | 45/55 | 119% | 100% | 119% | 100% | 78% |
| CFO-1112/i-Pentane | 50/50 | 122% | 100% | 122% | 100% | 82% |
| CFO-1112/i-Pentane | 55/45 | 124% | 100% | 124% | 100% | 86% |
| CFO-1112/i-Pentane | 60/40 | 126% | 100% | 127% | 100% | 90% |
| CFO-1112/i-Pentane | 65/35 | 129% | 100% | 129% | 100% | 96% |
| CFO-1112/t-DCE | 1/99 | 53% | 101% | 53% | 100% | 29% |
| CFO-1112/t-DCE | 5/95 | 55% | 101% | 55% | 101% | 31% |
| CFO-1112/t-DCE | 10/90 | 57% | 101% | 57% | 101% | 33% |
| CFO-1112/t-DCE | 15/85 | 60% | 101% | 60% | 101% | 35% |
| CFO-1112/t-DCE | 20/80 | 62% | 101% | 62% | 101% | 37% |
| CFO-1112/t-DCE | 25/75 | 65% | 101% | 65% | 101% | 41% |
| CFO-1112/t-DCE | 30/70 | 68% | 101% | 68% | 101% | 43% |
| CFO-1112/t-DCE | 35/65 | 71% | 101% | 71% | 101% | 45% |
| CFO-1112/t-DCE | 40/60 | 74% | 101% | 74% | 101% | 49% |
| CFO-1112/t-DCE | 45/55 | 77% | 101% | 77% | 101% | 51% |
| CFO-1112/t-DCE | 50/50 | 80% | 101% | 80% | 101% | 55% |
| CFO-1112/t-DCE | 55/45 | 84% | 101% | 83% | 101% | 59% |
| CFO-1112/t-DCE | 60/40 | 87% | 101% | 87% | 101% | 63% |
| CFO-1112/t-DCE | 65/35 | 91% | 101% | 91% | 101% | 69% |
| CFO-1112/t-DCE | 70/30 | 95% | 101% | 95% | 100% | 73% |
| CFO-1112/t-DCE | 75/25 | 100% | 100% | 100% | 100% | 78% |
| CFO-1112/t-DCE | 80/20 | 105% | 100% | 104% | 100% | 86% |
| CFO-1112/t-DCE | 85/15 | 110% | 100% | 110% | 100% | 92% |
| CFO-1112/t-DCE | 90/10 | 116% | 100% | 116% | 100% | 100% |
| CFO-1112/t-DCE | 95/5 | 122% | 100% | 122% | 100% | 110% |
| CFO-1112/t-DCE | 99/1 | 127% | 100% | 127% | 100% | 118% |

The results in Tables 1A-1B show that CFO-1112 mixtures analyzed in this example are good alternatives to R-123 with similar cooling and heating capacities and energy efficiencies (COP). Mixtures with low temperature glide (<−1K) are particularly suitable for use in centrifugal chillers. Mixtures with high glide are suitable for use in heat exchangers with countercurrent flow or cross-countercurrent flow. Compressor discharge temperatures for the mixtures and pure fluids were also similar to R-123.

Example 2

Cooling and Heating Performance Data Comparison of CFO-1112 Blends with R-245Fa

The cooling and heating performance for mixtures containing CFO-1112 compared to the cooling and heating performance for mixtures containing R-245fa was determined. Measurements included pressure in the evaporator (Evap) and condenser (Cond), compressor discharge temperature (Disch T), Average Temperature Glide for the evaporator and condenser (Avg Temp Glide), and Mass Flow Rate for a compressor displacement of 0.1 m³/min. Relative energy efficiency (COP) and volumetric capacity (Cap) for mixtures containing CFO-1112 relative to R-245fa were also determined. The results are shown in Tables 2A-2B below.

The data was based on the following conditions:

| | |
|---|---|
| Evaporator temperature | 10° C. |
| Condenser temperature | 46.1° C. |
| Subcool amount | 8.3K |
| Superheat amount | 11.1K |
| Compressor efficiency | 70% |

TABLE 2A

| Composition | wt % | Disch T (° C.) | Evap P (MPa) | Cond P (MPa) | Average glide (K) |
|---|---|---|---|---|---|
| R-245fa | 100 | 63.3 | 0.082 | 0.3049 | 0 |
| CFO-1112/R-245fa | 1/99 | 63.4 | 0.0821 | 0.3048 | 0.00 |
| CFO-1112/R-245fa | 5/95 | 63.6 | 0.0824 | 0.3042 | 0.01 |
| CFO-1112/R-245fa | 10/90 | 63.9 | 0.0826 | 0.3030 | 0.01 |
| CFO-1112/R-245fa | 15/85 | 64.3 | 0.0827 | 0.3013 | 0.03 |
| CFO-1112/R-245fa | 20/80 | 64.7 | 0.0826 | 0.2992 | 0.06 |
| CFO-1112/R-245fa | 25/75 | 65.1 | 0.0824 | 0.2967 | 0.10 |
| CFO-1112/R-245fa | 30/70 | 65.5 | 0.0820 | 0.2939 | 0.15 |
| CFO-1112/R-245fa | 35/65 | 66.0 | 0.0816 | 0.2909 | 0.20 |
| CFO-1112/R-245fa | 35.5/64.5 | 66.0 | 0.0815 | 0.2905 | 0.21 |
| CFO-1112/R-245fa | 40/60 | 66.4 | 0.0810 | 0.2875 | 0.27 |
| CFO-1112/R-245fa | 45/55 | 67.0 | 0.0804 | 0.2840 | 0.33 |
| CFO-1112/R-245fa | 50/50 | 67.5 | 0.0797 | 0.2802 | 0.38 |
| CFO-1112/R-245fa | 55/45 | 68.1 | 0.0789 | 0.2763 | 0.43 |
| CFO-1112/R-245fa | 60/40 | 68.7 | 0.0780 | 0.2723 | 0.46 |
| CFO-1112/R-245fa | 65/35 | 69.3 | 0.0771 | 0.2682 | 0.49 |
| CFO-1112/R-245fa | 70/30 | 70.0 | 0.0761 | 0.2640 | 0.49 |
| CFO-1112/R-245fa | 75/25 | 70.7 | 0.0751 | 0.2597 | 0.49 |
| CFO-1112/R-245fa | 80/20 | 71.4 | 0.0740 | 0.2554 | 0.46 |
| CFO-1112/R-245fa | 85/15 | 72.2 | 0.0728 | 0.2509 | 0.41 |
| CFO-1112/R-245fa | 90/10 | 73.1 | 0.0716 | 0.2463 | 0.34 |
| CFO-1112/R-245fa | 95/5 | 74.0 | 0.0701 | 0.2416 | 0.22 |
| CFO-1112/R-245fa | 99/1 | 74.8 | 0.0688 | 0.2375 | 0.06 |
| CFO-1112/R-1233zdE | 1/99 | 66.3 | 0.0732 | 0.2609 | 0.00 |
| CFO-1112/R-1233zdE | 5/95 | 66.5 | 0.0735 | 0.2611 | 0.00 |
| CFO-1112/R-1233zdE | 10/90 | 66.8 | 0.0738 | 0.2611 | 0.00 |
| CFO-1112/R-1233zdE | 15/85 | 67.1 | 0.0740 | 0.2608 | 0.00 |
| CFO-1112/R-1233zdE | 20/80 | 67.4 | 0.0741 | 0.2603 | 0.01 |
| CFO-1112/R-1233zdE | 25/75 | 67.7 | 0.0741 | 0.2595 | 0.01 |
| CFO-1112/R-1233zdE | 27.4/72.6 | 67.8 | 0.0741 | 0.2591 | 0.02 |
| CFO-1112/R-1233zdE | 30/70 | 68.0 | 0.0740 | 0.2585 | 0.02 |
| CFO-1112/R-1233zdE | 35/65 | 68.4 | 0.0739 | 0.2574 | 0.04 |
| CFO-1112/R-1233zdE | 40/60 | 68.7 | 0.0737 | 0.2561 | 0.05 |
| CFO-1112/R-1233zdE | 45/55 | 69.1 | 0.0735 | 0.2547 | 0.06 |
| CFO-1112/R-1233zdE | 50/50 | 69.5 | 0.0732 | 0.2532 | 0.08 |
| CFO-1112/R-1233zdE | 55/45 | 69.9 | 0.0729 | 0.2516 | 0.08 |
| CFO-1112/R-1233zdE | 60/40 | 70.4 | 0.0726 | 0.2500 | 0.09 |
| CFO-1112/R-1233zdE | 65/35 | 70.8 | 0.0722 | 0.2483 | 0.09 |
| CFO-1112/R-1233zdE | 70/30 | 71.3 | 0.0718 | 0.2466 | 0.09 |
| CFO-1112/R-1233zdE | 75/25 | 71.8 | 0.0714 | 0.2450 | 0.08 |
| CFO-1112/R-1233zdE | 80/20 | 72.3 | 0.0709 | 0.2433 | 0.07 |
| CFO-1112/R-1233zdE | 85/15 | 72.9 | 0.0705 | 0.2417 | 0.06 |
| CFO-1112/R-1233zdE | 90/10 | 73.5 | 0.0699 | 0.2400 | 0.05 |
| CFO-1112/R-1233zdE | 95/5 | 74.2 | 0.0693 | 0.2383 | 0.04 |
| CFO-1112/R-1233zdE | 99/1 | 74.8 | 0.0686 | 0.2369 | 0.01 |
| CFO-1112/I-Pentane | 70/30 | 65.3 | 0.0730 | 0.2427 | 0.42 |
| CFO-1112/I-Pentane | 75/25 | 66.0 | 0.0740 | 0.2455 | 0.18 |
| CFO-1112/I-Pentane | 80/20 | 67.1 | 0.0745 | 0.2474 | 0.03 |
| CFO-1112/I-Pentane | 82.3/17.1 | 67.6 | 0.0746 | 0.2479 | 0.01 |
| CFO-1112/I-Pentane | 85/15 | 68.4 | 0.0745 | 0.2481 | 0.01 |
| CFO-1112/I-Pentane | 90/10 | 70.1 | 0.0738 | 0.2470 | 0.11 |
| CFO-1112/I-Pentane | 95/5 | 72.3 | 0.0720 | 0.2435 | 0.24 |

TABLE 2A-continued

| Composition | wt % | Disch T (° C.) | Evap P (MPa) | Cond P (MPa) | Average glide (K) |
|---|---|---|---|---|---|
| CFO-1112/I-Pentane | 99/1 | 74.4 | 0.0694 | 0.2383 | 0.13 |
| CFO-1112/R-1336mzzE | 1/99 | 60.5 | 0.1121 | 0.3929 | 0.00 |
| CFO-1112/R-1336mzzE | 5/95 | 60.8 | 0.1126 | 0.3925 | 0.01 |
| CFO-1112/R-1336mzzE | 10/90 | 61.3 | 0.1126 | 0.3899 | 0.04 |
| CFO-1112/R-1336mzzE | 15/85 | 61.8 | 0.1118 | 0.3853 | 0.18 |
| CFO-1112/R-1336mzzE | 20/80 | 62.4 | 0.1103 | 0.3791 | 0.42 |
| CFO-1112/R-1336mzzE | 25/75 | 63.1 | 0.1083 | 0.3715 | 0.76 |
| CFO-1112/R-1336mzzE | 30/70 | 63.9 | 0.1060 | 0.3631 | 1.15 |
| CFO-1112/R-1336mzzE | 35/65 | 64.7 | 0.1034 | 0.3541 | 1.55 |
| CFO-1112/R-1336mzzE | 40/60 | 65.6 | 0.1007 | 0.3448 | 1.91 |
| CFO-1112/R-1336mzzE | 45/55 | 66.4 | 0.0980 | 0.3354 | 2.22 |
| CFO-1112/R-1336mzzE | 50/50 | 67.3 | 0.0952 | 0.3259 | 2.45 |
| CFO-1112/R-1336mzzE | 55/45 | 68.1 | 0.0924 | 0.3165 | 2.60 |
| CFO-1112/R-1336mzzE | 60/40 | 68.9 | 0.0896 | 0.3071 | 2.67 |
| CFO-1112/R-1336mzzE | 65/35 | 69.7 | 0.0868 | 0.2979 | 2.64 |
| CFO-1112/R-1336mzzE | 70/30 | 70.5 | 0.0841 | 0.2888 | 2.53 |
| CFO-1112/R-1336mzzE | 75/25 | 71.3 | 0.0815 | 0.2798 | 2.34 |
| CFO-1112/R-1336mzzE | 80/20 | 72.0 | 0.0789 | 0.2709 | 2.07 |
| CFO-1112/R-1336mzzE | 85/15 | 72.8 | 0.0763 | 0.2622 | 1.71 |
| CFO-1112/R-1336mzzE | 90/10 | 73.5 | 0.0737 | 0.2537 | 1.26 |
| CFO-1112/R-1336mzzE | 95/5 | 74.3 | 0.0711 | 0.2451 | 0.71 |
| CFO-1112/R-1336mzzE | 99/1 | 74.8 | 0.0690 | 0.2382 | 0.16 |
| CFO-1112/R-1224ydZ | 1/99 | 64.1 | 0.0850 | 0.2970 | 0.00 |
| CFO-1112/R-1224ydZ | 5/95 | 64.4 | 0.0853 | 0.2971 | 0.00 |
| CFO-1112/R-1224ydZ | 10/90 | 64.8 | 0.0855 | 0.2964 | 0.01 |
| CFO-1112/R-1224ydZ | 15/85 | 65.2 | 0.0854 | 0.2951 | 0.03 |
| CFO-1112/R-1224ydZ | 20/80 | 65.6 | 0.0851 | 0.2932 | 0.07 |
| CFO-1112/R-1224ydZ | 25/75 | 66.0 | 0.0846 | 0.2908 | 0.13 |
| CFO-1112/R-1224ydZ | 30/70 | 66.5 | 0.0840 | 0.2879 | 0.20 |
| CFO-1112/R-1224ydZ | 35/65 | 67.0 | 0.0832 | 0.2848 | 0.28 |
| CFO-1112/R-1224ydZ | 40/60 | 67.5 | 0.0823 | 0.2814 | 0.35 |
| CFO-1112/R-1224ydZ | 45/55 | 68.1 | 0.0814 | 0.2779 | 0.42 |
| CFO-1112/R-1224ydZ | 50/50 | 68.6 | 0.0804 | 0.2742 | 0.47 |
| CFO-1112/R-1224ydZ | 55/45 | 69.1 | 0.0793 | 0.2705 | 0.51 |
| CFO-1112/R-1224ydZ | 60/40 | 69.7 | 0.0783 | 0.2667 | 0.52 |
| CFO-1112/R-1224ydZ | 65/35 | 70.3 | 0.0772 | 0.2629 | 0.52 |
| CFO-1112/R-1224ydZ | 70/30 | 70.9 | 0.0761 | 0.2591 | 0.50 |
| CFO-1112/R-1224ydZ | 75/25 | 71.5 | 0.0749 | 0.2553 | 0.47 |
| CFO-1112/R-1224ydZ | 80/20 | 72.1 | 0.0738 | 0.2515 | 0.42 |
| CFO-1112/R-1224ydZ | 85/15 | 72.7 | 0.0726 | 0.2478 | 0.36 |
| CFO-1112/R-1224ydZ | 90/10 | 73.4 | 0.0714 | 0.2441 | 0.28 |
| CFO-1112/R-1224ydZ | 95/5 | 74.2 | 0.0700 | 0.2404 | 0.17 |
| CFO-1112/R-1224ydZ | 99/1 | 74.8 | 0.0688 | 0.2373 | 0.04 |
| CFO-1112/R-1234zeZ | 1/99 | 69.4 | 0.1024 | 0.3485 | 0.00 |
| CFO-1112/R-1234zeZ | 5/95 | 69.5 | 0.1025 | 0.3482 | 0.00 |
| CFO-1112/R-1234zeZ | 10/90 | 69.6 | 0.1025 | 0.3471 | 0.01 |
| CFO-1112/R-1234zeZ | 15/85 | 69.7 | 0.1023 | 0.3454 | 0.04 |
| CFO-1112/R-1234zeZ | 20/80 | 69.8 | 0.1018 | 0.3431 | 0.09 |
| CFO-1112/R-1234zeZ | 25/75 | 70.0 | 0.1012 | 0.3402 | 0.17 |
| CFO-1112/R-1234zeZ | 30/70 | 70.2 | 0.1002 | 0.3366 | 0.29 |
| CFO-1112/R-1234zeZ | 35/65 | 70.5 | 0.0991 | 0.3324 | 0.44 |
| CFO-1112/R-1234zeZ | 40/60 | 70.8 | 0.0977 | 0.3277 | 0.62 |
| CFO-1112/R-1234zeZ | 45/55 | 71.1 | 0.0961 | 0.3225 | 0.81 |
| CFO-1112/R-1234zeZ | 50/50 | 71.4 | 0.0944 | 0.3167 | 1.02 |
| CFO-1112/R-1234zeZ | 55/45 | 71.8 | 0.0925 | 0.3105 | 1.22 |
| CFO-1112/R-1234zeZ | 60/40 | 72.2 | 0.0904 | 0.3039 | 1.41 |
| CFO-1112/R-1234zeZ | 65/35 | 72.6 | 0.0881 | 0.2969 | 1.56 |
| CFO-1112/R-1234zeZ | 70/30 | 73.0 | 0.0858 | 0.2895 | 1.67 |
| CFO-1112/R-1234zeZ | 75/25 | 73.4 | 0.0833 | 0.2818 | 1.71 |
| CFO-1112/R-1234zeZ | 80/20 | 73.8 | 0.0807 | 0.2737 | 1.66 |
| CFO-1112/R-1234zeZ | 85/15 | 74.2 | 0.0779 | 0.2652 | 1.51 |
| CFO-1112/R-1234zeZ | 90/10 | 74.5 | 0.0750 | 0.2562 | 1.22 |
| CFO-1112/R-1234zeZ | 95/5 | 74.8 | 0.0718 | 0.2467 | 0.74 |
| CFO-1112/R-1234zeZ | 99/1 | 74.9 | 0.0692 | 0.2386 | 0.17 |
| CFO-1112/R-1336yf | 35/65 | 59.9 | 0.1195 | 0.3857 | 2.32 |
| CFO-1112/R-1336yf | 40/60 | 61.2 | 0.1155 | 0.3743 | 2.83 |
| CFO-1112/R-1336yf | 45/55 | 62.4 | 0.1115 | 0.3628 | 3.31 |
| CFO-1112/R-1336yf | 50/50 | 63.7 | 0.1075 | 0.3513 | 3.71 |
| CFO-1112/R-1336yf | 55/45 | 64.9 | 0.1035 | 0.3399 | 4.03 |
| CFO-1112/R-1336yf | 60/40 | 66.1 | 0.0996 | 0.3286 | 4.25 |
| CFO-1112/R-1336yf | 65/35 | 67.4 | 0.0958 | 0.3174 | 4.35 |
| CFO-1112/R-1336yf | 70/30 | 68.6 | 0.0919 | 0.3062 | 4.32 |
| CFO-1112/R-1336yf | 75/25 | 69.7 | 0.0882 | 0.2951 | 4.14 |
| CFO-1112/R-1336yf | 80/20 | 70.9 | 0.0844 | 0.2839 | 3.79 |
| CFO-1112/R-1336yf | 85/15 | 72.0 | 0.0806 | 0.2726 | 3.26 |
| CFO-1112/R-1336yf | 90/10 | 73.0 | 0.0768 | 0.2610 | 2.50 |

TABLE 2A-continued

| Composition | wt % | Disch T (° C.) | Evap P (MPa) | Cond P (MPa) | Average glide (K) |
|---|---|---|---|---|---|
| CFO-1112/R-1336yf | 95/5 | 74.1 | 0.0728 | 0.2491 | 1.47 |
| CFO-1112/R-1336yf | 99/1 | 74.8 | 0.0694 | 0.2391 | 0.34 |
| CFO-1112/R-1336zeE | 1/99 | 54.6 | 0.1157 | 0.3794 | 0.04 |
| CFO-1112/R-1336zeE | 5/95 | 55.3 | 0.1135 | 0.3730 | 0.19 |
| CFO-1112/R-1336zeE | 10/90 | 56.1 | 0.1109 | 0.3650 | 0.38 |
| CFO-1112/R-1336zeE | 15/85 | 57.0 | 0.1084 | 0.3572 | 0.57 |
| CFO-1112/R-1336zeE | 20/80 | 57.9 | 0.1058 | 0.3495 | 0.75 |
| CFO-1112/R-1336zeE | 25/75 | 58.8 | 0.1033 | 0.3419 | 0.93 |
| CFO-1112/R-1336zeE | 30/70 | 59.8 | 0.1009 | 0.3344 | 1.10 |
| CFO-1112/R-1336zeE | 35/65 | 60.8 | 0.0984 | 0.3270 | 1.26 |
| CFO-1112/R-1336zeE | 40/60 | 61.8 | 0.0960 | 0.3197 | 1.40 |
| CFO-1112/R-1336zeE | 45/55 | 62.8 | 0.0936 | 0.3124 | 1.53 |
| CFO-1112/R-1336zeE | 50/50 | 63.8 | 0.0913 | 0.3053 | 1.63 |
| CFO-1112/R-1336zeE | 55/45 | 64.9 | 0.0889 | 0.2983 | 1.71 |
| CFO-1112/R-1336zeE | 60/40 | 65.9 | 0.0866 | 0.2913 | 1.75 |
| CFO-1112/R-1336zeE | 65/35 | 67.0 | 0.0844 | 0.2844 | 1.75 |
| CFO-1112/R-1336zeE | 70/30 | 68.1 | 0.0821 | 0.2776 | 1.71 |
| CFO-1112/R-1336zeE | 75/25 | 69.2 | 0.0799 | 0.2708 | 1.61 |
| CFO-1112/R-1336zeE | 80/20 | 70.4 | 0.0776 | 0.2640 | 1.46 |
| CFO-1112/R-1336zeE | 85/15 | 71.5 | 0.0754 | 0.2572 | 1.23 |
| CFO-1112/R-1336zeE | 90/10 | 72.6 | 0.0731 | 0.2504 | 0.93 |
| CFO-1112/R-1336zeE | 95/5 | 73.8 | 0.0708 | 0.2435 | 0.53 |
| CFO-1112/R-1336zeE | 99/1 | 74.7 | 0.0689 | 0.2379 | 0.12 |
| CFO-1112/R-1234zeE | 75/25 | 77.2 | 0.1083 | 0.3644 | 11.01 |
| CFO-1112/R-1234zeE | 80/20 | 77.2 | 0.1000 | 0.3389 | 9.74 |
| CFO-1112/R-1234zeE | 85/15 | 77.1 | 0.0919 | 0.3138 | 8.10 |
| CFO-1112/R-1234zeE | 90/10 | 76.8 | 0.0840 | 0.2887 | 6.03 |
| CFO-1112/R-1234zeE | 95/5 | 76.1 | 0.0762 | 0.2632 | 3.41 |
| CFO-1112/R-1234zeE | 99/1 | 75.3 | 0.0700 | 0.2420 | 0.77 |
| CFO-1112/R-32 | 95/5 | 90.4 | 0.1015 | 0.3797 | 19.20 |
| CFO-1112/R-32 | 99/1 | 79.3 | 0.0739 | 0.2672 | 4.61 |
| CFO-1112/R-125 | 90/10 | 86.5 | 0.1013 | 0.3811 | 19.74 |
| CFO-1112/R-125 | 95/5 | 82.8 | 0.0832 | 0.3142 | 11.34 |
| CFO-1112/R-125 | 99/1 | 77.1 | 0.0710 | 0.2532 | 2.58 |
| CFO-1112/R-134a | 85/15 | 81.9 | 0.1036 | 0.3591 | 13.92 |
| CFO-1112/R-134a | 90/10 | 80.6 | 0.0915 | 0.3210 | 10.60 |
| CFO-1112/R-134a | 95/5 | 78.6 | 0.0796 | 0.2808 | 6.09 |
| CFO-1112/R-134a | 99/1 | 75.9 | 0.0706 | 0.2458 | 1.38 |
| CFO-1112/R-1234yf | 80/20 | 79.8 | 0.1126 | 0.3813 | 15.64 |
| CFO-1112/R-1234yf | 85/15 | 79.5 | 0.1010 | 0.3469 | 13.11 |
| CFO-1112/R-1234yf | 90/10 | 78.8 | 0.0896 | 0.3120 | 9.80 |
| CFO-1112/R-1234yf | 95/5 | 77.5 | 0.0787 | 0.2756 | 5.54 |
| CFO-1112/R-1234yf | 99/1 | 75.6 | 0.0704 | 0.2447 | 1.24 |
| CFO-1112/R-152a | 85/15 | 84.1 | 0.1129 | 0.3811 | 14.07 |
| CFO-1112/R-152a | 90/10 | 82.3 | 0.0980 | 0.3366 | 11.11 |
| CFO-1112/R-152a | 95/5 | 79.5 | 0.0831 | 0.2889 | 6.62 |
| CFO-1112/R-152a | 99/1 | 76.1 | 0.0713 | 0.2475 | 1.54 |
| CFO-1112/R-134 | 80/20 | 80.2 | 0.1063 | 0.3622 | 12.06 |
| CFO-1112/R-134 | 85/15 | 79.6 | 0.0965 | 0.3317 | 10.10 |
| CFO-1112/R-134 | 90/10 | 78.6 | 0.0869 | 0.3009 | 7.55 |
| CFO-1112/R-134 | 95/5 | 77.1 | 0.0776 | 0.2694 | 4.26 |
| CFO-1112/R-134 | 99/1 | 75.5 | 0.0703 | 0.2433 | 0.95 |
| CFO-1112/R-1123 | 95/5 | 87.5 | 0.0913 | 0.3552 | 16.596 |
| CFO-1112/R-1123 | 99/1 | 78.38 | 0.0722 | 0.2616 | 3.79 |

TABLE 2B

| Composition | wt % | $CAP_{cool}$ (kJ/m³) | Cooling Cap Rel to R-245fa | Cooling COP Rel to R-245fa | Heating CAP Rel to R-245fa | Heating COP Rel to R-245fa | Mass Flow Rel to R-245fa |
|---|---|---|---|---|---|---|---|
| R-245fa | 100 | 802.7 | 100% | 100% | 100% | 100% | 100% |
| CFO-1112/R-245fa | 1/99 | 802.8 | 100% | 100% | 100% | 100% | 100% |
| CFO-1112/R-245fa | 5/95 | 802.9 | 100% | 100% | 100% | 100% | 100% |
| CFO-1112/R-245fa | 10/90 | 801.8 | 100% | 100% | 100% | 100% | 100% |
| CFO-1112/R-245fa | 15/85 | 799.5 | 100% | 100% | 100% | 100% | 100% |
| CFO-1112/R-245fa | 20/80 | 796.1 | 99% | 100% | 99% | 100% | 100% |
| CFO-1112/R-245fa | 25/75 | 791.6 | 99% | 100% | 99% | 100% | 100% |
| CFO-1112/R-245fa | 30/70 | 786.3 | 98% | 100% | 98% | 100% | 100% |
| CFO-1112/R-245fa | 35/65 | 780.1 | 97% | 101% | 97% | 100% | 99% |
| CFO-1112/R-245fa | 35.5/64.5 | 779.4 | 97% | 101% | 97% | 100% | 99% |
| CFO-1112/R-245fa | 40/60 | 773.1 | 96% | 101% | 96% | 101% | 99% |
| CFO-1112/R-245fa | 45/55 | 765.4 | 95% | 101% | 95% | 101% | 97% |
| CFO-1112/R-245fa | 50/50 | 757.1 | 94% | 101% | 94% | 101% | 96% |
| CFO-1112/R-245fa | 55/45 | 748.4 | 93% | 101% | 93% | 101% | 95% |
| CFO-1112/R-245fa | 60/40 | 739.2 | 92% | 101% | 92% | 101% | 95% |
| CFO-1112/R-245fa | 65/35 | 729.5 | 91% | 101% | 91% | 101% | 93% |
| CFO-1112/R-245fa | 70/30 | 719.6 | 90% | 101% | 89% | 101% | 92% |
| CFO-1112/R-245fa | 75/25 | 709.3 | 88% | 101% | 88% | 101% | 91% |
| CFO-1112/R-245fa | 80/20 | 698.6 | 87% | 101% | 87% | 101% | 89% |
| CFO-1112/R-245fa | 85/15 | 687.6 | 86% | 101% | 86% | 101% | 88% |
| CFO-1112/R-245fa | 90/10 | 676.2 | 84% | 101% | 84% | 101% | 85% |
| CFO-1112/R-245fa | 95/5 | 664.0 | 83% | 101% | 83% | 101% | 84% |
| CFO-1112/R-245fa | 99/1 | 653.5 | 81% | 101% | 81% | 101% | 82% |
| CFO-1112/R-1233zdE | 1/99 | 700.1 | 87% | 100% | 87% | 100% | 86% |
| CFO-1112/R-1233zdE | 5/95 | 701.6 | 87% | 100% | 87% | 100% | 86% |
| CFO-1112/R-1233zdE | 10/90 | 702.7 | 88% | 101% | 87% | 100% | 86% |
| CFO-1112/R-1233zdE | 15/85 | 703.0 | 88% | 101% | 88% | 100% | 88% |
| CFO-1112/R-1233zdE | 20/80 | 702.6 | 88% | 101% | 87% | 101% | 88% |
| CFO-1112/R-1233zdE | 25/75 | 701.6 | 87% | 101% | 87% | 101% | 88% |
| CFO-1112/R-1233zdE | 27.4/72.6 | 700.9 | 87% | 101% | 87% | 101% | 88% |
| CFO-1112/R-1233zdE | 30/70 | 700.1 | 87% | 101% | 87% | 101% | 88% |
| CFO-1112/R-1233zdE | 35/65 | 698.0 | 87% | 101% | 87% | 101% | 88% |
| CFO-1112/R-1233zdE | 40/60 | 695.5 | 87% | 101% | 87% | 101% | 88% |
| CFO-1112/R-1233zdE | 45/55 | 692.7 | 86% | 101% | 86% | 101% | 86% |
| CFO-1112/R-1233zdE | 50/50 | 689.6 | 86% | 101% | 86% | 101% | 86% |
| CFO-1112/R-1233zdE | 55/45 | 686.2 | 85% | 101% | 85% | 101% | 86% |
| CFO-1112/R-1233zdE | 60/40 | 682.7 | 85% | 101% | 85% | 101% | 86% |
| CFO-1112/R-1233zdE | 65/35 | 679.1 | 85% | 101% | 84% | 101% | 86% |

TABLE 2B-continued

| Composition | wt % | CAP$_{cool}$ (kJ/m$^3$) | Cooling Cap Rel to R-245fa | Cooling COP Rel to R-245fa | Heating CAP Rel to R-245fa | Heating COP Rel to R-245fa | Mass Flow Rel to R-245fa |
|---|---|---|---|---|---|---|---|
| CFO-1112/R-1233zdE | 70/30 | 675.3 | 84% | 101% | 84% | 101% | 85% |
| CFO-1112/R-1233zdE | 75/25 | 671.6 | 84% | 101% | 84% | 101% | 85% |
| CFO-1112/R-1233zdE | 80/20 | 667.8 | 83% | 101% | 83% | 101% | 85% |
| CFO-1112/R-1233zdE | 85/15 | 663.9 | 83% | 101% | 83% | 101% | 84% |
| CFO-1112/R-1233zdE | 90/10 | 659.9 | 82% | 101% | 82% | 101% | 84% |
| CFO-1112/R-1233zdE | 95/5 | 655.6 | 82% | 101% | 82% | 101% | 82% |
| CFO-1112/R-1233zdE | 99/1 | 651.7 | 81% | 101% | 81% | 101% | 82% |
| CFO-1112/I-Pentane | 70/30 | 663.0 | 83% | 101% | 82% | 101% | 70% |
| CFO-1112/I-Pentane | 75/25 | 671.9 | 84% | 101% | 84% | 101% | 73% |
| CFO-1112/I-Pentane | 80/20 | 678.2 | 84% | 101% | 84% | 101% | 77% |
| CFO-1112/I-Pentane | 82.3/17.1 | 680.0 | 85% | 101% | 85% | 101% | 78% |
| CFO-1112/I-Pentane | 85/15 | 680.9 | 85% | 101% | 85% | 101% | 80% |
| CFO-1112/I-Pentane | 90/10 | 678.7 | 85% | 101% | 84% | 101% | 81% |
| CFO-1112/I-Pentane | 95/5 | 670.0 | 83% | 101% | 83% | 101% | 82% |
| CFO-1112/I-Pentane | 99/1 | 655.9 | 82% | 101% | 82% | 101% | 82% |
| CFO-1112/R-1336mzzE | 1/99 | 1019.5 | 127% | 98% | 127% | 99% | 169% |
| CFO-1112/R-1336mzzE | 5/95 | 1021.1 | 127% | 99% | 128% | 99% | 168% |
| CFO-1112/R-1336mzzE | 10/90 | 1018.2 | 127% | 99% | 127% | 99% | 166% |
| CFO-1112/R-1336mzzE | 15/85 | 1010.4 | 126% | 99% | 126% | 99% | 162% |
| CFO-1112/R-1336mzzE | 20/80 | 998.3 | 124% | 99% | 125% | 99% | 158% |
| CFO-1112/R-1336mzzE | 25/75 | 982.6 | 122% | 99% | 123% | 100% | 154% |
| CFO-1112/R-1336mzzE | 30/70 | 964.2 | 120% | 100% | 120% | 100% | 149% |
| CFO-1112/R-1336mzzE | 35/65 | 943.9 | 118% | 100% | 118% | 100% | 143% |
| CFO-1112/R-1336mzzE | 40/60 | 922.5 | 115% | 100% | 115% | 100% | 138% |
| CFO-1112/R-1336mzzE | 45/55 | 900.2 | 112% | 100% | 112% | 100% | 132% |
| CFO-1112/R-1336mzzE | 50/50 | 877.5 | 109% | 100% | 109% | 100% | 127% |
| CFO-1112/R-1336mzzE | 55/45 | 854.4 | 106% | 101% | 106% | 100% | 122% |
| CFO-1112/R-1336mzzE | 60/40 | 831.3 | 104% | 101% | 103% | 101% | 116% |
| CFO-1112/R-1336mzzE | 65/35 | 808.1 | 101% | 101% | 101% | 101% | 112% |
| CFO-1112/R-1336mzzE | 70/30 | 785.0 | 98% | 101% | 98% | 101% | 107% |
| CFO-1112/R-1336mzzE | 75/25 | 762.2 | 95% | 101% | 95% | 101% | 103% |
| CFO-1112/R-1336mzzE | 80/20 | 739.6 | 92% | 101% | 92% | 101% | 99% |
| CFO-1112/R-1336mzzE | 85/15 | 717.2 | 89% | 101% | 89% | 101% | 95% |
| CFO-1112/R-1336mzzE | 90/10 | 695.2 | 87% | 101% | 86% | 101% | 91% |
| CFO-1112/R-1336mzzE | 95/5 | 673.1 | 84% | 101% | 84% | 101% | 86% |
| CFO-1112/R-1336mzzE | 99/1 | 655.2 | 82% | 101% | 81% | 101% | 82% |
| CFO-1112/R-1224ydZ | 1/99 | 799.3 | 100% | 100% | 100% | 100% | 114% |
| CFO-1112/R-1224ydZ | 5/95 | 800.3 | 100% | 100% | 100% | 100% | 114% |
| CFO-1112/R-1224ydZ | 10/90 | 799.7 | 100% | 101% | 100% | 100% | 114% |
| CFO-1112/R-1224ydZ | 15/85 | 797.4 | 99% | 101% | 99% | 100% | 112% |
| CFO-1112/R-1224ydZ | 20/80 | 793.4 | 99% | 101% | 99% | 101% | 111% |
| CFO-1112/R-1224ydZ | 25/75 | 788.2 | 98% | 101% | 98% | 101% | 109% |
| CFO-1112/R-1224ydZ | 30/70 | 781.7 | 97% | 101% | 97% | 101% | 108% |
| CFO-1112/R-1224ydZ | 35/65 | 774.4 | 96% | 101% | 96% | 101% | 107% |
| CFO-1112/R-1224ydZ | 40/60 | 766.3 | 95% | 101% | 95% | 101% | 105% |
| CFO-1112/R-1224ydZ | 45/55 | 757.6 | 94% | 101% | 94% | 101% | 104% |
| CFO-1112/R-1224ydZ | 50/50 | 748.6 | 93% | 101% | 93% | 101% | 101% |
| CFO-1112/R-1224ydZ | 55/45 | 739.2 | 92% | 101% | 92% | 101% | 100% |
| CFO-1112/R-1224ydZ | 60/40 | 729.7 | 91% | 101% | 91% | 101% | 97% |
| CFO-1112/R-1224ydZ | 65/35 | 720.0 | 90% | 101% | 90% | 101% | 96% |
| CFO-1112/R-1224ydZ | 70/30 | 710.4 | 89% | 101% | 88% | 101% | 95% |
| CFO-1112/R-1224ydZ | 75/25 | 700.7 | 87% | 101% | 87% | 101% | 92% |
| CFO-1112/R-1224ydZ | 80/20 | 691.0 | 86% | 101% | 86% | 101% | 91% |
| CFO-1112/R-1224ydZ | 85/15 | 681.3 | 85% | 101% | 85% | 101% | 88% |
| CFO-1112/R-1224ydZ | 90/10 | 671.6 | 84% | 101% | 84% | 101% | 86% |
| CFO-1112/R-1224ydZ | 95/5 | 661.5 | 82% | 101% | 82% | 101% | 84% |
| CFO-1112/R-1224ydZ | 99/1 | 652.9 | 81% | 101% | 81% | 101% | 82% |
| CFO-1112/R-1234zeZ | 1/99 | 942.7 | 117% | 100% | 117% | 100% | 107% |
| CFO-1112/R-1234zeZ | 5/95 | 942.2 | 117% | 100% | 117% | 100% | 108% |
| CFO-1112/R-1234zeZ | 10/90 | 940.2 | 117% | 100% | 117% | 100% | 108% |
| CFO-1112/R-1234zeZ | 15/85 | 936.6 | 117% | 100% | 117% | 100% | 109% |
| CFO-1112/R-1234zeZ | 20/80 | 931.3 | 116% | 100% | 116% | 100% | 109% |
| CFO-1112/R-1234zeZ | 25/75 | 924.3 | 115% | 100% | 115% | 100% | 109% |
| CFO-1112/R-1234zeZ | 30/70 | 915.6 | 114% | 100% | 114% | 100% | 109% |
| CFO-1112/R-1234zeZ | 35/65 | 905.2 | 113% | 101% | 113% | 100% | 108% |
| CFO-1112/R-1234zeZ | 40/60 | 893.3 | 111% | 101% | 111% | 100% | 108% |
| CFO-1112/R-1234zeZ | 45/55 | 879.9 | 110% | 101% | 110% | 101% | 107% |
| CFO-1112/R-1234zeZ | 50/50 | 865.1 | 108% | 101% | 108% | 101% | 105% |
| CFO-1112/R-1234zeZ | 55/45 | 849.0 | 106% | 101% | 106% | 101% | 104% |
| CFO-1112/R-1234zeZ | 60/40 | 831.7 | 104% | 101% | 103% | 101% | 103% |
| CFO-1112/R-1234zeZ | 65/35 | 813.3 | 101% | 101% | 101% | 101% | 100% |
| CFO-1112/R-1234zeZ | 70/30 | 793.8 | 99% | 101% | 99% | 101% | 99% |
| CFO-1112/R-1234zeZ | 75/25 | 773.2 | 96% | 101% | 96% | 101% | 96% |
| CFO-1112/R-1234zeZ | 80/20 | 751.5 | 94% | 101% | 93% | 101% | 93% |
| CFO-1112/R-1234zeZ | 85/15 | 728.6 | 91% | 101% | 91% | 101% | 91% |

TABLE 2B-continued

| Composition | wt % | CAP$_{cool}$ (kJ/m$^3$) | Cooling Cap Rel to R-245fa | Cooling COP Rel to R-245fa | Heating CAP Rel to R-245fa | Heating COP Rel to R-245fa | Mass Flow Rel to R-245fa |
|---|---|---|---|---|---|---|---|
| CFO-1112/R-1234zeZ | 90/10 | 704.4 | 88% | 101% | 88% | 101% | 88% |
| CFO-1112/R-1234zeZ | 95/5 | 678.6 | 85% | 101% | 84% | 101% | 85% |
| CFO-1112/R-1234zeZ | 99/1 | 656.4 | 82% | 101% | 82% | 101% | 82% |
| CFO-1112/R-1336yf | 35/65 | 1027.3 | 128% | 100% | 128% | 100% | 165% |
| CFO-1112/R-1336yf | 40/60 | 1001.2 | 125% | 100% | 125% | 100% | 157% |
| CFO-1112/R-1336yf | 45/55 | 974.4 | 121% | 100% | 121% | 100% | 150% |
| CFO-1112/R-1336yf | 50/50 | 947.1 | 118% | 101% | 118% | 100% | 143% |
| CFO-1112/R-1336yf | 55/45 | 919.6 | 115% | 101% | 114% | 101% | 135% |
| CFO-1112/R-1336yf | 60/40 | 891.8 | 111% | 101% | 111% | 101% | 130% |
| CFO-1112/R-1336yf | 65/35 | 863.8 | 108% | 101% | 107% | 101% | 123% |
| CFO-1112/R-1336yf | 70/30 | 835.5 | 104% | 101% | 104% | 101% | 116% |
| CFO-1112/R-1336yf | 75/25 | 806.8 | 101% | 101% | 100% | 101% | 111% |
| CFO-1112/R-1336yf | 80/20 | 777.8 | 97% | 101% | 97% | 101% | 104% |
| CFO-1112/R-1336yf | 85/15 | 748.1 | 93% | 101% | 93% | 101% | 99% |
| CFO-1112/R-1336yf | 90/10 | 717.5 | 89% | 101% | 89% | 101% | 93% |
| CFO-1112/R-1336yf | 95/5 | 685.6 | 85% | 101% | 85% | 101% | 88% |
| CFO-1112/R-1336yf | 99/1 | 658.1 | 82% | 101% | 82% | 101% | 82% |
| CFO-1112/R-1336zeE | 1/99 | 991.9 | 124% | 99% | 124% | 99% | 173% |
| CFO-1112/R-1336zeE | 5/95 | 978.2 | 122% | 99% | 122% | 99% | 168% |
| CFO-1112/R-1336zeE | 10/90 | 961.1 | 120% | 99% | 120% | 99% | 162% |
| CFO-1112/R-1336zeE | 15/85 | 944.1 | 118% | 99% | 118% | 100% | 155% |
| CFO-1112/R-1336zeE | 20/80 | 927.0 | 115% | 100% | 116% | 100% | 150% |
| CFO-1112/R-1336zeE | 25/75 | 909.9 | 113% | 100% | 113% | 100% | 145% |
| CFO-1112/R-1336zeE | 30/70 | 892.9 | 111% | 100% | 111% | 100% | 141% |
| CFO-1112/R-1336zeE | 35/65 | 875.8 | 109% | 100% | 109% | 100% | 135% |
| CFO-1112/R-1336zeE | 40/60 | 858.7 | 107% | 100% | 107% | 100% | 130% |
| CFO-1112/R-1336zeE | 45/55 | 841.7 | 105% | 101% | 105% | 100% | 126% |
| CFO-1112/R-1336zeE | 50/50 | 824.7 | 103% | 101% | 103% | 101% | 122% |
| CFO-1112/R-1336zeE | 55/45 | 807.7 | 101% | 101% | 100% | 101% | 116% |
| CFO-1112/R-1336zeE | 60/40 | 790.7 | 99% | 101% | 98% | 101% | 112% |
| CFO-1112/R-1336zeE | 65/35 | 773.7 | 96% | 101% | 96% | 101% | 108% |
| CFO-1112/R-1336zeE | 70/30 | 756.7 | 94% | 101% | 94% | 101% | 104% |
| CFO-1112/R-1336zeE | 75/25 | 739.6 | 92% | 101% | 92% | 101% | 100% |
| CFO-1112/R-1336zeE | 80/20 | 722.4 | 90% | 101% | 90% | 101% | 96% |
| CFO-1112/R-1336zeE | 85/15 | 705.1 | 88% | 101% | 88% | 101% | 93% |
| CFO-1112/R-1336zeE | 90/10 | 687.4 | 86% | 101% | 85% | 101% | 89% |
| CFO-1112/R-1336zeE | 95/5 | 669.4 | 83% | 101% | 83% | 101% | 85% |
| CFO-1112/R-1336zeE | 99/1 | 654.5 | 82% | 101% | 81% | 101% | 82% |
| CFO-1112/R-1234zeE | 75/25 | 998.8 | 124% | 101% | 124% | 101% | 123% |
| CFO-1112/R-1234zeE | 80/20 | 928.1 | 116% | 101% | 115% | 101% | 115% |
| CFO-1112/R-1234zeE | 85/15 | 858.2 | 107% | 101% | 107% | 101% | 107% |
| CFO-1112/R-1234zeE | 90/10 | 789.1 | 98% | 101% | 98% | 101% | 99% |
| CFO-1112/R-1234zeE | 95/5 | 720.1 | 90% | 101% | 90% | 101% | 91% |
| CFO-1112/R-1234zeE | 99/1 | 664.6 | 83% | 101% | 83% | 101% | 84% |
| CFO-1112/R-32 | 95/5 | 992.4 | 124% | 98% | 124% | 98% | 111% |
| CFO-1112/R-32 | 99/1 | 710.4 | 89% | 99% | 89% | 99% | 86% |
| CFO-1112/R-125 | 90/10 | 985.4 | 123% | 97% | 123% | 98% | 118% |
| CFO-1112/R-125 | 95/5 | 805.3 | 100% | 96% | 101% | 97% | 99% |
| CFO-1112/R-125 | 99/1 | 678.8 | 85% | 99% | 85% | 99% | 85% |
| CFO-1112/R-134a | 85/15 | 981.3 | 122% | 101% | 122% | 101% | 118% |
| CFO-1112/R-134a | 90/10 | 870.4 | 108% | 100% | 108% | 100% | 105% |
| CFO-1112/R-134a | 95/5 | 758.9 | 95% | 100% | 95% | 100% | 93% |
| CFO-1112/R-134a | 99/1 | 671.8 | 84% | 101% | 84% | 101% | 84% |
| CFO-1112/R-1234yf | 80/20 | 1045.2 | 130% | 101% | 130% | 101% | 128% |
| CFO-1112/R-1234yf | 85/15 | 945.2 | 118% | 101% | 118% | 101% | 116% |
| CFO-1112/R-1234yf | 90/10 | 845.1 | 105% | 100% | 105% | 100% | 104% |
| CFO-1112/R-1234yf | 95/5 | 746.2 | 93% | 100% | 93% | 100% | 93% |
| CFO-1112/R-1234yf | 99/1 | 669.3 | 83% | 101% | 83% | 101% | 84% |
| CFO-1112/R-152a | 85/15 | 1052.9 | 131% | 101% | 131% | 101% | 116% |
| CFO-1112/R-152a | 90/10 | 923.4 | 115% | 101% | 115% | 101% | 105% |
| CFO-1112/R-152a | 95/5 | 787.7 | 98% | 100% | 98% | 100% | 95% |
| CFO-1112/R-152a | 99/1 | 677.8 | 84% | 101% | 84% | 101% | 84% |
| CFO-1112/R-134 | 80/20 | 996.0 | 124% | 101% | 124% | 101% | 119% |
| CFO-1112/R-134 | 85/15 | 908.8 | 113% | 101% | 113% | 101% | 109% |
| CFO-1112/R-134 | 90/10 | 822.0 | 102% | 101% | 102% | 101% | 100% |

TABLE 2B-continued

| Composition | wt % | CAP$_{cool}$ (kJ/m³) | Cooling Cap Rel to R-245fa | Cooling COP Rel to R-245fa | Heating CAP Rel to R-245fa | Heating COP Rel to R-245fa | Mass Flow Rel to R-245fa |
|---|---|---|---|---|---|---|---|
| CFO-1112/R-134 | 95/5 | 735.8 | 92% | 101% | 92% | 101% | 91% |
| CFO-1112/R-134 | 99/1 | 667.6 | 83% | 101% | 83% | 101% | 84% |
| CFO-1112/R-1123 | 95/5 | 898.6 | 112% | 96% | 113% | 96% | 104% |
| CFO-1112/R-1123 | 99/1 | 693.5 | 86% | 98% | 87% | 99% | 85% |

The results in Tables 2A-2B show that CFO-1112 mixtures analyzed in this example are good alternatives to R-245fa with similar cooling and heating capacities and energy efficiencies (COP). Mixtures with low temperature glide (<−1K) are particularly suitable for use in centrifugal chillers. Mixtures with high glide are suitable for use in heat exchangers with countercurrent flow or cross-countercurrent flow. Compressor discharge temperatures for the mixtures and pure fluids were also similar to R-245fa.

Example 3

Cooling and Heating Performance Data Comparison of CFO-1112 Blends with R-236Fa

The cooling and heating performance for mixtures containing CFO-1112 compared to the cooling and heating performance for mixtures containing R-236fa was determined. Measurements included pressure in the evaporator (Evap) and condenser (Cond), compressor discharge temperature (Disch T), Average Temperature Glide for the evaporator and condenser (Avg Temp Glide), and Mass Flow Rate for a compressor displacement of 0.1 m³/min. Relative energy efficiency (COP) and volumetric capacity (Cap) for mixtures containing CFO-1112 relative to R-236fa were also determined. The results are shown in Table 3A-3B below.

The data was based on the following conditions:

| | |
|---|---|
| Evaporator temperature | 10° C. |
| Condenser temperature | 46.1° C. |
| Subcool amount | 8.3K |
| Superheat amount | 11.1K |
| Compressor efficiency | 70% |

TABLE 3A

| Composition | wt % | Disch T (° C.) | Evap P (MPa) | Cond P (MPa) | Average glide (K) |
|---|---|---|---|---|---|
| R-236fa | 100 | 57.8 | 0.1597 | 0.522 | 0 |
| CFO-1112/R-1336yf | 1/99 | 53.2 | 0.1396 | 0.4450 | 0.01 |
| CFO-1112/R-1336yf | 5/95 | 53.8 | 0.1385 | 0.4409 | 0.07 |
| CFO-1112/R-1336yf | 10/90 | 54.6 | 0.1364 | 0.4344 | 0.22 |
| CFO-1112/R-1336yf | 15/85 | 55.5 | 0.1338 | 0.4265 | 0.48 |
| CFO-1112/R-1336yf | 20/80 | 56.5 | 0.1307 | 0.4174 | 0.84 |
| CFO-1112/R-1336yf | 25/75 | 57.6 | 0.1272 | 0.4075 | 1.29 |
| CFO-1112/R-1336yf | 30/70 | 58.7 | 0.1235 | 0.3968 | 1.79 |
| CFO-1112/R-1234zeE | 40/60 | 73.6 | 0.1773 | 0.5643 | 11.87 |
| CFO-1112/R-1234zeE | 45/55 | 74.4 | 0.1659 | 0.5321 | 12.50 |
| CFO-1112/R-1234zeE | 50/50 | 75.1 | 0.1552 | 0.5014 | 12.90 |
| CFO-1112/R-1234zeE | 55/45 | 75.8 | 0.1450 | 0.4722 | 13.06 |
| CFO-1112/R-1234zeE | 60/40 | 76.3 | 0.1352 | 0.4440 | 12.96 |
| CFO-1112/R-1234zeE | 65/35 | 76.7 | 0.1259 | 0.4168 | 12.60 |
| CFO-1112/R-1234zeE | 70/30 | 77.0 | 0.1169 | 0.3903 | 11.96 |
| CFO-1112/R-32 | 90/10 | 98.0 | 0.1417 | 0.5028 | 30.86 |
| CFO-1112/R-125 | 75/25 | 90.3 | 0.1634 | 0.5575 | 34.18 |
| CFO-1112/R-125 | 80/20 | 89.7 | 0.1422 | 0.5005 | 30.80 |
| CFO-1112/R-125 | 85/15 | 88.5 | 0.1213 | 0.4423 | 26.08 |
| CFO-1112/R-134a | 55/45 | 82.7 | 0.1803 | 0.5834 | 19.21 |
| CFO-1112/R-134a | 60/40 | 83.0 | 0.1667 | 0.5441 | 19.53 |
| CFO-1112/R-134a | 65/35 | 83.3 | 0.1536 | 0.5061 | 19.47 |
| CFO-1112/R-134a | 70/30 | 83.3 | 0.1408 | 0.4690 | 18.96 |
| CFO-1112/R-134a | 75/25 | 83.1 | 0.1283 | 0.4325 | 17.94 |
| CFO-1112/R-134a | 80/20 | 82.7 | 0.1159 | 0.3961 | 16.30 |
| CFO-1112/R-1234yf | 55/45 | 78.1 | 0.1765 | 0.5595 | 20.01 |
| CFO-1112/R-1234yf | 60/40 | 78.7 | 0.1628 | 0.5218 | 20.03 |
| CFO-1112/R-1234yf | 65/35 | 79.3 | 0.1496 | 0.4855 | 19.66 |
| CFO-1112/R-1234yf | 70/30 | 79.7 | 0.1369 | 0.4502 | 18.83 |
| CFO-1112/R-1234yf | 75/25 | 79.9 | 0.1246 | 0.4156 | 17.52 |
| CFO-1112/R-152a | 60/40 | 87.0 | 0.1833 | 0.5818 | 16.66 |
| CFO-1112/R-152a | 65/35 | 86.9 | 0.1695 | 0.5428 | 17.16 |
| CFO-1112/R-152a | 70/30 | 86.7 | 0.1557 | 0.5037 | 17.28 |
| CFO-1112/R-152a | 75/25 | 86.2 | 0.1417 | 0.4641 | 16.92 |
| CFO-1112/R-152a | 80/20 | 85.4 | 0.1275 | 0.4234 | 15.92 |
| CFO-1112/R-134 | 45/55 | 79.1 | 0.1814 | 0.5835 | 13.80 |
| CFO-1112/R-134 | 50/50 | 79.7 | 0.1696 | 0.5495 | 14.56 |
| CFO-1112/R-134 | 55/45 | 80.2 | 0.1584 | 0.5167 | 15.03 |
| CFO-1112/R-134 | 60/40 | 80.5 | 0.1475 | 0.4848 | 15.19 |
| CFO-1112/R-134 | 65/35 | 80.7 | 0.1369 | 0.4537 | 15.01 |
| CFO-1112/R-134 | 70/30 | 80.8 | 0.1265 | 0.4230 | 14.46 |
| CFO-1112/R-134 | 75/25 | 80.6 | 0.1163 | 0.3926 | 13.49 |
| CFO-1112/R-1123 | 85/15 | 97.03 | 0.1544 | 0.5561 | 36.623 |
| CFO-1112/R-1123 | 90/10 | 93.55 | 0.1213 | 0.46 | 28.387 |

TABLE 3B

| Composition | wt % | Cooling Cap Rel to R-236fa | Cooling COP Rel to R-236fa | HeatingCAP Rel to R-236fa | Heating COP Rel to R-236fa | MassFlow Rel to R-236fa |
|---|---|---|---|---|---|---|
| R-236fa | 100 | 100% | 100% | 100% | 100% | 100% |
| CFO-1112/R-1336yf | 1/99 | 85% | 100% | 85% | 100% | 93% |
| CFO-1112/R-1336yf | 5/95 | 85% | 100% | 85% | 100% | 92% |
| CFO-1112/R-1336yf | 10/90 | 84% | 101% | 84% | 100% | 89% |
| CFO-1112/R-1336yf | 15/85 | 83% | 101% | 83% | 101% | 87% |
| CFO-1112/R-1336yf | 20/80 | 81% | 101% | 81% | 101% | 84% |
| CFO-1112/R-1336yf | 25/75 | 80% | 101% | 80% | 101% | 80% |
| CFO-1112/R-1336yf | 30/70 | 78% | 102% | 78% | 101% | 77% |

TABLE 3B-continued

| Composition | wt % | Cooling Cap Rel to R-236fa | Cooling COP Rel to R-236fa | HeatingCAP Rel to R-236fa | Heating COP Rel to R-236fa | MassFlow Rel to R-236fa |
|---|---|---|---|---|---|---|
| CFO-1112/R-1234zeE | 40/60 | 113% | 103% | 113% | 102% | 86% |
| CFO-1112/R-1234zeE | 45/55 | 107% | 103% | 107% | 102% | 81% |
| CFO-1112/R-1234zeE | 50/50 | 101% | 103% | 101% | 103% | 77% |
| CFO-1112/R-1234zeE | 55/45 | 96% | 104% | 95% | 103% | 72% |
| CFO-1112/R-1234zeE | 60/40 | 90% | 104% | 90% | 103% | 67% |
| CFO-1112/R-1234zeE | 65/35 | 85% | 104% | 84% | 103% | 63% |
| CFO-1112/R-1234zeE | 70/30 | 79% | 104% | 79% | 103% | 59% |
| CFO-1112/R-32 | 90/10 | 102% | 103% | 102% | 103% | 64% |
| CFO-1112/R-125 | 75/25 | 116% | 107% | 114% | 105% | 83% |
| CFO-1112/R-125 | 80/20 | 102% | 105% | 101% | 104% | 72% |
| CFO-1112/R-125 | 85/15 | 87% | 102% | 87% | 102% | 62% |
| CFO-1112/R-134a | 55/45 | 119% | 104% | 118% | 103% | 84% |
| CFO-1112/R-134a | 60/40 | 112% | 104% | 111% | 103% | 78% |
| CFO-1112/R-134a | 65/35 | 104% | 104% | 103% | 104% | 73% |
| CFO-1112/R-134a | 70/30 | 96% | 105% | 96% | 104% | 68% |
| CFO-1112/R-134a | 75/25 | 89% | 104% | 88% | 104% | 63% |
| CFO-1112/R-134a | 80/20 | 81% | 104% | 80% | 103% | 57% |
| CFO-1112/R-1234yf | 55/45 | 114% | 104% | 113% | 103% | 87% |
| CFO-1112/R-1234yf | 60/40 | 107% | 104% | 106% | 104% | 81% |
| CFO-1112/R-1234yf | 65/35 | 100% | 105% | 99% | 104% | 75% |
| CFO-1112/R-1234yf | 70/30 | 92% | 105% | 92% | 104% | 69% |
| CFO-1112/R-1234yf | 75/25 | 85% | 104% | 84% | 104% | 63% |
| CFO-1112/R-152a | 60/40 | 119% | 103% | 118% | 102% | 69% |
| CFO-1112/R-152a | 65/35 | 111% | 103% | 111% | 103% | 66% |
| CFO-1112/R-152a | 70/30 | 104% | 104% | 103% | 103% | 63% |
| CFO-1112/R-152a | 75/25 | 96% | 104% | 95% | 103% | 60% |
| CFO-1112/R-152a | 80/20 | 87% | 104% | 87% | 103% | 56% |
| CFO-1112/R-134 | 45/55 | 119% | 103% | 118% | 103% | 83% |
| CFO-1112/R-134 | 50/50 | 112% | 104% | 112% | 103% | 78% |
| CFO-1112/R-134 | 55/45 | 106% | 104% | 105% | 104% | 73% |
| CFO-1112/R-134 | 60/40 | 99% | 104% | 99% | 103% | 69% |
| CFO-1112/R-134 | 65/35 | 93% | 104% | 93% | 103% | 65% |
| CFO-1112/R-134 | 70/30 | 87% | 104% | 86% | 103% | 61% |
| CFO-1112/R-134 | 75/25 | 80% | 104% | 80% | 103% | 57% |
| CFO-1112/R-1123 | 85/15 | 113% | 104% | 112% | 104% | 73% |
| CFO-1112/R-1123 | 90/10 | 89% | 101% | 89% | 101% | 59% |

The results in Tables 3A-3B show that CFO-1112 mixtures analyzed in this example are good alternatives to R-236fa with similar cooling and heating capacities and energy efficiencies (COP). Mixtures with low temperature glide (<-1K) are particularly suitable for use in centrifugal chillers. Mixtures with high glide are suitable for use in heat exchangers with countercurrent flow or cross-countercurrent flow. Compressor discharge temperatures for the mixtures and pure fluids were also similar to R-236fa.

Example 4

Cooling and Heating Performance Data Comparison of CFO-1112 Blends with R-124

The cooling and heating performance for mixtures containing CFO-1112 compared to the cooling and heating performance for mixtures containing R-124 was determined. Measurements included pressure in the evaporator (Evap) and condenser (Cond), compressor discharge temperature (Disch T), Average Temperature Glide for the evaporator and condenser (Avg Temp Glide), and Mass Flow Rate for a compressor displacement of 0.1 m³/min. Relative energy efficiency (COP) and volumetric capacity (Cap) for mixtures containing CFO-1112 relative to R-124 were also determined. The results are shown in Table 4A-4B below.

The data was based on the following conditions:

| | |
|---|---|
| Evaporator temperature | 10° C. |
| Condenser temperature | 46.1° C. |
| Subcool amount | 8.3K |
| Superheat amount | 11.1K |
| Compressor efficiency | 70% |

TABLE 4A

| Composition | wt % | Disch T (° C.) | Evap P (MPa) | Cond P (MPa) | Average glide (K) |
|---|---|---|---|---|---|
| R-124 | 100 | 63.5 | 0.2341 | 0.7003 | 0 |
| CFO-1112/R-1234zeE | 1/99 | 63.6 | 0.3041 | 0.8918 | 0.36 |
| CFO-1112/R-1234zeE | 5/95 | 64.8 | 0.2876 | 0.8523 | 1.82 |
| CFO-1112/R-1234zeE | 10/90 | 66.4 | 0.2677 | 0.8041 | 3.68 |
| CFO-1112/R-1234zeE | 15/85 | 67.9 | 0.2493 | 0.7579 | 5.48 |
| CFO-1112/R-1234zeE | 20/80 | 69.2 | 0.2323 | 0.7142 | 7.15 |
| CFO-1112/R-1234zeE | 25/75 | 70.5 | 0.2168 | 0.6731 | 8.64 |
| CFO-1112/R-1234zeE | 30/70 | 71.7 | 0.2026 | 0.6346 | 9.93 |
| CFO-1112/R-1234zeE | 35/65 | 72.7 | 0.1895 | 0.5984 | 11.01 |
| CFO-1112/R-32 | 80/20 | 106.1 | 0.2210 | 0.7147 | 41.09 |
| CFO-1112/R-32 | 85/15 | 102.8 | 0.1823 | 0.6127 | 37.56 |
| CFO-1112/R-125 | 55/45 | 89.7 | 0.2529 | 0.7968 | 38.51 |
| CFO-1112/R-125 | 60/40 | 90.2 | 0.2294 | 0.7331 | 38.54 |
| CFO-1112/R-125 | 65/35 | 90.5 | 0.2068 | 0.6727 | 37.89 |
| CFO-1112/R-125 | 70/30 | 90.5 | 0.1849 | 0.6145 | 36.49 |
| CFO-1112/R-134a | 25/75 | 77.3 | 0.2830 | 0.8721 | 11.04 |
| CFO-1112/R-134a | 30/70 | 78.6 | 0.2622 | 0.8158 | 13.03 |
| CFO-1112/R-134a | 35/65 | 79.7 | 0.2432 | 0.7632 | 14.80 |
| CFO-1112/R-134a | 40/60 | 80.6 | 0.2258 | 0.7140 | 16.32 |
| CFO-1112/R-134a | 45/55 | 81.5 | 0.2096 | 0.6680 | 17.57 |
| CFO-1112/R-134a | 50/50 | 82.1 | 0.1946 | 0.6246 | 18.55 |
| CFO-1112/R-1234yf | 20/80 | 69.2 | 0.3080 | 0.9037 | 10.33 |
| CFO-1112/R-1234yf | 25/75 | 71.0 | 0.2831 | 0.8423 | 12.64 |

TABLE 4A-continued

| Composition | wt % | Disch T (° C.) | Evap P (MPa) | Cond P (MPa) | Average glide (K) |
|---|---|---|---|---|---|
| CFO-1112/R-1234yf | 30/70 | 72.6 | 0.2609 | 0.7857 | 14.66 |
| CFO-1112/R-1234yf | 35/65 | 74.0 | 0.2410 | 0.7337 | 16.38 |
| CFO-1112/R-1234yf | 40/60 | 75.2 | 0.2230 | 0.6856 | 17.78 |
| CFO-1112/R-1234yf | 45/55 | 76.3 | 0.2064 | 0.6409 | 18.87 |
| CFO-1112/R-1234yf | 50/50 | 77.2 | 0.1910 | 0.5990 | 19.61 |
| CFO-1112/R-152a | 25/75 | 83.4 | 0.2884 | 0.8652 | 7.50 |
| CFO-1112/R-152a | 30/70 | 84.3 | 0.2719 | 0.8233 | 9.13 |
| CFO-1112/R-152a | 35/65 | 85.1 | 0.2560 | 0.7816 | 10.72 |
| CFO-1112/R-152a | 40/60 | 85.7 | 0.2406 | 0.7405 | 12.22 |
| CFO-1112/R-152a | 45/55 | 86.2 | 0.2258 | 0.7001 | 13.60 |
| CFO-1112/R-152a | 50/50 | 86.6 | 0.2113 | 0.6602 | 14.82 |
| CFO-1112/R-152a | 55/45 | 86.9 | 0.1972 | 0.6208 | 15.86 |
| CFO-1112/R-134 | 10/90 | 71.5 | 0.2867 | 0.8713 | 3.01 |
| CFO-1112/R-134 | 15/85 | 72.8 | 0.2689 | 0.8258 | 4.82 |
| CFO-1112/R-134 | 20/80 | 74.1 | 0.2518 | 0.7809 | 6.67 |
| CFO-1112/R-134 | 25/75 | 75.4 | 0.2357 | 0.7374 | 8.46 |
| CFO-1112/R-134 | 30/70 | 76.5 | 0.2207 | 0.6958 | 10.10 |
| CFO-1112/R-134 | 35/65 | 77.5 | 0.2067 | 0.6564 | 11.55 |
| CFO-1112/R-134 | 40/60 | 78.3 | 0.1937 | 0.6191 | 12.80 |
| CFO-1112/R-1123 | 75/25 | 100.76 | 0.223 | 0.7365 | 45.891 |
| CFO-1112/R-1123 | 80/20 | 99.26 | 0.1886 | 0.6473 | 42.231 |

The results in Table 4A-4B show that CFO-1112 mixtures analyzed in this example are good alternatives to R-124 with similar cooling and heating capacities and energy efficiencies (COP). Mixtures with low temperature glide (<−1K) are particularly suitable for use in centrifugal chillers. Mixtures with high glide are suitable for use in heat exchangers with countercurrent flow or cross-countercurrent flow. Compressor discharge temperatures for the mixtures and pure fluids were also similar to R-124.

Example 5

Cooling and Heating Performance Data Comparison of CFO-1112 Blends with R-134a

The cooling and heating performance for mixtures containing CFO-1112 compared to the cooling and heating performance for mixtures containing R-134a was determined. Measurements included pressure in the evaporator (Evap) and condenser (Cond), compressor discharge temperature (Disch T), Average Temperature Glide for the evaporator and condenser (Avg Temp Glide), and Mass Flow Rate for a compressor displacement of 0.1 m$^3$/min. Relative energy efficiency (COP) and volumetric capacity

TABLE 4B

| Composition | wt % | Cooling Cap Rel to R-124 | Cooling COP Rel to R-124 | Heating CAP Rel to R-124 | Heating COP Rel to R-124 | Mass Flow Rel to R-124 |
|---|---|---|---|---|---|---|
| R-124 | 100 | 100% | 100% | 100% | 100% | 100% |
| CFO-1112/R-1234zeE | 1/99 | 125% | 99% | 125% | 99% | 110% |
| CFO-1112/R-1234zeE | 5/95 | 120% | 99% | 120% | 99% | 104% |
| CFO-1112/R-1234zeE | 10/90 | 114% | 99% | 114% | 100% | 97% |
| CFO-1112/R-1234zeE | 15/85 | 108% | 100% | 108% | 100% | 90% |
| CFO-1112/R-1234zeE | 20/80 | 102% | 100% | 102% | 100% | 84% |
| CFO-1112/R-1234zeE | 25/75 | 97% | 101% | 97% | 101% | 79% |
| CFO-1112/R-1234zeE | 30/70 | 92% | 101% | 92% | 101% | 74% |
| CFO-1112/R-1234zeE | 35/65 | 87% | 102% | 87% | 102% | 69% |
| CFO-1112/R-32 | 80/20 | 111% | 107% | 110% | 105% | 65% |
| CFO-1112/R-32 | 85/15 | 94% | 106% | 93% | 105% | 57% |
| CFO-1112/R-125 | 55/45 | 123% | 108% | 121% | 106% | 94% |
| CFO-1112/R-125 | 60/40 | 113% | 108% | 112% | 107% | 86% |
| CFO-1112/R-125 | 65/35 | 104% | 108% | 103% | 107% | 77% |
| CFO-1112/R-125 | 70/30 | 95% | 108% | 93% | 106% | 70% |
| CFO-1112/R-134a | 25/75 | 125% | 99% | 125% | 99% | 95% |
| CFO-1112/R-134a | 30/70 | 117% | 100% | 117% | 100% | 88% |
| CFO-1112/R-134a | 35/65 | 111% | 101% | 111% | 101% | 82% |
| CFO-1112/R-134a | 40/60 | 104% | 102% | 104% | 101% | 77% |
| CFO-1112/R-134a | 45/55 | 98% | 102% | 98% | 102% | 72% |
| CFO-1112/R-134a | 50/50 | 93% | 103% | 92% | 103% | 67% |
| CFO-1112/R-1234yf | 20/80 | 126% | 98% | 126% | 98% | 113% |
| CFO-1112/R-1234yf | 25/75 | 119% | 99% | 119% | 99% | 103% |
| CFO-1112/R-1234yf | 30/70 | 112% | 100% | 112% | 100% | 95% |
| CFO-1112/R-1234yf | 35/65 | 106% | 101% | 106% | 101% | 88% |
| CFO-1112/R-1234yf | 40/60 | 100% | 102% | 100% | 102% | 81% |
| CFO-1112/R-1234yf | 45/55 | 94% | 103% | 94% | 102% | 76% |
| CFO-1112/R-1234yf | 50/50 | 89% | 104% | 88% | 103% | 70% |
| CFO-1112/R-152a | 25/75 | 126% | 99% | 126% | 99% | 68% |
| CFO-1112/R-152a | 30/70 | 120% | 99% | 120% | 99% | 65% |
| CFO-1112/R-152a | 35/65 | 114% | 100% | 114% | 100% | 63% |
| CFO-1112/R-152a | 40/60 | 108% | 100% | 108% | 100% | 61% |
| CFO-1112/R-152a | 45/55 | 103% | 101% | 103% | 101% | 58% |
| CFO-1112/R-152a | 50/50 | 98% | 101% | 97% | 101% | 57% |
| CFO-1112/R-152a | 55/45 | 92% | 102% | 92% | 102% | 54% |
| CFO-1112/R-134 | 10/90 | 126% | 100% | 126% | 100% | 93% |
| CFO-1112/R-134 | 15/85 | 120% | 100% | 120% | 100% | 88% |
| CFO-1112/R-134 | 20/80 | 113% | 101% | 113% | 101% | 82% |
| CFO-1112/R-134 | 25/75 | 108% | 101% | 107% | 101% | 78% |
| CFO-1112/R-134 | 30/70 | 102% | 102% | 102% | 101% | 73% |
| CFO-1112/R-134 | 35/65 | 97% | 102% | 96% | 102% | 69% |
| CFO-1112/R-134 | 40/60 | 92% | 103% | 91% | 102% | 66% |
| CFO-1112/R-1123 | 75/25 | 115% | 109% | 114% | 108% | 74% |
| CFO-1112/R-1123 | 80/20 | 99% | 107% | 98% | 106% | 65% |

(Cap) for mixtures containing CFO-1112 relative to R-134a were also determined. The results are shown in Table 5A-5B below.

The data was based on the following conditions:

| | |
|---|---|
| Evaporator temperature | 10° C. |
| Condenser temperature | 46.1° C. |
| Subcool amount | 8.3K |
| Superheat amount | 11.1K |
| Compressor efficiency | 70% |

TABLE 5A

| Composition | wt % | Disch T (° C.) | Evap P (MPa) | Cond P (MPa) | Average glide (K) |
|---|---|---|---|---|---|
| R-134a | 100 | 69.2 | 0.4146 | 1.1934 | 0 |
| CFO-1112/R-32 | 45/55 | 116.5 | 0.4770 | 1.4351 | 33.82 |
| CFO-1112/R-32 | 50/50 | 115.9 | 0.4367 | 1.3186 | 36.44 |
| CFO-1112/R-32 | 55/45 | 115.1 | 0.3989 | 1.2092 | 38.73 |
| CFO-1112/R-32 | 60/40 | 113.9 | 0.3629 | 1.1055 | 40.61 |
| CFO-1112/R-32 | 65/35 | 112.5 | 0.3278 | 1.0060 | 42.01 |
| CFO-1112/R-32 | 70/30 | 110.8 | 0.2931 | 0.9089 | 42.75 |
| CFO-1112/R-32 | 75/25 | 108.7 | 0.2577 | 0.8125 | 42.59 |
| CFO-1112/R-125 | 20/80 | 79.8 | 0.5081 | 1.5053 | 21.62 |
| CFO-1112/R-125 | 25/75 | 82.1 | 0.4520 | 1.3541 | 25.98 |
| CFO-1112/R-125 | 30/70 | 84.0 | 0.4062 | 1.2266 | 29.60 |
| CFO-1112/R-125 | 35/65 | 85.6 | 0.3677 | 1.1178 | 32.55 |
| CFO-1112/R-125 | 40/60 | 86.9 | 0.3344 | 1.0234 | 34.90 |
| CFO-1112/R-125 | 45/55 | 88.0 | 0.3048 | 0.9401 | 36.67 |
| CFO-1112/R-125 | 50/50 | 88.9 | 0.2779 | 0.8653 | 37.88 |
| CFO-1112/R-134a | 1/99 | 69.5 | 0.4090 | 1.1803 | 0.38 |
| CFO-1112/R-134a | 5/95 | 70.7 | 0.3863 | 1.1274 | 2.00 |
| CFO-1112/R-134a | 10/90 | 72.4 | 0.3581 | 1.0609 | 4.23 |
| CFO-1112/R-134a | 15/85 | 74.2 | 0.3311 | 0.9953 | 6.56 |
| CFO-1112/R-134a | 20/80 | 75.8 | 0.3059 | 0.9321 | 8.86 |
| CFO-1112/R-134a | 25/75 | 77.3 | 0.2830 | 0.8721 | 11.04 |
| CFO-1112/R-1234yf | 1/99 | 61.1 | 0.4304 | 1.1708 | 0.46 |
| CFO-1112/R-1234yf | 5/95 | 62.7 | 0.4021 | 1.1123 | 2.43 |
| CFO-1112/R-1234yf | 10/90 | 65.0 | 0.3678 | 1.0398 | 5.10 |
| CFO-1112/R-1234yf | 15/85 | 67.2 | 0.3362 | 0.9698 | 7.78 |
| CFO-1112/R-1234yf | 20/80 | 69.2 | 0.3080 | 0.9037 | 10.33 |
| CFO-1112/R-152a | 1/99 | 79.0 | 0.3696 | 1.0592 | 0.24 |
| CFO-1112/R-152a | 5/95 | 79.6 | 0.3566 | 1.0288 | 1.27 |
| CFO-1112/R-152a | 10/90 | 80.5 | 0.3398 | 0.9894 | 2.69 |
| CFO-1112/R-152a | 15/85 | 81.5 | 0.3226 | 0.9487 | 4.23 |
| CFO-1112/R-152a | 20/80 | 82.5 | 0.3054 | 0.9072 | 5.85 |
| CFO-1112/R-152a | 25/75 | 83.4 | 0.2884 | 0.8652 | 7.50 |
| CFO-1112/R-134 | 1/99 | 69.4 | 0.3176 | 0.9505 | 0.25 |
| CFO-1112/R-134 | 5/95 | 70.2 | 0.3043 | 0.9161 | 1.36 |
| CFO-1112/R-134 | 10/90 | 71.5 | 0.2867 | 0.8713 | 3.01 |
| CFO-1112/R-1123 | 45/55 | 102.39 | 0.4469 | 1.342 | 45.599 |
| CFO-1112/R-1123 | 50/50 | 102.73 | 0.4044 | 1.2229 | 47.444 |
| CFO-1112/R-1123 | 55/45 | 102.86 | 0.365 | 1.1139 | 48.693 |
| CFO-1112/R-1123 | 60/40 | 102.76 | 0.3279 | 1.0128 | 49.291 |
| CFO-1112/R-1123 | 65/35 | 102.41 | 0.2923 | 0.9174 | 49.139 |
| CFO-1112/R-1123 | 70/30 | 101.76 | 0.2575 | 0.8259 | 48.082 |

TABLE 5B

| Composition | wt % | Cooling Cap Rel to R-134a | Cooling COP Rel to R-134a | Heating CAP Rel to R-134a | Heating COP Rel to R-134a | Mass Flow Rel to R-134a |
|---|---|---|---|---|---|---|
| R-134a | 100 | 100% | 100% | 100% | 100% | 100% |
| CFO-1112/R-32 | 45/55 | 120% | 95% | 121% | 96% | 75% |
| CFO-1112/R-32 | 50/50 | 113% | 97% | 113% | 98% | 71% |
| CFO-1112/R-32 | 55/45 | 105% | 100% | 105% | 100% | 67% |
| CFO-1112/R-32 | 60/40 | 98% | 102% | 98% | 102% | 64% |
| CFO-1112/R-32 | 65/35 | 91% | 104% | 90% | 104% | 60% |
| CFO-1112/R-32 | 70/30 | 84% | 107% | 83% | 105% | 57% |
| CFO-1112/R-32 | 75/25 | 76% | 108% | 75% | 107% | 52% |
| CFO-1112/R-125 | 20/80 | 118% | 95% | 119% | 96% | 141% |
| CFO-1112/R-125 | 25/75 | 110% | 98% | 110% | 98% | 124% |
| CFO-1112/R-125 | 30/70 | 103% | 100% | 103% | 100% | 111% |
| CFO-1112/R-125 | 35/65 | 96% | 103% | 96% | 103% | 100% |
| CFO-1112/R-125 | 40/60 | 90% | 105% | 89% | 104% | 91% |
| CFO-1112/R-125 | 45/55 | 84% | 107% | 83% | 106% | 82% |
| CFO-1112/R-125 | 50/50 | 79% | 109% | 78% | 107% | 75% |
| CFO-1112/R-134a | 1/99 | 99% | 100% | 99% | 100% | 99% |
| CFO-1112/R-134a | 5/95 | 95% | 100% | 95% | 100% | 93% |
| CFO-1112/R-134a | 10/90 | 89% | 100% | 89% | 100% | 87% |
| CFO-1112/R-134a | 15/85 | 84% | 100% | 84% | 100% | 80% |
| CFO-1112/R-134a | 20/80 | 79% | 101% | 79% | 101% | 75% |
| CFO-1112/R-134a | 25/75 | 74% | 101% | 74% | 101% | 69% |
| CFO-1112/R-1234yf | 1/99 | 94% | 98% | 95% | 99% | 118% |
| CFO-1112/R-1234yf | 5/95 | 90% | 99% | 91% | 99% | 110% |
| CFO-1112/R-1234yf | 10/90 | 85% | 99% | 85% | 99% | 99% |
| CFO-1112/R-1234yf | 15/85 | 80% | 100% | 80% | 100% | 90% |
| CFO-1112/R-1234yf | 20/80 | 75% | 100% | 75% | 100% | 82% |
| CFO-1112/R-152a | 1/99 | 92% | 101% | 92% | 101% | 58% |
| CFO-1112/R-152a | 5/95 | 89% | 101% | 89% | 101% | 56% |
| CFO-1112/R-152a | 10/90 | 86% | 101% | 86% | 101% | 55% |
| CFO-1112/R-152a | 15/85 | 82% | 101% | 82% | 101% | 53% |
| CFO-1112/R-152a | 20/80 | 79% | 101% | 78% | 101% | 51% |
| CFO-1112/R-152a | 25/75 | 75% | 101% | 75% | 101% | 50% |
| CFO-1112/R-134 | 1/99 | 82% | 102% | 82% | 102% | 74% |
| CFO-1112/R-134 | 5/95 | 79% | 102% | 79% | 102% | 72% |
| CFO-1112/R-134 | 10/90 | 75% | 102% | 75% | 102% | 68% |
| CFO-1112/R-1123 | 45/55 | 118% | 104% | 117% | 103% | 95% |
| CFO-1112/R-1123 | 50/50 | 110% | 106% | 109% | 105% | 87% |
| CFO-1112/R-1123 | 55/45 | 102% | 109% | 101% | 107% | 80% |

TABLE 5B-continued

| Composition | wt % | Cooling Cap Rel to R-134a | Cooling COP Rel to R-134a | Heating CAP Rel to R-134a | Heating COP Rel to R-134a | Mass Flow Rel to R-134a |
|---|---|---|---|---|---|---|
| CFO-1112/R-1123 | 60/40 | 95% | 110% | 93% | 109% | 74% |
| CFO-1112/R-1123 | 65/35 | 86% | 112% | 85% | 110% | 67% |
| CFO-1112/R-1123 | 70/30 | 78% | 112% | 77% | 110% | 61% |

The results in Tables 5A-5B show that CFO-1112 mixtures analyzed in this example are good alternatives to R-134a with similar cooling and heating capacities and energy efficiencies (COP). Mixtures with low temperature glide (<−1K) are particularly suitable for use in centrifugal chillers. Mixtures with high glide are suitable for use in heat exchangers with countercurrent flow or cross-countercurrent flow. Compressor discharge temperatures for the mixtures and pure fluids were also similar to R-134a.

Example 6

Cooling and Heating Performance Data Comparison of CFO-1112 Blends with R-22

The cooling and heating performance for mixtures containing CFO-1112 compared to the cooling and heating performance for mixtures containing R-22 was determined. Measurements included pressure in the evaporator (Evap) and condenser (Cond), compressor discharge temperature (Disch T), Average Temperature Glide for the evaporator and condenser (Avg Temp Glide), and Mass Flow Rate for a compressor displacement of 0.1 m³/min. Relative energy efficiency (COP) and volumetric capacity (Cap) for mixtures containing CFO-1112 relative to R-22 were also determined. The results are shown in Table 6A-6B below.

The data was based on the following conditions:

| Evaporator temperature | 10° C. |
|---|---|
| Condenser temperature | 46.1° C. |
| Subcool amount | 8.3K |
| Superheat amount | 11.1K |
| Compressor efficiency | 70% |

TABLE 6A

| Composition | wt % | Disch T (° C.) | Evap P (MPa) | Cond P (MPa) | Average glide (K) |
|---|---|---|---|---|---|
| R-22 | 100 | 84.6 | 0.6809 | 1.7746 | 0 |
| CFO-1112/R-32 | 20/80 | 113.0 | 0.7509 | 2.1665 | 16.24 |
| CFO-1112/R-32 | 25/75 | 114.9 | 0.6823 | 1.9987 | 20.29 |
| CFO-1112/R-32 | 30/70 | 116.1 | 0.6221 | 1.8413 | 24.10 |
| CFO-1112/R-32 | 35/65 | 116.7 | 0.5687 | 1.6952 | 27.63 |
| CFO-1112/R-32 | 40/60 | 116.8 | 0.5207 | 1.5602 | 30.88 |
| CFO-1112/R-125 | 1/99 | 64.4 | 0.8843 | 2.2767 | 0.87 |
| CFO-1112/R-125 | 5/95 | 68.0 | 0.7855 | 2.1037 | 4.90 |
| CFO-1112/R-125 | 10/90 | 72.8 | 0.6711 | 1.8873 | 10.73 |
| CFO-1112/R-125 | 15/85 | 76.8 | 0.5792 | 1.6839 | 16.49 |
| CFO-1112/R-1123 | 15/85 | 93.28 | 0.8741 | 2.4982 | 21.228 |
| CFO-1112/R-1123 | 20/80 | 96.24 | 0.765 | 2.2254 | 27.16 |
| CFO-1112/R-1123 | 25/75 | 98.33 | 0.6782 | 1.9928 | 32.245 |
| CFO-1112/R-1123 | 30/70 | 99.85 | 0.6068 | 1.7945 | 36.557 |
| CFO-1112/R-1123 | 35/65 | 100.98 | 0.5463 | 1.6237 | 40.18 |
| CFO-1112/R-1123 | 40/60 | 101.81 | 0.4937 | 1.4744 | 43.181 |

TABLE 6B

| Composition | wt % | Cooling Cap Rel to R-22 | Cooling COP Rel to R-22 | Heating CAP Rel to R-22 | Heating COP Rel to R-22 | Mass Flow Rel to R-22 |
|---|---|---|---|---|---|---|
| R-22 | 100 | 100% | 100% | 100% | 100% | 100% |
| CFO-1112/R-32 | 20/80 | 113% | 90% | 116% | 92% | 73% |
| CFO-1112/R-32 | 25/75 | 105% | 91% | 107% | 92% | 67% |
| CFO-1112/R-32 | 30/70 | 98% | 92% | 99% | 93% | 63% |
| CFO-1112/R-32 | 35/65 | 91% | 94% | 92% | 95% | 59% |
| CFO-1112/R-32 | 40/60 | 86% | 95% | 86% | 96% | 55% |
| CFO-1112/R-125 | 1/99 | 110% | 92% | 112% | 94% | 190% |
| CFO-1112/R-125 | 5/95 | 103% | 92% | 104% | 94% | 164% |
| CFO-1112/R-125 | 10/90 | 93% | 93% | 95% | 94% | 136% |
| CFO-1112/R-125 | 15/85 | 85% | 94% | 86% | 95% | 115% |
| CFO-1112/R-1123 | 15/85 | 120% | 87% | 123% | 90% | 124% |
| CFO-1112/R-1123 | 20/80 | 111% | 90% | 113% | 92% | 108% |
| CFO-1112/R-1123 | 25/75 | 103% | 94% | 104% | 95% | 96% |
| CFO-1112/R-1123 | 30/70 | 96% | 97% | 97% | 98% | 87% |
| CFO-1112/R-1123 | 35/65 | 90% | 100% | 90% | 100% | 79% |
| CFO-1112/R-1123 | 40/60 | 84% | 103% | 84% | 103% | 72% |

The results in Tables 6A-6B show that CFO-1112 mixtures analyzed in this example are good alternatives to R-22 with similar cooling and heating capacities and energy efficiencies (COP). Mixtures with low temperature glide (<−1K) are particularly suitable for use in centrifugal chillers. Mixtures with high glide are suitable for use in heat exchangers with countercurrent flow or cross-countercurrent flow. Compressor discharge temperatures for the mixtures and pure fluids were also similar to R-22.

Example 7

Cooling and Heating Performance Data Comparison of CFO-1112 Blends with R-410A

The cooling and heating performance for mixtures containing CFO-1112 compared to the cooling and heating performance for mixtures containing R-410A was determined. Measurements included pressure in the evaporator (Evap) and condenser (Cond), compressor discharge temperature (Disch T), Average Temperature Glide for the evaporator and condenser (Avg Temp Glide), and Mass Flow Rate for a compressor displacement of 0.1 m³/min. Relative energy efficiency (COP) and volumetric capacity (Cap) for mixtures containing CFO-1112 relative to R-410A were also determined. The results are shown in Table 10 below.

The data was based on the following conditions:

| | |
|---|---|
| Evaporator temperature | 10° C. |
| Condenser temperature | 46.1° C. |
| Subcool amount | 8.3K |
| Superheat amount | 11.1K |
| Compressor efficiency | 70% |

TABLE 7A

| Composition | wt % | Disch T (° C.) | Evap P (MPa) | Cond P (MPa) | Average glide (K) |
|---|---|---|---|---|---|
| R-410A | 100 | 81.5 | 1.0862 | 2.8014 | 0.10 |
| CFO-1112/R-32 | 1/99 | 98.7 | 1.0879 | 2.8348 | 0.70 |
| CFO-1112/R-32 | 5/95 | 102.1 | 1.0112 | 2.6973 | 3.69 |
| CFO-1112/R-32 | 10/90 | 106.4 | 0.9168 | 2.5205 | 7.77 |
| CFO-1112/R-32 | 15/85 | 110.1 | 0.8290 | 2.3419 | 12.02 |
| CFO-1112/R-1123 | 0/100 | 74.83 | 1.441 | 3.4899 | 0 |
| CFO-1112/R-1123 | 1/99 | 76.4 | 1.3911 | 3.4233 | 1.349 |
| CFO-1112/R-1123 | 5/95 | 82.59 | 1.2051 | 3.1505 | 7.127 |
| CFO-1112/R-1123 | 10/90 | 88.92 | 1.0164 | 2.8112 | 14.464 |

TABLE 7B

| Composition | wt % | Cooling Cap Rel to R-410A | Cooling COP Rel to R-410A | Heating CAP Rel to R-410A | Heating COP Rel to R-410A | Mass Flow Rel to R-410A |
|---|---|---|---|---|---|---|
| R-410A | 100 | 100% | 100% | 100% | 100% | 100% |
| CFO-1112/R-32 | 1/99 | 106% | 100% | 106% | 100% | 71% |
| CFO-1112/R-32 | 5/95 | 99% | 99% | 100% | 99% | 66% |
| CFO-1112/R-32 | 10/90 | 91% | 97% | 92% | 98% | 61% |
| CFO-1112/R-32 | 15/85 | 84% | 96% | 85% | 97% | 55% |
| CFO-1112/R-1123 | 0/100 | 111% | 93% | 112% | 94% | 155% |
| CFO-1112/R-1123 | 1/99 | 108% | 92% | 110% | 93% | 148% |
| CFO-1112/R-1123 | 5/95 | 99% | 90% | 101% | 92% | 124% |
| CFO-1112/R-1123 | 10/90 | 89% | 91% | 91% | 92% | 102% |

The results in Tables 7A-8B showed that CFO-1112 mixtures analyzed in this example are good alternatives to R-410A with similar cooling and heating capacities and energy efficiencies (COP). Mixtures with low temperature glide (<~1K) are particularly suitable for use in centrifugal chillers. Mixtures with high glide are suitable for use in heat exchangers with countercurrent flow or cross-countercurrent flow. Compressor discharge temperatures for the mixtures and pure fluids were also similar to R-410A.

Example 8

Replacement of HFC-245Fa in High Temperature Heat Pumps

HFC-245fa has been widely used as a working fluid for high temperature heat pumps. Low GWP blends containing CFO-1112 can be formulated to replace HFC-245fa in either existing or new high temperature heat pumps. Table 8 compares the performance of HFC-245fa to the performance of a R-1234ze-E/CFO-1112 blend containing 81 wt % CFO-1112 (Blend 8A) and to the performance of a R-134/CFO-1112 blend containing 85 wt % CFO-1112 (Blend 8B) for a set of representative high temperature heat pump operating conditions.

The volumetric heating capacity with Blend 8A matches that with HFC-245fa while the heat pump energy efficiency (as expressed in terms of the Coefficient of Performance for heating) with Blend 8A exceeds that with HFC-245fa by 3.1%.

The volumetric heating capacity with Blend 8B matches that with HFC-245fa while the heat pump energy efficiency (as expressed in terms of the Coefficient of Performance for heating) with Blend 8B exceeds that with HFC-245fa by 4%.

TABLE 8

| | Unit | HFC-245fa | Blend 8A | Blend 8A vs HFC-245fa | Blend 8B | Blend 8B vs HFC-245fa |
|---|---|---|---|---|---|---|
| 1st Blend Component | | | R-1234zeE | | R-134 | |
| 2nd Blend Component | | n/a | CFO-1112 | | CFO-1112 | |
| CFO-1112 | wt % | n/a | 81 wt % | | 85 wt % | |
| Critical Pressure | MPa | 3.65 | 3.46 | | 3.60 | |
| Critical Temperature | ° C. | 154.0 | 156.9 | | 160.1 | |
| Condenser Temperature | ° C. | 120 | 120 | | 120 | |
| Evaporator Temperature | ° C. | 70 | 70 | | 70 | |

TABLE 8-continued

| | Unit | HFC-245fa | Blend 8A | Blend 8A vs HFC-245fa | Blend 8B | Blend 8B vs HFC-245fa |
|---|---|---|---|---|---|---|
| Compressor Suction Superheat | K | 10 | 10 | | 10 | |
| Condenser Liquid Sub-cooling | K | 10 | 10 | | 10 | |
| Compressor Efficiency | — | 0.7 | 0.7 | | 0.7 | |
| Condenser Pressure | MPa | 1.93 | 1.82 | | 1.82 | |
| Evaporator Pressure | MPa | 0.61 | 0.59 | | 0.58 | |
| Evaporator Glide | K | 0.0 | 5.3 | | 5.7 | |
| Condenser Glide | K | 0.0 | 7.3 | | 8.4 | |

TABLE 8-continued

|  | Unit | HFC-245fa | Blend 8A | Blend 8A vs HFC-245fa | Blend 8B | Blend 8B vs HFC-245fa |
|---|---|---|---|---|---|---|
| $COP_{heating}$ | — | 4.718 | 4.863 | 3.1 | 4.905 | 4.0 |
| Volumetric Heating Capacity | kJ/m³ | 4506.8 | 4494.9 | −0.3 | 4537.1 | 0.7 |

Example 9

Replacement of HCFC-123 in a Chiller

This example demonstrates chiller performance with CFO-1112 as compared to other refrigerants suggested for use in chillers as replacements for HCFC-123 (R-123). In Tables 9A-9B, Suct P is pressure at the compressor inlet; Disch P is pressure at the compressor outlet; Tip speed is the speed of the impeller at its tip, if a centrifugal compressor is used in the chiller; COP is coefficient of performance (a measure of energy efficiency); and Cap is volumetric capacity. The performance for CFO-1112, R-1336mzzZ, R-1233zdE, R-245fa, R-1336mzzE, and R-1224ydZ all compared to HCFC-123 is determined for the following conditions:

| Evaporator temperature | 5° C. |
| Condenser temperature | 40° C. |
| Subcool amount | 0.00° C. |
| Superheat amount | 6K |
| Compressor efficiency | 80% |

TABLE 9A

|  | Disch T (° C.) | Suct P (kPa) | Disch P (kPa) | Tip Speed (m/s) | Tip Speed Rel to R-123 (%) |
|---|---|---|---|---|---|
| R-123 | 52.6 | 40.8 | 155 | 162.1 | 100% |
| 1336mzzZ | 44.0 | 31.4 | 128 | 159.7 | 99% |
| 1233zdE | 51.1 | 59.7 | 215 | 171.3 | 106% |
| 245fa | 48.9 | 66.2 | 250 | 171.0 | 105% |
| 1336mzzE | 46.8 | 91.1 | 325 | 149.4 | 92% |
| CFO-1112 | 65.1 | 49.9 | 196 | 178.0 | 110% |
| 1224ydZ | 49.0 | 69.3 | 244 | 158.7 | 98% |

TABLE 9B

|  | Cap (kJ/m³) | Cap Rel to R-123 | COP | COP Rel to R-123 |
|---|---|---|---|---|
| R-123 | 398.99 | 100% | 5.628 | 100.0% |
| 1336mzzZ | 310.71 | 78% | 5.476 | 97.3% |
| 1233zdE | 553.93 | 139% | 5.572 | 99.0% |
| 245fa | 625.58 | 157% | 5.503 | 97.8% |
| 1336mzzE | 792.75 | 199% | 5.354 | 95.1% |
| CFO-1112 | 515.58 | 129% | 5.694 | 101.2% |
| 1224ydZ | 626.06 | 157% | 5.554 | 98.7% |

The data demonstrates that replacement of HCFC-123 with CFO-1112 is feasible and even a better choice than the other refrigerants suggested previously. The capacity is higher than HFCF-123, but closer than the other refrigerants. The COP for CFO-1112 is higher than that for HCFC-123 and the only refrigerant in the table that shows this improved energy efficiency. If a centrifugal compressor were to be used for the chiller, the impeller tip speed is within 10% and would only require minor modifications.

Thus, CFO-1112 provides a higher efficiency refrigerant for use in chillers as compared to 1233zdE or 1224ydZ.

Example 10

Replacement of HFC-245Fa in Centrifugal High Temperature Heat Pumps

HFC-245fa has been widely used as a working fluid for high temperature heat pumps. Low GWP blends containing CFO-1112 can be formulated to replace HFC-245fa in either existing or new high temperature heat pumps. Table 10 compares the performance of HFC-245fa to the performance of a R-1234zeE/CFO-1112 blend containing 81 wt % CFO-1112 (Blend 10A) and to the performance of a R-134/CFO-1112 blend containing 85 wt % CFO-1112 (Blend 10B) for a set of representative high temperature heat pump operating conditions.

The volumetric heating capacity with Blend 10A matches that with HFC-245fa while the heat pump energy efficiency (as expressed in terms of the Coefficient of Performance for heating) with Blend 10A exceeds that with HFC-245fa by 3.1%.

The volumetric heating capacity with Blend 10B matches that with HFC-245fa while the heat pump energy efficiency (as expressed in terms of the Coefficient of Performance for heating) with Blend 10B exceeds that with HFC-245fa by 4%.

The impeller tip speed required to meet the compressor duty with Blend 10A and Blend 10B is only 1.77% and 3.56% higher than that with HFC-245fa, respectively.

TABLE 10

|  | Units | HFC-245fa | Blend 10A | Blend 10A vs HFC-245fa | Blend 10B | Blend 10B vs HFC-245fa |
|---|---|---|---|---|---|---|
| 1st Blend Component |  |  | R-1234zeE |  | R-134 |  |
| 2nd Blend Component |  | n/a | CFO-1112 |  | CFO-1112 |  |
| CFO-1112 | wt % | n/a | 81 |  | 85 |  |
| Critical Pressure | MPa | 3.65 | 3.46 |  | 3.60 |  |
| Critical Temperature | ° C. | 154.0 | 156.9 |  | 160.1 |  |
| Condenser Temperature | ° C. | 120 | 120 |  | 120 |  |
| Evaporator Temperature | ° C. | 70 | 70 |  | 70 |  |
| Compressor Suction Superheat | K | 10 | 10 |  | 10 |  |
| Condenser Liquid Sub-cooling | K | 10 | 10 |  | 10 |  |
| Compressor Efficiency | — | 0.7 | 0.7 |  | 0.7 |  |
| Condenser Pressure | MPa | 1.93 | 1.82 |  | 1.82 |  |
| Evaporator Pressure | MPa | 0.61 | 0.59 |  | 0.58 |  |
| Evaporator Glide | K | 0.0 | 5.3 |  | 5.7 |  |
| Condenser Glide | K | 0.0 | 7.3 |  | 8.4 |  |

TABLE 10-continued

| | Units | HFC-245fa | Blend 10A | Blend 10A vs HFC-245fa | Blend 10B | Blend 10B vs HFC-245fa |
|---|---|---|---|---|---|---|
| $COP_{heating}$ | — | 4.718 | 4.863 | 3.1 | 4.905 | 4.0 |
| Volumetric Heating Capacity | kJ/m³ | 4506.8 | 4494.9 | −0.3 | 4537.1 | 0.7 |
| Isentropic Enthalpy of Compression, | kJ/kg | 20.97 | 21.72 | | 22.49 | |
| Relative Impeller Tip Speed | — | 100 (Base) | 101.77 | | 103.56 | |

OTHER EMBODIMENTS

1. In some embodiments, the present application provides a composition, comprising:
   i) 1,2-dichloro-1,2-difluoroethylene (CFO-1112); and, optionally,
   ii) a compound selected from R-245fa, R-1336mzzZ, n-pentane, R-1233zdE, i-pentane, R-1336mzzE, R-1224ydZ, R-1234zeZ, R-1336yf, R-1336zeE, R-1234zeE, R-32, R-134a, R-1234yf, trans-1,2-dichloroethylene, R-152a, R-134, R-125, and R-1123.
2. In some embodiments, the present application provides a composition, comprising:
   i) 1,2-dichloro-1,2-difluoroethylene; and, optionally,
   ii) a compound selected from R-245fa, R-1336mzzZ, n-pentane, R-1233zdE, i-pentane, R-1336mzzE, R-1224ydZ, R-1234zeZ, R-1336yf, R-1336zeE, R-1234zeE, R-32, R-134a, R-1234yf, trans-1,2-dichloroethylene, R-152a, and R-134.
3. In some embodiments, the present application provides a composition, comprising:
   i) 1,2-dichloro-1,2-difluoroethylene; and, optionally,
   ii) a compound selected from R-245fa, R-1336mzzZ, n-pentane, R-1233zdE, i-pentane, R-1336mzzE, R-1224ydZ, R-1234zeZ, R-1336yf, and R-1336zeE.
4. The composition of any one of embodiments 1 to 3, wherein the composition comprises about 1 to about 40 weight percent 1,2-dichloro-1,2-difluoroethylene and about 99 to about 60 weight percent R-245fa.
5. The composition of any one of embodiments 1 to 3, wherein the composition comprises about 1 to about 25 weight percent 1,2-dichloro-1,2-difluoroethylene and about 99 to about 75 weight percent R-245fa.
6. The composition of embodiment 4 or 5, wherein the composition has a temperature glide of about 0.3 K or less.
7. The composition of any one of embodiments 1 to 3, wherein the composition comprises about 1 to about 10 weight percent 1,2-dichloro-1,2-difluoroethylene and about 99 to about 10 weight percent R-1336mzzZ.
8. The composition of any one of embodiments 1 to 3, wherein the composition comprises about 50 to about 99 weight percent 1,2-dichloro-1,2-difluoroethylene and about 50 to about 1 weight percent R-1336mzzZ.
9. The composition of any one of embodiments 1 to 3, wherein the composition comprises about 1 to about 25 weight percent 1,2-dichloro-1,2-difluoroethylene and about 99 to about 75 weight percent R-1336mzzZ.
10. The composition of any one of embodiments 1 to 3 and 7 to 9, wherein the composition has a temperature glide of about 2 K or less.
11. The composition of any one of embodiments 1 to 3, wherein the composition comprises about 1 to about 20 weight percent 1,2-dichloro-1,2-difluoroethylene and about 99 to about 80 weight percent n-pentane.
12. The composition of any one of embodiments 1 to 3, wherein the composition comprises about 60 to about 99 weight percent 1,2-dichloro-1,2-difluoroethylene and about 1 to about 40 weight percent n-pentane.
13. The composition of any one of embodiments 1 to 3, wherein the composition comprises about 1 to about 10 weight percent 1,2-dichloro-1,2-difluoroethylene and about 99 to about 90 weight percent n-pentane.
14. The composition of any one of embodiments 1 to 3, wherein the composition comprises about 70 to about 99 weight percent 1,2-dichloro-1,2-difluoroethylene and about 30 to about 1 weight percent n-pentane.
15. The composition of any one of embodiments 1 to 3 and 11 to 14, wherein the composition has a temperature glide of about 3 K or less.
16. The composition of any one of embodiments 1 to 3, wherein the composition comprises about 1 to about 35 weight percent 1,2-dichloro-1,2-difluoroethylene and about 99 to about 65 weight percent R-1233zdE.
17. The composition of any one of embodiments 1 to 3, wherein the composition comprises about 1 to about 25 weight percent 1,2-dichloro-1,2-difluoroethylene and about 99 to about 75 weight percent R-1233zdE.
18. The composition of any one of embodiments 1 to 3, 16, and 17, wherein the composition has a temperature glide of about 0.05 K or less.
19. The composition of any one of embodiments 1 to 3, wherein the composition comprises about 1 to about 20 weight percent 1,2-dichloro-1,2-difluoroethylene and about 99 to about 80 weight percent i-pentane.
20. The composition of any one of embodiments 1 to 3, wherein the composition comprises about 55 to about 99 weight percent 1,2-dichloro-1,2-difluoroethylene and about 45 to about 1 weight percent i-pentane.
21. The composition of any one of embodiments 1 to 3, wherein the composition comprises about 1 to about 10 weight percent 1,2-dichloro-1,2-difluoroethylene and about 99 to about 90 weight percent i-pentane.
22. The composition of any one of embodiments 1 to 3, wherein the composition comprises about 65 to about 99 weight percent 1,2-dichloro-1,2-difluoroethylene and about 45 to about 1 weight percent i-pentane.
23. The composition of any one of embodiments 1 to 3 and 19 to 22, wherein the composition has a temperature glide of about 1.5 K or less.
24. The composition of any one of embodiments 1 to 3, wherein the composition comprises about 1 to about 40 weight percent 1,2-dichloro-1,2-difluoroethylene and about 99 to about 60 weight percent R-1336mzzE.
25. The composition of any one of embodiments 1 to 3, wherein the composition comprises about 85 to about 99 weight percent 1,2-dichloro-1,2-difluoroethylene and about 15 to about 1 weight percent R-1336mzzE.
26. The composition of any one of embodiments 1 to 3, wherein the composition comprises about 1 to about 25 weight percent 1,2-dichloro-1,2-difluoroethylene and about 99 to about 75 weight percent R-1336mzzE.
27. The composition of any one of embodiments 1 to 3, wherein the composition comprises about 95 to about 99 weight percent 1,2-dichloro-1,2-difluoroethylene and about 5 to about 1 weight percent R-1336mzzE.

28. The composition of any one of embodiments 1 to 3 and 24 to 27, wherein the composition has a temperature glide of about 2 K or less.
29. The composition of any one of embodiments 1 to 3, wherein the composition comprises about 1 to about 40 weight percent 1,2-dichloro-1,2-difluoroethylene and about 99 to about 60 weight percent R-1224ydZ.
30. The composition of any one of embodiments 1 to 3, wherein the composition comprises about 85 to about 99 weight percent 1,2-dichloro-1,2-difluoroethylene and about 15 to about 1 weight percent R-1224ydZ.
31. The composition of any one of embodiments 1 to 3, wherein the composition comprises about 1 to about 25 weight percent 1,2-dichloro-1,2-difluoroethylene and about 99 to about 75 weight percent R-1224ydZ.
32. The composition of any one of embodiments 1 to 3, wherein the composition comprises about 95 to about 99 weight percent 1,2-dichloro-1,2-difluoroethylene and about 5 to about 1 weight percent R-1224ydZ.
33. The composition of any one of embodiments 1 to 3 and 29 to 32, wherein the composition has a temperature glide of about 0.4 K or less.
34. The composition of any one of embodiments 1 to 3, wherein the composition comprises about 1 to about 35 weight percent 1,2-dichloro-1,2-difluoroethylene and about 99 to about 65 weight percent R-1234zeZ.
35. The composition of any one of embodiments 1 to 3, wherein the composition comprises about 1 to about 25 weight percent 1,2-dichloro-1,2-difluoroethylene and about 99 to about 75 weight percent R-1234zeZ.
36. The composition of any one of embodiments 1 to 3, 34, and 35, wherein the composition has a temperature glide of about 0.5 K or less.
37. The composition of any one of embodiments 1 to 3, wherein the composition comprises about 1 to about 30 weight percent 1,2-dichloro-1,2-difluoroethylene and about 99 to about 70 weight percent R-1336yf.
38. The composition of any one of embodiments 1 to 3, wherein the composition comprises about 95 to about 99 weight percent 1,2-dichloro-1,2-difluoroethylene and about 5 to about 1 weight percent R-1336yf.
39. The composition of any one of embodiments 1 to 3, wherein the composition comprises about 1 to about 20 weight percent 1,2-dichloro-1,2-difluoroethylene and about 99 to about 80 weight percent R-1336yf.
40. The composition of any one of embodiments 1 to 3 and 37 to 39, wherein the composition has a temperature glide of about 0.2 K or less.
41. The composition of any one of embodiments 1 to 3, wherein the composition comprises about 1 to about 40 weight percent 1,2-dichloro-1,2-difluoroethylene and about 99 to about 60 weight percent R-1336zeE.
42. The composition of any one of embodiments 1 to 3, wherein the composition comprises about 85 to about 99 weight percent 1,2-dichloro-1,2-difluoroethylene and about 15 to about 1 weight percent R-1336zeE.
43. The composition of any one of embodiments 1 to 3, wherein the composition comprises about 1 to about 25 weight percent 1,2-dichloro-1,2-difluoroethylene and about 99 to about 75 weight percent R-1336zeE.
44. The composition of any one of embodiments 1 to 3, wherein the composition comprises about 90 to about 99 weight percent 1,2-dichloro-1,2-difluoroethylene and about 10 to about 1 weight percent R-1336zeE.
45. The composition of any one of embodiments 1 to 3 and 41 to 44, wherein the composition has a temperature glide of about 1.5 K or less.
46. The composition of any one of embodiments 1 to 45, wherein the 1,2-dichloro-1,2-difluoroethylene comprises about 60% to about 70% E-1,2-dichloro-1,2-difluoroethylene and about 30% to about 40% Z-1,2-dichloro-1,2-difluoroethylene.
47. In some embodiments, the present application further provides a method for producing cooling, comprising evaporating a composition of any one of embodiments 1 to 46 in the vicinity of a body to be cooled, and thereafter condensing said composition.
48. In some embodiments, the present application further provides a method for producing heating, comprising condensing a composition of any one of embodiments 1 to 46 in the vicinity of a body to be heated, and thereafter evaporating said composition.
49. In some embodiments, the present application further provides a refrigeration, air-conditioning, or heat pump apparatus comprising the composition of any one of embodiments 1 to 46.
50. The apparatus of embodiment 49, wherein the heat pump is a high temperature heat pump.
51. The apparatus of embodiment 50, wherein said high temperature heat pump comprises a centrifugal compressor.
52. The apparatus of any one of embodiments 49 to 51, comprising a centrifugal chiller apparatus.
53. In some embodiments, the present application further provides a process for replacing an incumbent refrigerant in a refrigeration apparatus or a refrigeration system, comprising substantially replacing said incumbent refrigerant with a composition of any one of embodiments 1 to 46.
54. The process of embodiment 53, wherein the incumbent refrigerant is selected from R-123, R-245fa, R-236fa, R-124, R-134a, R-22, and R-401A.
55. The process of embodiment 53 or 54, wherein the replacement refrigerant composition exhibits a cooling capacity that is within about ±15% of the cooling capacity of the incumbent refrigerant.
56. In some embodiments, the present application provides the use of a composition comprising a refrigerant consisting of 1,2-dichloro-1,2-difluoroethylene in a centrifugal chiller.
57. The use of embodiment 56, wherein 1,2-dichloro-1,2-difluoroethylene consists of (E)-1,2-dichloro-1,2-difluoroethylene, (Z)-1,2-dichloro-1,2-difluoroethylene, or a mixture thereof.
58. The use of embodiment 56 or 57, wherein 1,2-dichloro-1,2-difluoroethylene consists of a mixture of from about 60 to about 70 wt % (E)-1,2-dichloro-1,2-difluoroethylene and from about 40-30 wt % (Z)-1,2-dichloro-1,2-difluoroethylene.
59. A method for improving energy efficiency of a heat transfer system or apparatus comprising an incumbent refrigerant, wherein the method comprises substantially replacing the incumbent refrigerant with a replacement refrigerant composition of any one of embodiments 1 to 46, thereby improving the efficiency of the heat transfer system.
60. The method of embodiment 59, wherein the incumbent refrigerant is selected from R-123, R-1233zeE, and R-1224ydZ.
61. The method of embodiment 59 or 60, wherein the replacement refrigerant composition consists of 1,2-dichloro-1,2-difluoroethylene.
62. The composition of any of embodiments 1 to 46 further comprising a lubricant.

63. The composition of any of embodiment 1 to 46 further comprising a lubricant selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof 64. The composition of any of embodiments 1 to 46, 62 or 63 further comprising a non-refrigerant component selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof 65. The composition of any of embodiments 1 to 46, 62, 63, or 64 further comprising a stabilizer.

66. The composition of any of embodiments 1 to 46, 62, 63, 64 or 65 further comprising a stabilizer selected from the group consisting of hindered phenols, thiophosphates, butylated triphenylphosphorothionates, organophosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, hydrazones, such as acetaldehyde dimethylhydrazone, ionic liquids, and mixtures thereof 67. The composition of any of embodiments 1 to 46, 62, 63, 64 or 65 further comprising a stabilizer selected from the group consisting of d-limonene, b-pinene, BHT, and nitromethane.

68. A method of transferring heat comprising transporting the composition of any of embodiments 1-46 from a heat source to a heat sink.

69. The method of embodiment 68, wherein the transferring of heat is in a heat pipe.

70. The method embodiment 68, wherein the transferring of heat is in a constant conductance heat pipe or a thermosyphon.

71. Use of a composition consisting of 1,2-dichloro-1,2-difluoroethylene in a heat pipe.

72. Use of the composition of any of embodiments 1-46 in a heat pipe.

73. The method of embodiment 68 wherein the transferring of heat is in an immersion cooler.

74. Use of a composition consisting of 1,2-dichloro-1,2-difluoroethylene in an immersion cooler.

75. Use of the composition of any of embodiments 1-46 in an immersion cooler.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. A composition, comprising:
   i) 15-99 wt % 1,2-dichloro-1,2-difluoroethylene; and
   ii) 85-1 wt % R-1336mzzZ.

2. The composition of claim 1, wherein the composition comprises about 50 to about 99 weight percent 1,2-dichloro-1,2-difluoroethylene and about 50 to about 1 weight percent R-1336mzzZ.

3. A method for producing cooling, comprising evaporating a composition in the vicinity of a body to be cooled, and thereafter condensing said composition, the composition comprising:
   i) 15-99 wt % 1,2-dichloro-1,2-difluoroethylene; and
   ii) 85-1 wt % R-1336mzzZ.

4. A method for producing heating, comprising condensing a composition in the vicinity of a body to be heated, and thereafter evaporating said composition, the composition comprising:
   i) 15-99 wt % 1,2-dichloro-1,2-difluoroethylene; and
   ii) 85-1 wt % R-1336mzzZ.

5. A refrigeration, air-conditioning, or heat pump apparatus comprising a composition, that comprises:
   i) 15-99 wt % 1,2-dichloro-1,2-difluoroethylene; and
   ii) 85-1 wt % R-1336mzzZ.

6. The refrigeration, air-conditioning, or heat pump apparatus of claim 5, comprising a chiller apparatus.

7. The refrigeration, air-conditioning, or heat pump apparatus of claim 6, comprising a centrifugal chiller apparatus.

8. The refrigeration, air-conditioning, or heat pump apparatus of claim 7, wherein said high temperature heat pump comprises a centrifugal compressor.

9. The refrigeration, air-conditioning, or heat pump apparatus of claim 6, comprising a screw or scroll chiller apparatus.

10. The refrigeration, air-conditioning, or heat pump apparatus of claim 5, comprising a high temperature heat pump.

11. A process for replacing an incumbent refrigerant in a refrigeration apparatus or a refrigeration system, comprising substantially replacing said incumbent refrigerant with a composition, comprising:
    i) 15-99 wt % 1,2-dichloro-1,2-difluoroethylene; and
    ii) 85-1 wt % R-1336mzzZ.

12. The process of claim 11, wherein the incumbent refrigerant is selected from R-123, R-245fa, R-236fa, R-124, R-134a, R-22, and R-401A.

13. The process of claim 11, wherein the replacement refrigerant composition exhibits a cooling capacity that is within about ±15% of the cooling capacity of the incumbent refrigerant.

14. A method of transferring heat comprising transporting a composition from a heat source to a heat sink, the composition comprising:
    i) 15-99 wt % 1,2-dichloro-1,2-difluoroethylene; and
    ii) 85-1 wt % R-1336mzzZ.

15. The method of claim 14, wherein the transferring of heat is in a heat pipe.

16. The method of claim 14, wherein the transferring of heat is in a constant conductance heat pipe or a thermosyphon.

17. The method of claim 14, wherein the transferring of heat is in an immersion cooler.

* * * * *